(12) United States Patent
Huang et al.

(10) Patent No.: US 12,457,616 B2
(45) Date of Patent: Oct. 28, 2025

(54) METHOD AND APPARATUS FOR UPLINK TRANSMISSION REGARDING MULTIPLE PANELS IN A WIRELESS COMMUNICATION SYSTEM

(71) Applicant: ASUSTek Computer Inc., Taipei (TW)

(72) Inventors: Chun-Wei Huang, Taipei (TW); Yu-Hsuan Guo, Taipei (TW); Yi-Hsuan Kung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 305 days.

(21) Appl. No.: 17/869,888

(22) Filed: Jul. 21, 2022

(65) Prior Publication Data

US 2023/0048026 A1 Feb. 16, 2023

Related U.S. Application Data

(60) Provisional application No. 63/227,561, filed on Jul. 30, 2021.

(51) Int. Cl.
*H04W 72/20* (2023.01)
*H04W 52/14* (2009.01)
*H04W 52/24* (2009.01)
*H04W 56/00* (2009.01)
(Continued)

(52) U.S. Cl.
CPC ......... *H04W 72/23* (2023.01); *H04W 52/146* (2013.01); *H04W 52/242* (2013.01); *H04W 56/0045* (2013.01); *H04W 72/1268* (2013.01)

(58) Field of Classification Search
CPC ............................. H04W 72/08; H04W 72/04
See application file for complete search history.

(56) References Cited

U.S. PATENT DOCUMENTS

| 9,860,849 B1* | 1/2018 | Naim | H04W 52/146 |
| 2011/0319112 A1* | 12/2011 | Jeong | H04W 52/288 |
| | | | 455/509 |

(Continued)

FOREIGN PATENT DOCUMENTS

| CN | 103931242 A | 7/2014 |
| CN | 105659687 A | 6/2016 |

(Continued)

OTHER PUBLICATIONS

Corresponding Korean Intellectual Property Office Application No. 10-2022-0090433, Office Action dated Jan. 30, 2025, 5 pages.

(Continued)

*Primary Examiner* — Zhiren Qin
(74) *Attorney, Agent, or Firm* — Cooper Legal Group LLC

(57) ABSTRACT

A method and apparatus are disclosed. In an example from the perspective of a User Equipment (UE), the UE receives one or more uplink grants scheduling a first uplink transmission and a second uplink transmission on a first serving cell. The first uplink transmission is associated with a first Timing Advance (TA). The second uplink transmission is associated with a second TA. The first uplink transmission at least partially overlaps with the second uplink transmission in time domain. Based on a comparison of a TA difference, between the first TA and the second TA, with a first threshold, the UE transmits at least one of the first uplink transmission or the second uplink transmission.

14 Claims, 18 Drawing Sheets

(51) Int. Cl.
*H04W 72/1268* (2023.01)
*H04W 72/23* (2023.01)

(56) References Cited

U.S. PATENT DOCUMENTS

| | | | | |
|---|---|---|---|---|
| 2013/0195086 A1* | 8/2013 | Xu | ................. | H04W 72/04 |
| | | | | 370/336 |
| 2014/0369324 A1* | 12/2014 | Lin | ................. | H04W 56/0005 |
| | | | | 370/336 |
| 2016/0192376 A1* | 6/2016 | Lee | ................. | H04W 48/20 |
| | | | | 370/252 |
| 2017/0188319 A1* | 6/2017 | Seo | ................. | H04W 56/001 |
| 2017/0195890 A1* | 7/2017 | Chen | ................. | H04W 72/0446 |
| 2018/0084550 A1* | 3/2018 | Chen | ................. | H04W 72/0453 |
| 2018/0124712 A1 | 5/2018 | Lin et al. | | |
| 2020/0053801 A1* | 2/2020 | Hosseini | ............. | H04W 52/281 |
| 2021/0266845 A1* | 8/2021 | Zhou | ................. | H04W 52/146 |
| 2022/0158775 A1* | 5/2022 | Xiong | ................. | H04L 1/1864 |
| 2022/0182957 A1* | 6/2022 | Laddu | ................. | H04L 1/1854 |
| 2022/0287030 A1* | 9/2022 | Ling | ................. | H04L 5/0053 |
| 2023/0171758 A1* | 6/2023 | Si | ................. | H04L 5/0051 |
| | | | | 370/329 |
| 2023/0275636 A1* | 8/2023 | Singh | ................. | H04B 7/0626 |
| | | | | 375/299 |

FOREIGN PATENT DOCUMENTS

| | | |
|---|---|---|
| CN | 110535570 A | 1/2019 |
| WO | 2020194103 A1 | 10/2020 |

OTHER PUBLICATIONS

Corresponding Chinese Intellectual Property Office Application No. 202210859144.7, Office Action dated Jul. 8, 2025, 14 pages.

* cited by examiner

| | | | | | | | |
|---|---|---|---|---|---|---|---|

| P | R | PH (Type 1, PCell) |
|---|---|---|
| MPE or R | | $P_{CMAX,f,c}$ |

FIG. 5

| | | | | | | | |
|---|---|---|---|---|---|---|---|

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) ||||||
| MPE or R | | $P_{CMAX,f,c}$ 1 ||||||
| P | V | PH (Type 1, PCell) ||||||
| MPE or R | | $P_{CMAX,f,c}$ 2 ||||||
| P | V | PH (Type X, Serving Cell 1) ||||||
| MPE or R | | $P_{CMAX,f,c}$ 3 ||||||

...

| P | V | PH (Type X, Serving Cell n) |
|---|---|---|
| MPE or R | | $P_{CMAX,f,c}$ m |

```
┌─────────────────────────────────────────────────────────────────────┐
│     TRIGGER TRANSMISSION OF REPORT TO NETWORK IN RESPONSE TO        │
│   DETERMINING THAT (A) COMBINATION OF FIRST TRANSMIT POWER OF FIRST │
│    UPLINK TRANSMISSION AND SECOND TRANSMIT POWER OF SECOND UPLINK   │
│      TRANSMISSION IS LARGER THAN THRESHOLD, (B) COMBINATION OF FIRST│
│     VARIATION OF FIRST PATHLOSS ESTIMATE ASSOCIATED WITH FIRST UPLINK│  ─ 1605
│       TRANSMISSION AND SECOND VARIATION OF SECOND PATHLOSS ESTIMATE │
│   ASSOCIATED WITH SECOND UPLINK TRANSMISSION IS LARGER THAN VARIATION│
│          THRESHOLD, AND/OR (C) NUMBER OF FAILED CONCURRENT SCHEDULING│
│           ATTEMPTS FOR FIRST UPLINK TRANSMISSION AND SECOND UPLINK  │
│    TRANSMISSION IS LARGER THAN COUNTING THRESHOLD, WHEREIN FIRST UPLINK│
│     TRANSMISSION AND SECOND UPLINK TRANSMISSION ARE SCHEDULED TO BE │
│              TRANSMITTED CONCURRENTLY ON FIRST SERVING CELL         │
└─────────────────────────────────────────────────────────────────────┘
                                    │
                                    ▼
┌─────────────────────────────────────────────────────────────────────┐
│  TRANSMIT REPORT, TO NETWORK, IN RESPONSE TO TRIGGERING TRANSMISSION│ ─ 1610
│                              OF REPORT                              │
└─────────────────────────────────────────────────────────────────────┘
```

FIG. 16

METHOD AND APPARATUS FOR UPLINK TRANSMISSION REGARDING MULTIPLE PANELS IN A WIRELESS COMMUNICATION SYSTEM

CROSS-REFERENCE TO RELATED APPLICATIONS

The present application claims the benefit of U.S. Provisional Patent Application Ser. No. 63/227,561 filed on Jul. 30, 2021, the entire disclosure of which is incorporated herein in its entirety by reference.

FIELD

This disclosure generally relates to wireless communication networks, and more particularly, to a method and apparatus for uplink transmission regarding multiple panels in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives one or more uplink grants scheduling a first uplink transmission and a second uplink transmission on a first serving cell. The first uplink transmission is associated with a first Timing Advance (TA). The second uplink transmission is associated with a second TA. The first uplink transmission at least partially overlaps with the second uplink transmission in time domain. Based on a comparison of a TA difference, between the first TA and the second TA, with a first threshold, the UE transmits at least one of the first uplink transmission or the second uplink transmission.

In an example from the perspective of a UE, the UE receives one or more uplink grants scheduling a first uplink transmission and a second uplink transmission on a first serving cell, wherein the first uplink transmission at least partially overlaps with the second uplink transmission in time domain. The UE determines whether or not to perform concurrent transmission of the first uplink transmission and the second uplink transmission based on a comparison of a transmit power value with a first threshold, wherein the transmit power value is based on a combination of a first transmit power of the first uplink transmission and a second transmit power of the second uplink transmission. The UE transmits the first uplink transmission and/or the second uplink transmission based on the determination of whether or not to perform concurrent transmission of the first uplink transmission and the second uplink transmission. For example, the UE may perform the concurrent transmission of the first uplink transmission and the second uplink transmission on the first serving cell based on the transmit power value being smaller than or equal to the first threshold.

BRIEF DESCRIPTION OF THE DRAWINGS

FIG. 5 illustrates a single entry Power Headroom Reporting Medium Access Control (MAC) Control Element (CE) according to one exemplary embodiment.

FIG. 6 illustrates a multiple entry Power Headroom Reporting MAC CE according to one exemplary embodiment.

FIG. 16 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321 V16.5.0 (2021 June) 3rd Generation Partnership Project, Technical Specification Group Radio Access Network, NR, Medium Access Control (MAC) protocol specification (Release 16); 3GPP TS 38.331 V16.5.0 (2021 June) 3rd Generation Partnership Project, Technical Specification Group Radio Access Network, NR, Radio Resource Control (RRC) protocol specification (Release 16); 3GPP TS 38.212 V16.6.0 (2021 June) 3rd Generation Partnership Project; Technical Specification Group Radio Access Network, NR, Multiplexing and channel coding (Release 16); 3GPP TS 38.213 V16.6.0 (2021 June) 3rd Generation Partnership Project, Technical Specification Group Radio Access Network, NR, Physical layer procedures for control (Release 16); 3GPP TS 38.214 V16.6.0 (2021 June) 3rd Generation Partnership Project, Technical Specification Group Radio Access Network, NR, Physical layer procedures for data (Release 16); Final Report of 3GPP TSG RAN WG1 #104-e v1.0.0 (Online meeting, 25 Jan.-5 Feb. 2021); Final Report of 3GPP TSG RAN WG1 #104bis-e v1.0.0 (Online meeting, 12-20 Apr. 2021); Draft Report of 3GPP TSG RAN WG1 #105-e v0.2.0 (Online meeting, 10-27 May 2021); R1-2104266, Huawei, HiSilicon; R1-2009060, Asia Pacific Telecom; R1-2008573, LG; 3GPP TS 38.101-2 V17.2.0 (2021 June) 3rd Generation Partnership Project, Technical Specification Group Radio Access Network, NR, User Equipment (UE) radio transmission and reception, Part 2: Range 2 Standalone (Release 17). The standards and documents listed above are hereby expressly incorporated by reference in their entirety.

Figure 1:
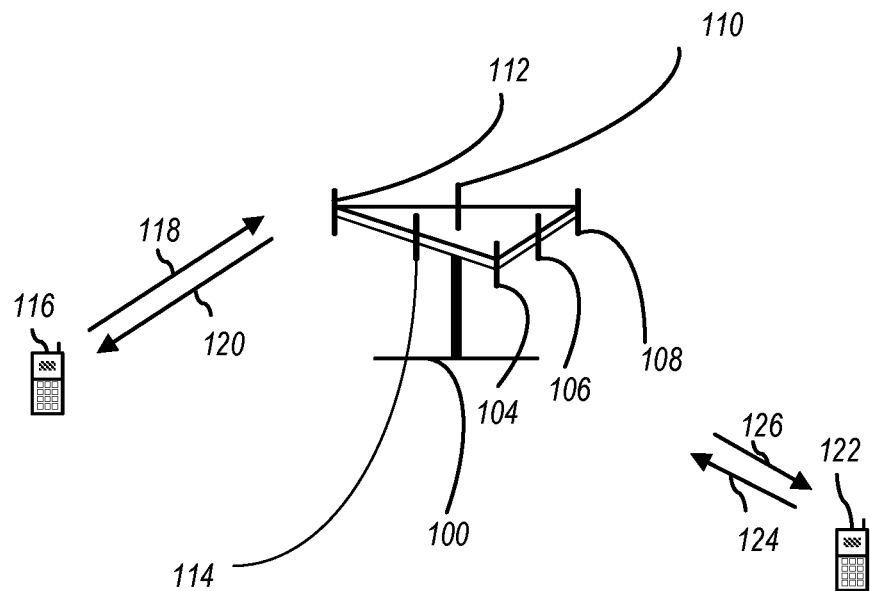
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
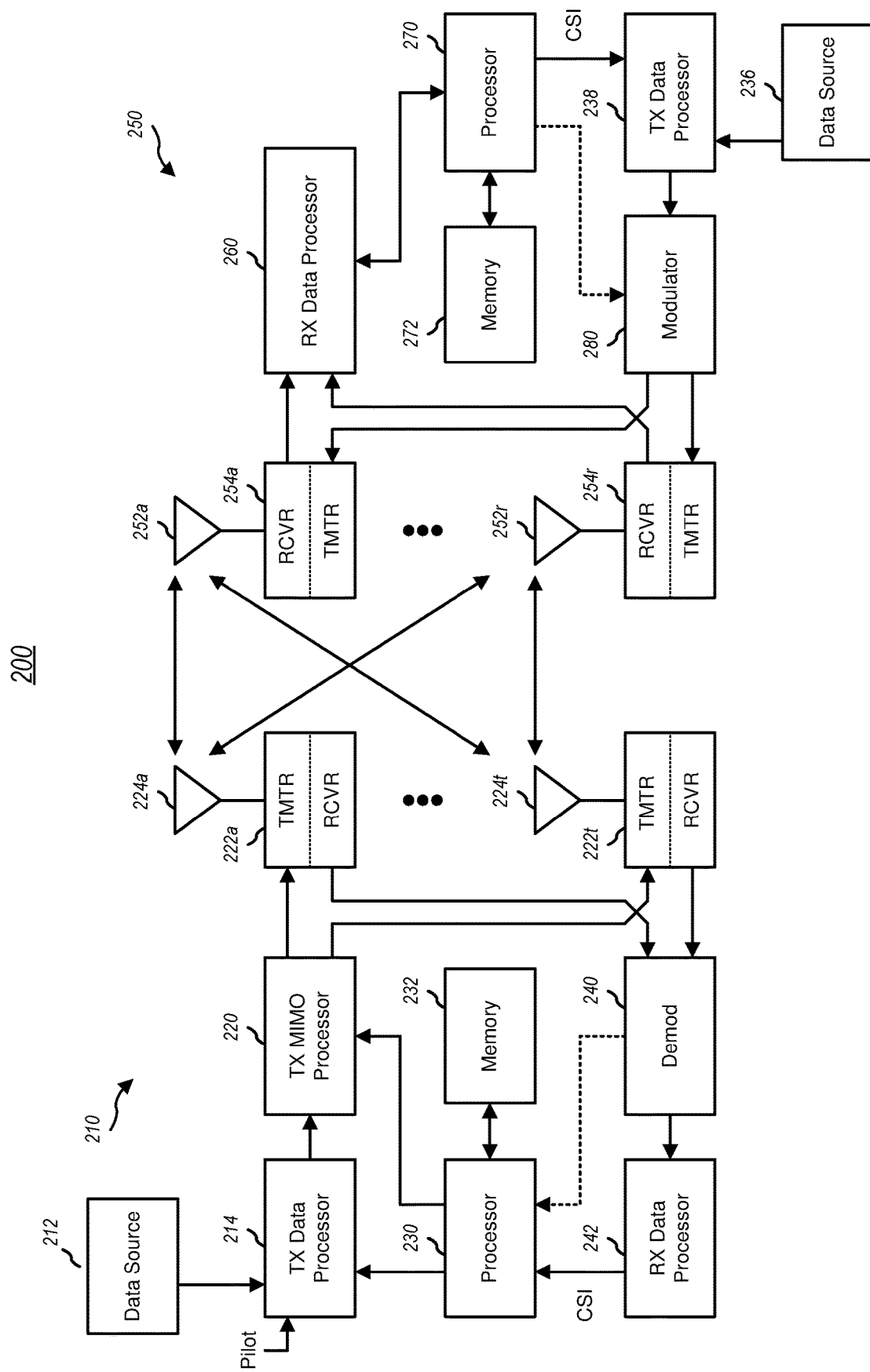
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
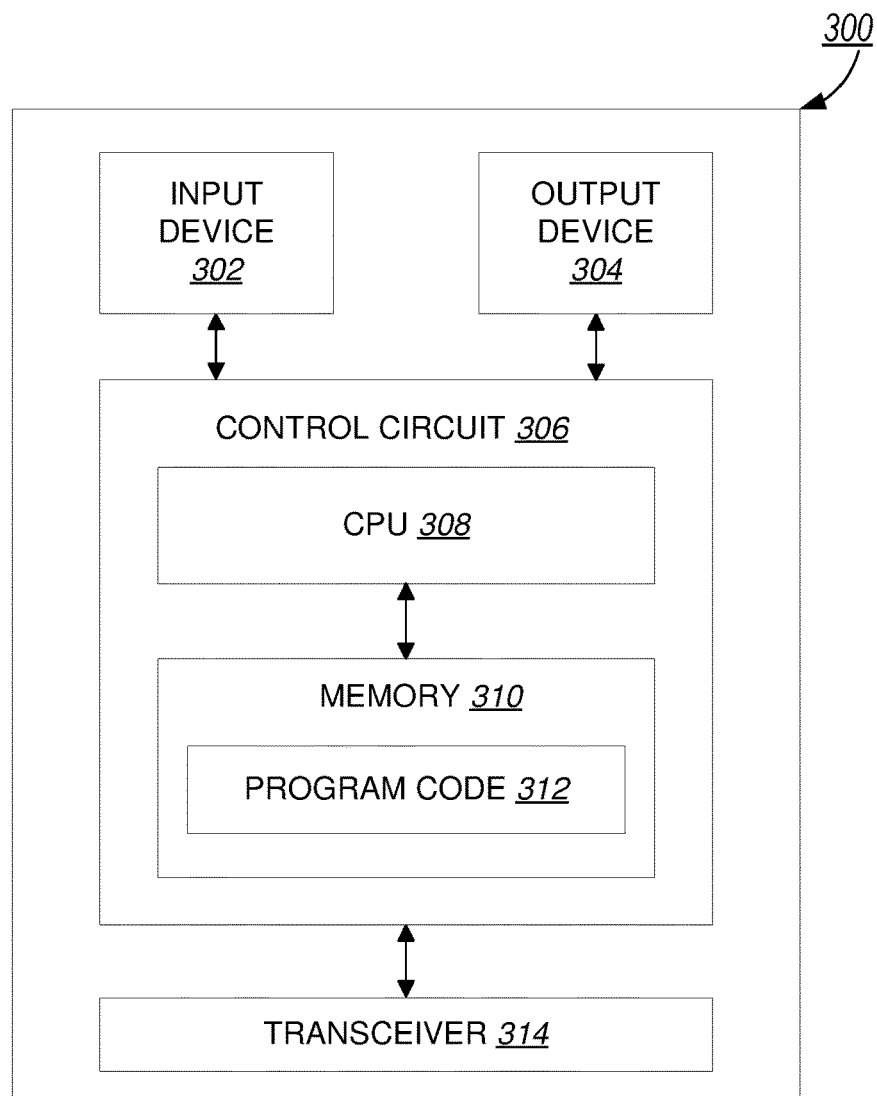
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
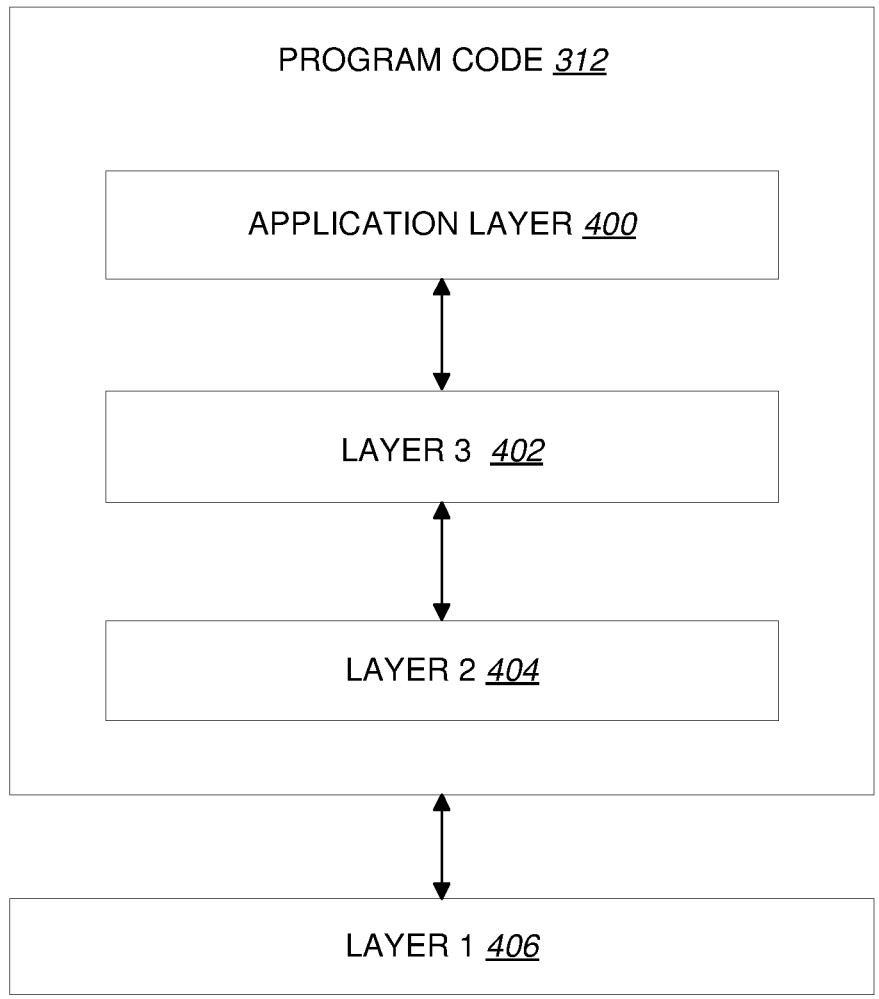
FIG. 4 is a functional block diagram of the program code of FIG. 3 according to one exemplary embodiment.
Figure 7:
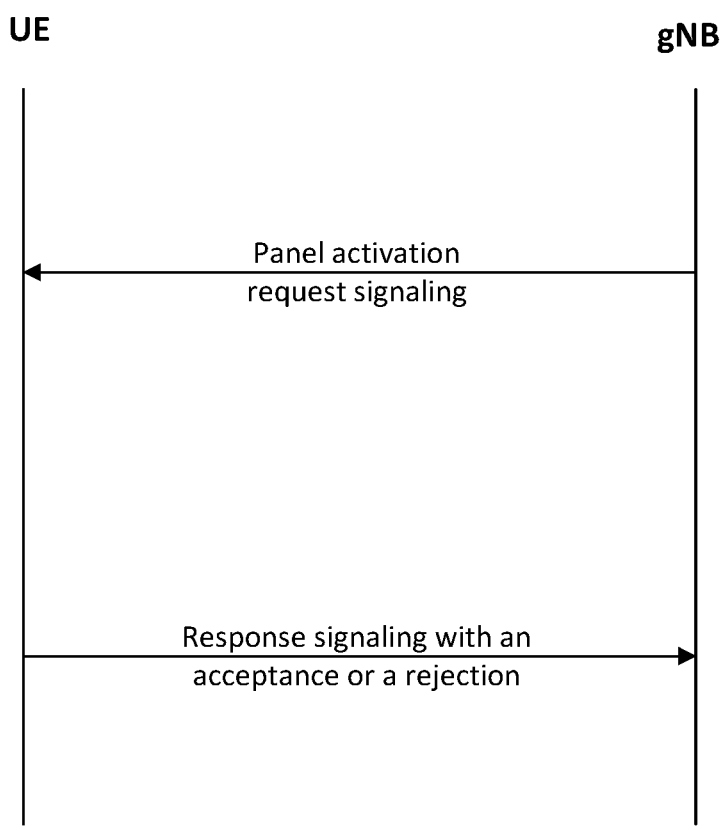
FIG. 7 is a diagram illustrating an exemplary scenario associated with network-initiated UE panel activation according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In 3GPP TS 38.321 V16.5.0, a procedure for maintain time alignment and power headroom reporting is discussed. Notably, FIG. 6.1.3.8-1 of Section 6.1.3.8 of 3GPP TS 38.321 V16.5.0, entitled "Single Entry PHR MAC CE", is reproduced herein as FIG. 5. FIG. 6.1.3.9-1 of Section 6.1.3.9 of 3GPP TS 38.321 V16.5.0, entitled "Multiple Entry PHR MAC CE with the highest ServCellIndex of Serving Cell with configured uplink is less than 8", is reproduced herein as FIG. 6. One or more parts of 3GPP TS 38.321 V16.5.0 are quoted below:

5.2 Maintenance of Uplink Time Alignment

RRC configures the following parameters for the maintenance of UL time alignment:

timeAlignmentTimer (per TAG) which controls how long the MAC entity considers the Serving Cells belonging to the associated TAG to be uplink time aligned.

The MAC entity shall:

1> when a Timing Advance Command MAC CE is received, and if an $N_{TA}$ (as defined in TS 38.211 [8]) has been maintained with the indicated TAG:

2> apply the Timing Advance Command for the indicated TAG;

2> start or restart the timeAlignmentTimer associated with the indicated TAG.

1> when a Timing Advance Command is received in a Random Access Response message for a Serving Cell belonging to a TAG or in a MSGB for an SpCell:

2> if the Random Access Preamble was not selected by the MAC entity among the contention-based Random Access Preamble:

3> apply the Timing Advance Command for this TAG;

3> start or restart the timeAlignmentTimer associated with this TAG.

2> else if the timeAlignmentTimer associated with this TAG is not running

3> apply the Timing Advance Command for this TAG;

3> start the timeAlignmentTimer associated with this TAG;

3> when the Contention Resolution is considered not successful as described in clause 5.1.5; or 3> when the Contention Resolution is considered successful for SI request as described in clause 5.1.5, after transmitting HARQ feedback for MAC PDU including UE Contention Resolution Identity MAC CE:

4> stop timeAlignmentTimer associated with this TAG.

2> else:

3> ignore the received Timing Advance Command

1> when an Absolute Timing Advance Command is received in response to a MSGA transmission including C-RNTI MAC CE as specified in clause 5.1.4a:

2> apply the Timing Advance Command for PTAG;

2> start or restart the timeAlignmentTimer associated with PTAG.

1> when a timeAlignmentTimer expires:

2> if the timeAlignmentTimer is associated with the PTAG:

3> flush all HARQ buffers for all Serving Cells;

3> notify RRC to release PUCCH for all Serving Cells, if configured;

3> notify RRC to release SRS for all Serving Cells, if configured;

3> clear any configured downlink assignments and configured uplink grants;

3> clear any PUSCH resource for semi-persistent CSI reporting;

3> consider all running timeAlignmentTimers as expired;
3> maintain $N_{TA}$ (defined in TS 38.211 [8]) of all TAGs.
2> else if the timeAlignmentTimer is associated with an STAG, then for all Serving Cells belonging to this TAG:
3> flush all HARQ buffers;
3> notify RRC to release PUCCH, if configured;
3> notify RRC to release SRS, if configured;
3> clear any configured downlink assignments and configured uplink grants;
3> clear any PUSCH resource for semi-persistent CSI reporting;
3> maintain $N_{TA}$ (defined in TS 38.211 [8]) of this TAG.

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

The MAC entity shall not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity shall not perform any uplink transmission on any Serving Cell except the Random Access Preamble and MSGA transmission on the SpCell.

5.4.6 Power Headroom Reporting

The Power Headroom reporting procedure is used to provide the serving gNB with the following information:
Type 1 power headroom: the difference between the nominal UE maximum transmit power and the estimated power for UL-SCH transmission per activated Serving Cell;
Type 3 power headroom: the difference between the nominal UE maximum transmit power and the estimated power for SRS transmission per activated Serving Cell;
MPE P-MPR: the power backoff to meet the MPE FR2 requirements for a Serving Cell operating on FR2.

RRC controls Power Headroom reporting by configuring the following parameters:
phr-Periodic Timer;
phr-ProhibitTimer;
phr-Tx-PowerFactorChange;
phr-Type2OtherCell;
phr-ModeOtherCG;
multiplePHR;
mpe-Reporting-FR2;
mpe-ProhibitTimer;
mpe-Threshold.

A Power Headroom Report (PHR) shall be triggered if any of the following events occur:
phr-ProhibitTimer expires or has expired and the path loss has changed more than phr-Tx-PowerFactorChange dB for at least one activated Serving Cell of any MAC entity of which the active DL BWP is not dormant BWP which is used as a pathloss reference since the last transmission of a PHR in this MAC entity when the MAC entity has UL resources for new transmission;
NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].
phr-PeriodicTimer expires;
upon configuration or reconfiguration of the power headroom reporting functionality by upper layers, which is not used to disable the function;
activation of an SCell of any MAC entity with configured uplink of which firstActiveDownlinkBWP-Id is not set to dormant BWP;
addition of the PSCell (i.e. PSCell is newly added or changed);
phr-ProhibitTimer expires or has expired, when the MAC entity has UL resources for new transmission, and the following is true for any of the activated Serving Cells of any MAC entity with configured uplink
there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.
Upon switching of activated BWP from dormant BWP to non-dormant DL BWP of an SCell of any MAC entity with configured uplink;
if mpe-Reporting-FR2 is configured, and mpe-ProhibitTimer is not running
the measured P-MPR applied to meet FR2 MPE requirements as specified in TS 38.101-2 [15] is equal to or larger than mpe-Threshold for at least one activated FR2 Serving Cell since the last transmission of a PHR in this MAC entity; or
the measured P-MPR applied to meet FR2 MPE requirements as specified in TS 38.101-2 [15] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.
in which case the PHR is referred below to as 'MPE P-MPR report'.
NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.
NOTE 3: If a HARQ process is configured with cg-RetransmissionTimer and if the PHR is already included in a MAC PDU for transmission on configured grant by this HARQ process, but not yet transmitted by lower layers, it is up to UE implementation how to handle the PHR content.

If the MAC entity has UL resources allocated for a new transmission the MAC entity shall:
1> if it is the first UL resource allocated for a new transmission since the last MAC reset:
2> start phr-Periodic Timer.
1> if the Power Headroom reporting procedure determines that at least one PHR has been triggered and not cancelled; and 1> if the allocated UL resources can accommodate the MAC CE for PHR which the MAC entity is configured to transmit, plus its subheader, as a result of LCP as defined in clause 5.4.3.1:
  2> if multiplePHR with value true is configured:
    3> for each activated Serving Cell with configured uplink associated with any MAC entity of which the active DL BWP is not dormant BWP:
      4> obtain the value of the Type 1 or Type 3 power headroom for the corresponding uplink carrier as specified in clause 7.7 of TS 38.213 [6] for NR Serving Cell and clause 5.1.1.2 of TS 36.213 [17] for E-UTRA Serving Cell;
      4> if this MAC entity has UL resources allocated for transmission on this Serving Cell; or
      4> if the other MAC entity, if configured, has UL resources allocated for transmission on this Serving Cell and phr-ModeOtherCG is set to real by upper layers:
        5> obtain the value for the corresponding $P_{CMAX,f,c}$ field from the physical layer.
        5> if mpe-Reporting-FR2 is configured and this Serving Cell operates on FR2 and this Serving Cell is associated to this MAC entity:
          6> obtain the value for the corresponding MPE field from the physical layer.
    3> instruct the Multiplexing and Assembly procedure to generate and transmit the Multiple Entry PHR MAC CE as defined in clause 6.1.3.9 based on the values reported by the physical layer.
  2> else (i.e. Single Entry PHR format is used):
    3> obtain the value of the Type 1 power headroom from the physical layer for the corresponding uplink carrier of the PCell;
    3> obtain the value for the corresponding $P_{CMAX,f,c}$ field from the physical layer;
    3> if mpe-Reporting-FR2 is configured and this Serving Cell operates on FR2:
      4> obtain the value for the corresponding MPE field from the physical layer.
    3> instruct the Multiplexing and Assembly procedure to generate and transmit the Single Entry PHR MAC CE as defined in clause 6.1.3.8 based on the values reported by the physical layer.
  2> if this PHR report is an MPE P-MPR report:
    3> start or restart the mpe-ProhibitTimer;
    3> cancel triggered MPE P-MPR reporting for Serving Cells included in the PHR MAC CE.
  2> start or restart phr-PeriodicTimer;
  2> start or restart phr-ProhibitTimer;
  2> cancel all triggered PHR(s).
. . .

6.1.3.8 Single Entry PHR MAC CE

The Single Entry PHR MAC CE is identified by a MAC subheader with LCID as specified in Table 6.2.1-2.

It has a fixed size and consists of two octets defined as follows (FIG. 6.1.3.8-1):

R: Reserved bit, set to 0;

Power Headroom (PH): This field indicates the power headroom level. The length of the field is 6 bits. The reported PH and the corresponding power headroom levels are shown in Table 6.1.3.8-1 below (the corresponding measured values in dB are specified in TS 38.133 [11]);

P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]);

MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead.

FIG. 6.1.3.8-1: Single Entry PHR MAC CE 6.1.3.9 Multiple Entry PHR MAC CE

The Multiple Entry PHR MAC CE is identified by a MAC subheader with LCID as specified in Table 6.2.1-2.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

$C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

Power Headroom (PH): This field indicates the power headroom level. The length of the field is 6 bits. The reported PH and the corresponding power headroom levels are shown in Table 6.1.3.8-1 (the corresponding measured values in dB for the NR Serving Cell are specified in TS 38.133 [11] while the corresponding measured values in dB for the E-UTRA Serving Cell are specified in TS 36.133 [12]);

P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 [11] while the corresponding measured values in dBm for the E-UTRA Serving Cell are specified in TS 36.133 [12]);

MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead.

FIG. 6.1.3.9-1: Multiple Entry PHR MAC CE with the Highest ServCellIndex of Serving Cell with Configured Uplink is Less than 8

In 3GPP TS 38.331 V16.5.0, Layer-3 filtering and Radio Resource Control (RRC) configuration are discussed in one or more parts quoted below:

5.5.3.2 Layer 3 Filtering

The UE shall:

1> for each cell measurement quantity, each beam measurement quantity, each sidelink measurement quantity as needed in sub-clause 5.8.10, and for each CLI measurement quantity that the UE performs measurements according to 5.5.3.1:

2> filter the measured result, before using for evaluation of reporting criteria or for measurement reporting, by the following formula:

$$F_n = (1-a)*F_{n-1} + a*M_n$$

where $M_n$ is the latest received measurement result from the physical layer;

$F_n$ is the updated filtered measurement result, that is used for evaluation of reporting criteria or for measurement reporting;

$F_{n-1}$ is the old filtered measurement result

2> adapt the filter such that the time characteristics of the filter are preserved at different input rates, observing that the filterCoefficient k assumes a sample rate equal to X ms; The value of X is equivalent to one intra-frequency L1 measurement period as defined in TS 38.133 [14] assuming non-DRX operation, and depends on frequency range.

ControlResourceSet

The IE ControlResourceSet is used to configure a time/frequency control resource set (CORESET) in which to search for downlink control information (see TS 38.213 [13], clause 10.1).

ControlResourceSet information element

```
ControlResourceSet ::=            SEQUENCE {
    controlResourceSetId          ControlResourceSetId,
    ...
    tci-StatesPDCCH-ToAddList     SEQUENCE(SIZE
                                  (1..maxNrofTCI-
StatesPDCCH)) OF TCI-StateId     -- Cond NotSIB1-initialBWP
OPTIONAL,
    tci-StatesPDCCH-ToReleaseList SEQUENCE(SIZE
                                  (1..maxNrofTCI-
StatesPDCCH)) OF TCI-StateId     -- Cond NotSIB1-initialBWP
OPTIONAL,
    ...
    coresetPoolIndex-r16          INTEGER (0..1)
OPTIONAL                         -- Need S
    controlResourceSetId-v1610    ControlResourceSetId-v1610
OPTIONAL                         -- Need S
    ]]
}
```

| ControlResourceSet field descriptions |
| --- |
| controlResourceSetId
Identifies the instance of the ControlResourceSet IE. Value 0 identifies the common CORESET configured in MIB and in ServingCellConfigCommon (controlResourceSetZero) and is hence not used here in the ControlResourceSet IE. Other values identify CORESETs configured by dedicated signalling or in SIB1. The controlResourceSetId is unique among the BWPs of a serving cell.
If the field controlResourceSetId-v1610 is present, the UE shall ignore the controlResourceSetId field (without suffix).
coresetPoolIndex
The index of the CORESET pool for this CORESET as specified in TS 38.213 [13] (clauses 9 and 10) and TS 38.214 [19] (clauses 5.1 and 6.1). If the field is absent, the UE applies the value 0.
tci-StatesPDCCH-ToAddList
A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. |

PHR-Config

The IE PHR-Config is used to configure parameters for power headroom reporting.

| PHR-Config information element |
| --- |
| PHR-Config ::=                SEQUENCE {
    phr-PeriodicTimer            ENUMERATED {sf10, sf100, sf200, sf500, sf1000, infinity},   sf20, sf50,
    phr-ProhibitTimer            ENUMERATED {sf0, sf50, sf100, sf200, sf500, sf1000},   sf10, sf20,
    phr-Tx-PowerFactorChange     ENUMERATED {dB1, infinity},   dB3, dB6,
    multiplePHR                  BOOLEAN,
    ...,
    [[
    mpe-Reporting-FR2-r16        SetupRelease { MPE-Config-FR2-r16 }   OPTIONAL    -- Need M
    ]]
}
MPE-Config-FR2-r16 ::=        SEQUENCE {
    mpe-ProhibitTimer-r16        ENUMERATED {sf0, sf50, sf100, sf200, sf500, sf1000},   sf10, sf20,
    mpe-Threshold-r16            ENUMERATED {dB3, dB12}   dB6, dB9,
} |

| PHR-Config field descriptions |
| --- |
| mpe-ProhibitTimer
Value in number of subframes for MPE reporting, as specified in TS 38.321 [3]. Value sf10 corresponds to 10 subframes, and so on.
mpe-Reporting-FR2
Indicates whether the UE shall report MPE P-MPR in the PHR MAC control element, as specified in TS 38.321 [3].
mpe-Threshold
Value of the P-MPR threshold in dB for reporting MPE P-MPR when FR2 is configured, as specified in TS 38.321 [3]. The same value applies for each serving cell (although the associated functionality is performed independently for each cell).
multiplePHR
Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases.
phr-ModeOtherCG
Indicates the mode (i.e. real or virtual) used for the PHR of the activated cells that are part of the other Cell Group (i.e. MCG or SCG), when DC is configured. If the UE is configured with only one cell group (no DC), it ignores the field.
phr-PeriodicTimer
Value in number of subframes for PHR reporting as specified in TS 38.321 [3]. Value sf10 corresponds to 10 subframes, value sf20 corresponds to 20 subframes, and so on.
phr-ProhibitTimer
Value in number of subframes for PHR reporting as specified in TS 38.321 [3]. Value sf0 corresponds to 0 subframe, value sf10 corresponds to 10 subframes, value sf20 corresponds to 20 subframes, and so on.
phr-Tx-PowerFactorChange
Value in dB for PHR reporting as specified in TS 38.321 [3]. Value dB1 corresponds to 1 dB, dB3 corresponds to 3 dB and so on. The same value applies for each serving cell (although the associated functionality is performed independently for each cell). |

In 3GPP TS 38.212 V16.6.0, NR Downlink Control Information (DCI) format is discussed in one or more parts quoted below:

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats—1 bit
  The value of this bit field is always set to 0, indicating an UL DCI format
Carrier indicator—0 or 3 bits, as defined in Clause 10.1 of [5, TS38.213].
DFI flag—0 or 1 bit
...

If DCI format 0_1 is used for indicating CG-DFI, all the remaining fields are set as follows:
HARQ-ACK bitmap—16 bits
TPC command for scheduled PUSCH—2 bits
All the remaining bits in format 0_1 are set to zero.
Otherwise, all the remaining fields are set as follows:
...

Time domain resource assignment—0, 1, 2, 3, 4, 5, or 6 bits
  If the higher layer parameter pusch-TimeDomainAllocationListDCI-0-1 is not configured and if the higher layer parameter pusch-TimeDomainAllocationListForMultiPUSCH is not configured and if the higher layer parameter pusch-TimeDomainAllocationList is configured, 0, 1, 2, 3, or 4 bits as defined in Clause 6.1.2.1 of [6, TS38.214]. The bitwidth for this field is determined as $\lceil \log_2(I) \rceil$ bits, where I is the number of entries in the higher layer parameter pusch-TimeDomainAllocationList;
  ...
  otherwise the bitwidth for this field is determined as $\lceil \log_2(I) \rceil$ bits, where I is the number of entries in the default table.
...
HARQ process number—4 bits
...
SRS resource indicator $$-\left\lceil \log_2\left(\sum_{k=1}^{\min\{L_{max}, N_{SRS}\}} \binom{N_{SRS}}{k}\right)\right\rceil \text{ or } \lceil \log_2(N_{SRS}) \rceil \text{ bits,}$$

where $N_{SRS}$ is the number of configured SRS resources in the SRS resource set configured by higher layer parameter srs-ResourceSetToAddModList, and associated with the higher layer parameter usage of value 'codeBook' or 'nonCodeBook', In 3GPP TS 38.213 V16.6.0, PHR and power control are discussed in one or more parts quoted below:

7 Uplink Power Control
...
7.1.1 UE Behaviour

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{cases} \text{[dBm]}$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$.

If a UE established dedicated RRC connection using a Type-1 random access procedure, as described in clause 8, and is not provided P0-PUSCH-AlphaSet or for a PUSCH (re)transmission corresponding to a RAR UL grant as described in clause 8.3, $j=0$, $P_{O\_UE\_PUSCH,b,f,c}(0)=0$, and
$P_{O\_NOMINAL\_PUSCH,f,c}(0) = P_{O\_PRE} + \Delta_{PREAMBLE\_Msg3}$, where $P_{O\_PRE}$ is provided by preambleReceivedTargetPower [11, TS 38.321] and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of serving cell C For $j \in \{2, \ldots, J-1\} = S_j$, a $P_{O\_NOMINAL\_PUSCH,f,c}(j)$ value, applicable for all $j \in S_j$, is provided by p0-NominalWithGrant, or $P_{O\_NOMINAL\_PUSCH,f,c}(j) = P_{O\_NOMINAL\_PUSCH,f,c}(0)$ if p0-NominalWithGrant is not provided, for each carrier f of serving cell C and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the value of $P_{O\_UE\_PUSCH,b,f,c}$ (i) from the p0-PUSCH-AlphaSetId value that is mapped to the SRI field value. If the DCI format also includes an open-loop power control parameter set indication field and a value of the open-loop power control parameter set indication field is '1', the UE determines a value of $P_{O\_UE\_PUSCH,b,f,c}(j)$ from a first value in P0-PUSCH-Set with a p0-PUSCH-SetId value mapped to the SRI field value.

For $\alpha_{b,f,c}(j)$
For $j \in S_j$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value $M_{RB,b,f,c}^{PUSCH}(i)$ is the bandwidth of the PUSCH resource assignment expressed in number of resource blocks for PUSCH transmission occasion i on active UL BWP b of carrier f of serving cell c and µ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in clause 12, of carrier f of serving cell c If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in a DCI format scheduling the PUSCH transmission and a set of PUSCH-PathlossReferenceRS-Id values and determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking $PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-BlockPower. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

7.7 Power Headroom Report

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c.

A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format scheduling an initial transmission of a transport block since a power headroom report was triggered if the power headroom report is reported on a PUSCH triggered by the first DCI format. Otherwise, a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$, corresponding to the subcarrier spacing of the active downlink BWP of the scheduling cell for a configured grant if the power headroom report is reported on the PUSCH using the configured grant.

7.7.1 Type 1 PH Report

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i,j,q_d,l)=P_{CMAX,f,c}(i)-\{P_{O\_PUSCH,b,f,c}(j)+10\log_{10}(2^{\mu} \cdot M_{RB,b,f,c}^{PUSCH}(i))+\alpha_{b,f,c}(j)\cdot PL_{b,f,c}(q_d)+\Delta_{TF,b,f,c}(i)+f_{b,f,c}(i,l)\} \text{ [dB]}$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ are defined in clause 7.1.1.

If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l)=\tilde{P}_{CMAX,f,c}(i)-\{P_{O\_PUSCH,b,f,c}(j)+\alpha_{b,f,c}(j)\cdot PL_{b,f,c}(q_d)+f_{b,f,c}(i,l)\} \text{ [dB]}$$

where $\tilde{P}_{CMAX,f,c}(i)$ is computed assuming MPR=0 dB, A-MPR=0 dB, P-MPR=0 dB. $\Delta T_C=0$ dB. MPR, A-MPR, P-MPR and $\Delta T_C$ are defined in [8-1, TS 38.101-1], [8-2, TS38.101-2] and [8-3, TS 38.101-3]. The remaining parameters are defined in clause 7.1.1 where $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0.

In 3GPP TS 38.214 V16.6.0, codebook-based Physical Uplink Shared Channel (PUSCH) and non-codebook-based PUSCH transmission are discussed in one or more parts quoted below:

6.1.1 Transmission Schemes

Two transmission schemes are supported for PUSCH: codebook based transmission and non-codebook based transmission. The UE is configured with codebook based transmission when the higher layer parameter txConfig in pusch-Config is set to 'codebook', the UE is configured non-codebook based transmission when the higher layer parameter txConfig is set to 'nonCodebook'. If the higher layer parameter txConfig is not configured, the UE is not expected to be scheduled by DCI format 0_1 or 0_2.

6.1.1.1 Codebook Based UL Transmission

For codebook based transmission, PUSCH can be scheduled by DCI format 0_0, DCI format 0_1, DCI format 0_2 or semi-statically configured to operate according to Clause 6.1.2.3. If this PUSCH is scheduled by DCI format 0_1, DCI format 0_2, or semi-statically configured to operate according to Clause 6.1.2.3, the UE determines its PUSCH transmission precoder based on SRI, TPMI and the transmission rank, where the SRI, TPMI and the transmission rank are given by DCI fields of SRS resource indicator and Precoding information and number of layers in clause 7.3.1.1.2 and 7.3.1.1.3 of [5, TS 38.212] for DCI format 0_1 and 0_2 or given by srs-ResourceIndicator and precodingAndNumberOfLayers according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. Only one SRS resource set can be configured in srs-ResourceSetToAddModList with higher layer parameter usage in SRS-ResourceSet set to 'codebook', and only one SRS resource set can be configured in srs-ResourceSetToAddModListDCI-0-2 with higher layer parameter usage in SRS-ResourceSet set to 'codebook'. The TPMI is used to indicate the precoder to be applied over the layers {0 . . . v−1} and that corresponds to the SRS resource selected by the SRI when multiple SRS resources are configured, or if a single SRS resource is configured TPMI is used to indicate the precoder to be applied over the layers {0 . . . v−1} and that corresponds to the SRS resource. The transmission precoder is selected from the uplink codebook that has a number of antenna ports equal to higher layer parameter nrofSRS-Ports in SRS-Config, as defined in Clause 6.3.1.5 of [4, TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI.

. . .

The UE shall transmit PUSCH using the same antenna port(s) as the SRS port(s) in the SRS resource indicated by the DCI format 0_1 or 0_2 or by configuredGrantConfig according to clause 6.1.2.3.

The DM-RS antenna ports $\{\tilde{p}_0, \ldots, \tilde{p}_{v-1}\}$ in Clause 6.4.1.1.3 of [4, TS38.211] are determined according to the ordering of DM-RS port(s) given by Tables 7.3.1.1.2-6 to 7.3.1.1.2-23 in Clause 7.3.1.1.2 of [5, TS 38.212].

. . .

6.1.1.2 Non-Codebook Based UL Transmission

For non-codebook based transmission, PUSCH can be scheduled by DCI format 0_0, DCI format 0_1, DCI format 0_2 or semi-statically configured to operate according to Clause 6.1.2.3. If this PUSCH is scheduled by DCI format 0_1, DCI format 0_2, or semi-statically configured to operate according to Clause 6.1.2.3, the UE can determine its PUSCH precoder and transmission rank based on the SRI when multiple SRS resources are configured, where the SRI is given by the SRS resource indicator in DCI according to clause 7.3.1.1.2 and 7.3.1.1.3 of [5, 38.212] for DCI format 0_1 and DCI format 0_2, or the SRI is given by srs-ResourceIndicator according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. The UE shall use one or multiple SRS resources for SRS transmission, where, in a SRS resource set, the maximum number of SRS resources which can be configured to the UE for simultaneous transmission in the same symbol and the maximum number of SRS resources are UE capabilities. The SRS resources transmitted simultaneously occupy the same RBs. Only one SRS port for each SRS resource is configured. Only one SRS resource set can be configured in srs-ResourceSetToAddModList with higher layer parameter usage in SRS-ResourceSet set to 'nonCodebook', and only one SRS resource set can be configured in srs-ResourceSetToAddModListDCI-0-2 with higher layer parameter usage in SRS-ResourceSet set to 'nonCodebook'. The maximum number of SRS resources that can be configured for non-codebook based uplink transmission is 4. The indicated SRI in slot n is associated with the most recent transmission of SRS resource(s) identified by the SRI, where the SRS transmission is prior to the PDCCH carrying the SRI.

For non-codebook based transmission, the UE can calculate the precoder used for the transmission of SRS based on measurement of an associated NZP CSI-RS resource. A UE can be configured with only one NZP CSI-RS resource for the SRS resource set with higher layer parameter usage in SRS-ResourceSet set to 'nonCodebook' if configured.

The UE shall perform one-to-one mapping from the indicated SRI(s) to the indicated DM-RS ports(s) and their corresponding PUSCH layers {0 . . . v−1} given by DCI format 0_1 or by configuredGrantConfig according to clause 6.1.2.3 in increasing order.

The UE shall transmit PUSCH using the same antenna ports as the SRS port(s) in the SRS resource(s) indicated by SRI(s) given by DCI format 0_1 or by configuredGrantConfig according to clause 6.1.2.3, where the SRS port in (i+1)-th SRS resource in the SRS resource set is indexed as $p_i$=1000+i.

The DM-RS antenna ports $\{\tilde{p}_0, \ldots, \tilde{p}_{v-1}\}$ in Clause 6.4.1.1.3 of [4, TS 38.211] are determined according to the ordering of DM-RS port(s) given by Tables 7.3.1.1.2-6 to 7.3.1.1.2-23 in Clause 7.3.1.1.2 of [5, TS 38.212].

For non-codebook based transmission, the UE does not expect to be configured with both spatialRelationInfo for SRS resource and associatedCSI-RS in SRS-ResourceSet for SRS resource set.

For non-codebook based transmission, the UE can be scheduled with DCI format 0_1 when at least one SRS resource is configured in SRS-ResourceSet with usage set to 'nonCodebook'.

In 3GPP TS 38.101-2 V17.2.0, UE's transmit power and/or output power are discussed in one or more parts quoted below:

6.2.4 Configured Transmitted Power

The UE can configure its maximum output power. The configured UE maximum output power $P_{CMAX,f,c}$ for carrier f of a serving cell c is defined as that available to the reference point of a given transmitter branch that corresponds to the reference point of the higher-layer filtered RSRP measurement as specified in TS 38.215 [11].

The configured UE maximum output power $P_{CMAX,f,c}$ for carrier f of a serving cell c shall be set such that the corresponding measured peak EIRP $P_{UMAX,f,c}$ is within the following bounds $$P_{Powerclass} + \Delta P_{IBE} - \text{MAX}(\text{MAX}(MPR_{f,c}, A\text{-}MPR_{f,c}) + \Delta MB_{P,n}, P\text{-}MPR_{f,c}) - \text{MAX}\{T(\text{MAX}(MPR_{f,c}, A\text{-}MPR_{f,c})), T(P\text{-}MPR_{f,c})\} \leq P_{UMAX,f,c} \leq EIRP_{max}$$

while the corresponding measured total radiated power $P_{TMAX,f,c}$ is bounded by $$P_{TMAX,f,c} \leq TRP_{max}$$

with $P_{Powerclass}$ the UE power class as specified in sub-clause 6.2.1, $EIRP_{max}$ the applicable maximum EIRP as specified in sub-clause 6.2.1, $MPR_{f,c}$ as specified in sub-clause 6.2.2, $A\text{-}MPR_{f,c}$ as specified in sub-clause 6.2.3, $\Delta MB_{P,n}$ the peak EIRP relaxation as specified in clause 6.2.1 and $TRP_{max}$ the maximum TRP for the UE power class as specified in sub-clause 6.2.1. $\Delta P_{IBE}$ is 1.0 dB if UE declares support for mpr-PowerBoost-FR2-r16, UL transmission is QPSK, $MPR_{f,c}=0$ and when NS_200 applies and the network configures the UE to operate with mpr-PowerBoost-FR2-r16 otherwise $\Delta P_{IBE}$ is 0.0 dB. $P\text{-}MPR_{f,c}$ is the power management maximum output power reduction.

One, some and/or all of the following terminology and assumptions may be used hereafter.

Base station (BS): a network central unit and/or a network node in New Radio (NR) that is used to control one or more transmission and/or reception points (TRPs) which are associated with one or more cells. Communication between a base station and one or more TRPs may be via fronthaul. Base station may be referred to as central unit (CU), eNB, gNB, and/or NodeB.

TRP: a TRP may provide network coverage and/or may directly communicate with UEs. A TRP may be referred to as distributed unit (DU) and/or network node.

Cell: a cell comprises one or more associated TRPs (e.g., coverage of the cell may comprise coverage of some and/or all associated TRP(s)). One cell may be controlled by one base station. Cell may be referred to as TRP group (TRPG).

In NR Rel-15/16 (NR Releases 15 and/or 16), a UE may perform uplink transmission via one UE panel. In NR Rel-17 (NR Release 17), a UE may perform uplink transmission via multiple UE panels in time division multiplexing (TDM) mechanism (in order to fulfill stringent reliability requirement, for example). For example, the UE may perform uplink transmission via one active UE panel in one timing (e.g., one slot). Through transmission on different UE panels, reliability of the transmission may be improved (and/or the transmission may fulfill more stringent reliability requirements). However, in NR Rel-18 (NR Release 18), with the introduction of more services requiring high data rate, higher rank uplink transmission may be considered. In some implementations, multiple UE panels may be utilized for concurrent (e.g., simultaneous) uplink transmission to provide higher data rate via spatial domain. For example, more than one active UE panel may be used (and/or considered) a given time (e.g., a UE may use multiple active UE panels for an uplink transmission in a given time). Alternatively and/or additionally, services with reliability and latency may also be improved by concurrent (e.g., simultaneous) uplink transmission via different UE panels (e.g., concurrently performing uplink transmission via different UE panels may fulfill more stringent reliability and/or latency requirements). Time-frequency resources for concurrent (e.g., simultaneous) transmissions via the multiple panels may be the same time-frequency resource. Alternatively and/or additionally, the time-frequency resources for concurrent (e.g., simultaneous) transmissions via the multiple panels may have at least partially overlapping time resources and/or at least partially overlapping frequency resources (such as where a time-frequency resource for a transmission via a first panel at least partially overlaps in time domain or frequency domain with a time-frequency resource for a transmission via a second panel). However, concurrent (e.g., simultaneous) uplink transmissions (on one carrier, for example) via more than one UE panel may require enhanced UE capability. Even when a network identifies and/or recognizes that a UE has capability for concurrent (e.g., simultaneous) uplink transmission via more than one UE panel, it may be unclear how, when and/or under which conditions the network may schedule UE to perform concurrent (e.g., simultaneous) uplink transmission via multiple UE panels. Alternatively and/or additionally, how the network can determine (e.g., be aware of) when concurrent (e.g., simultaneous) uplink transmission is not available (such as due to Maximum Possible Exposure (MPE) limitation and/or power limitation) may need further design. Without a proper design, the UE may consider one Downlink Control Information (DCI) scheduling uplink transmission via multiple UE panels to be an inconsistent DCI due to unavailable transmission via multiple UE panels or the UE may consider that the one DCI is scheduling an uplink transmission of one active panel (when the DCI is actually scheduling uplink transmission of multiple UE panels, for example) resulting in different understandings between the network and the UE. Thus, how to align the network and the UE (e.g., how to align understandings of the network and the UE) regarding concurrent (e.g., simultaneous) uplink transmission via multiple UE panels may require further design.

Preferably, a UE is capable of performing concurrent (e.g., simultaneous) uplink transmission via multiple UE panels (e.g., multiple separate and/or different UE panels). The UE may switch from concurrent (e.g., simultaneous) uplink transmission (e.g., concurrent uplink transmission via multiple UE panels) to single uplink transmission (e.g., uplink transmission via one UE panel at a given time). Alternatively and/or additionally, the UE may switch from single uplink transmission (e.g., uplink transmission via one UE panel at a given time) to concurrent (e.g., simultaneous) uplink transmission (e.g., concurrent uplink transmission via multiple UE panels).

In NR, Physical Uplink Shared Channel (PUSCH) transmission may be non-codebook (NCB)-based or codebook (CB)-based. For CB-based PUSCH, a Sounding Reference Signal (SRS) resource set for CB PUSCH may be configured to UE (e.g., the UE may be configured with the SRS resource set for CB PUSCH) and a network may determine uplink channel condition and identify which UE beam is preferred (e.g., strong Reference Signal Received Power (RSRP) and/or less interference) based on measuring SRS in the SRS resource set. In some examples, the UE beam may be selected based on a determination (e.g., a determination based on measuring one or more SRSs in the SRS resource set) that the UE beam has a strong RSRP (e.g., a RSRP that is higher than a threshold and/or higher than other RSRPs of one or more other UE beams) and/or less interference (e.g., less interference than a threshold and/or less interference than one or more other UE beams). The network may schedule CB PUSCH via DCI indicating Transmit Precoding Matrix Index (TPMI) (for indicating precoding in UE side, for example) and SRS Resource Indicator (SRI) (for indicating which beam and/or power related control to use, for example).

For NCB-based PUSCH, an SRS resource set for NCB PUSCH may be configured to UE (e.g., the UE may be configured with the SRS resource set for NCB PUSCH) and a network may determine uplink channel condition and identify which UE beam is preferred (e.g., strong RSRP and/or less interference) based on a Channel State Information (CSI) report of the UE (e.g., a CSI report associated with the UE, such as a CSI report transmitted by the UE). In some examples, the UE beam may be selected based on a determination (e.g., a determination based on the CSI report of the UE) that the UE beam has a strong RSRP (e.g., a RSRP that is higher than a threshold and/or higher than other RSRPs of one or more other UE beams) and/or less interference (e.g., less interference than a threshold and/or less interference than one or more other UE beams). NCB-based PUSCH may be based on downlink/uplink (DL/UL) channel reciprocity. The network may schedule NCB PUSCH via DCI indicating SRI (for indicating which beam and power related control to use, for example). The UE may determine which precoding to use based on a Channel State Information based Reference Signal (CSI-RS) associated with the SRI.

Figure 8:
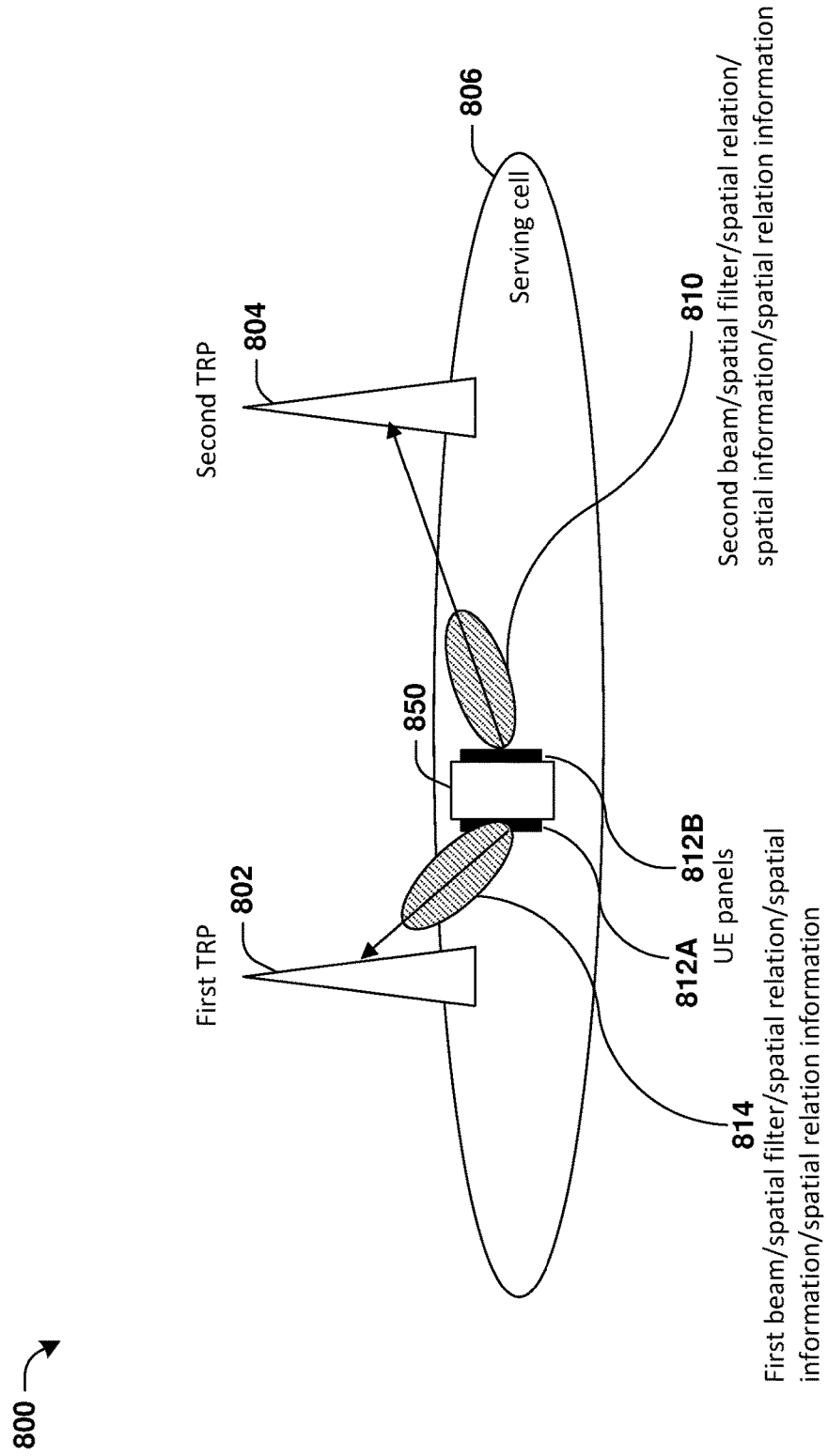
FIG. 8 is a diagram illustrating an exemplary scenario associated with a UE communicating with Transmission and/or Reception Points (TRPs) according to one exemplary embodiment.

In some examples, a UE may communicate with a plurality of TRPs comprising a first TRP and a second TRP. FIG. 8 illustrates a scenario 800 in which the UE (shown with reference number 850) communicates with the first TRP (shown with reference number 802) and the second TRP (shown with reference number 804) in a serving cell 806 (e.g., a single serving cell). For example, in the scenario 800, the first TRP 802 and the second TRP 804 may both be in the serving cell 806.

Figure 9:
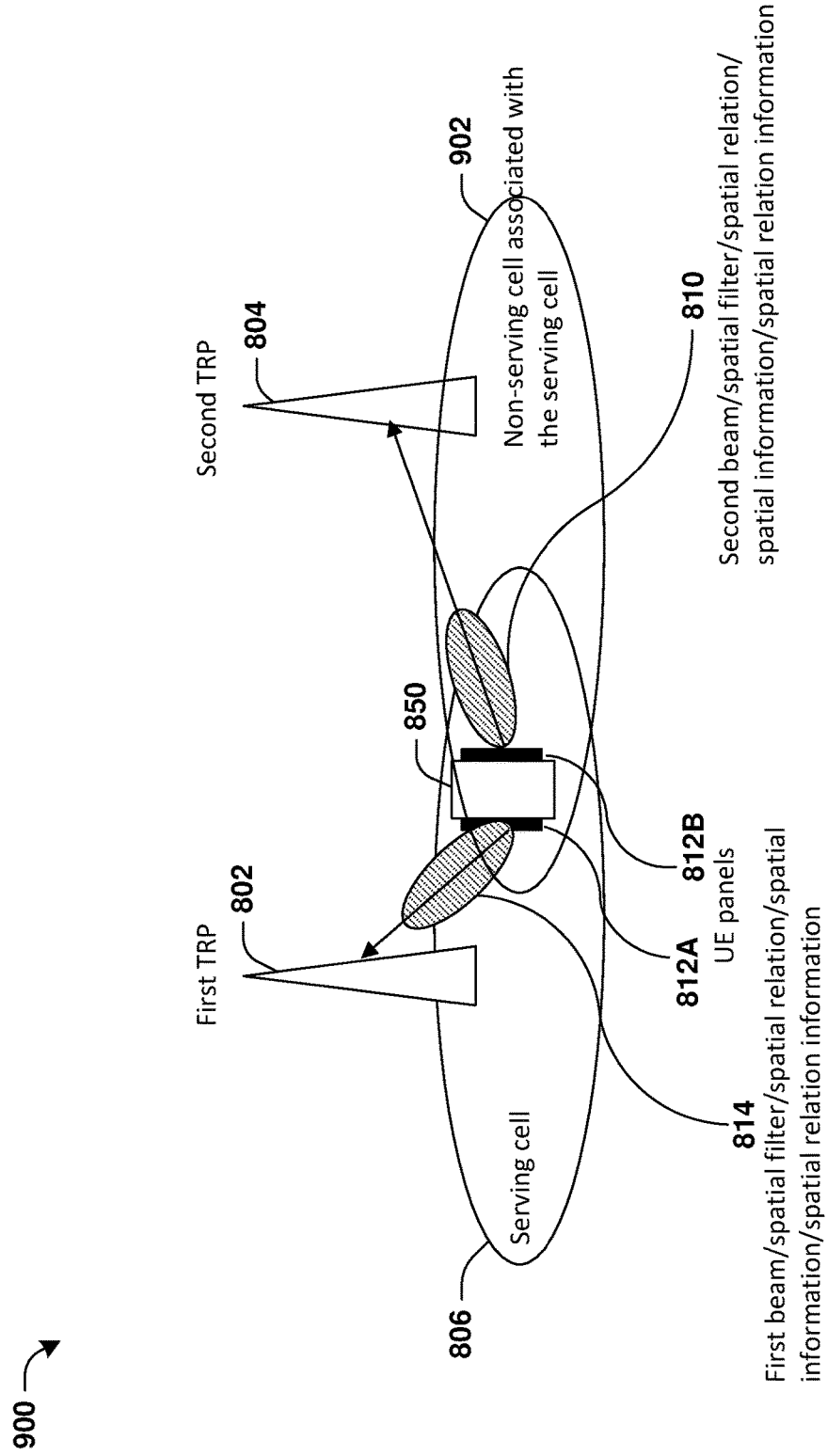
FIG. 9 is a diagram illustrating an exemplary scenario associated with a UE communicating with TRPs according to one exemplary embodiment.

FIG. 9 illustrates a scenario 900 in which the UE 850 communicates with the first TRP 802 and the second TRP 804, wherein the first TRP 802 is in the serving cell 806 and the second TRP 804 is in a cell 902, such as a non-serving cell and/or a neighbor cell. For example, rather than both the first TRP 802 and the second TRP 804 being in the serving cell 806 (such as shown in the scenario 800 of FIG. 8), the first TRP 802 and the second TRP 804 may be in different cells in the scenario 900.

In some examples, such as in the scenario 800 shown in FIG. 8 and in the scenario 900 shown in FIG. 9, the UE 850 may communicate with the first TRP 802 via a first UE panel 812A and/or the UE 850 may communicate with the second TRP 804 via a second UE panel 812B. In some examples, communication between the first TRP 802 and the UE 850 may be via a first beam/spatial filter/spatial relation/spatial information/spatial relation information 814. In the present disclosure, the term "beam/spatial filter/spatial relation/spatial information/spatial relation information" may correspond to a beam, a spatial filter, a spatial relation, spatial information and/or spatial relation information. In some examples, communication between the second TRP 804 and the UE 850 may be via a second beam/spatial filter/spatial relation/spatial information/spatial relation information 810.

In some examples, such as in the scenario 800 shown in FIG. 8 and in the scenario 900 shown in FIG. 9, the UE may perform (e.g., transmit) a first uplink transmission via the first beam/spatial filter/spatial relation/spatial information/spatial relation information 814 (e.g., the first uplink transmission may be transmitted to the first TRP 802). In some examples, the UE may perform (e.g., transmit) a second uplink transmission via the second beam/spatial filter/spatial relation/spatial information/spatial relation information 810 (e.g., the second uplink transmission may be transmitted to the second TRP 804). The first uplink transmission and the second uplink transmission may be performed (e.g., transmitted by the UE) concurrently (e.g., simultaneously).

First Concept

The first concept of the present disclosure is that a UE triggers transmission and/or generation of a power-related report (e.g., the UE is triggered to transmit and/or generate the power-related report) based on (e.g., in response to) a first set of conditions (e.g., a first set of one or more conditions), such as based on (e.g., in response to) a determination that the first set of conditions is met. In some examples, the UE initiates a procedure for generating the power-related report based on the first set of conditions, such as based on a determination that the first set of conditions is met. In some examples, the UE does not trigger transmission and/or generation of the power-related report if the first set of conditions is not met (e.g., the UE may not transmit and/or generate the power-related report if the first set of conditions is not met). In some examples, the UE does not initiate a procedure for generating the power-related report if the first set of conditions is not met. In some examples, a power-related report may be triggered by power headroom report procedure (such as a power headroom report procedure according to in 3GPP TS 38.321 V16.5.0). In some examples, content of the power-related report may be different than power headroom report procedure in 3GPP TS 38.321 V16.5.0.

In some examples, the first set of conditions comprises a first condition that a power level of the UE is larger than a threshold. The power level may correspond to a transmit power of the UE. In the present disclosure, the term "transmit power" corresponds to a transmit power (of the UE, for example) and/or an output power (of the UE, for example), such as a transmit power (and/or output power) of one or more uplink transmissions of the UE. In some examples, the power level may correspond to a combination (e.g., a sum and/or total of) of multiple transmit powers of the UE (e.g., multiple transmit powers for multiple transmissions). In some examples, the power level (e.g., the transmit power of the UE) may be determined based on (e.g., derived from) multiple (e.g., two) UE panels of the UE. In some examples, the power level (e.g., the transmit power of the UE) may be determined based on (e.g., derived from) multiple (e.g., two) uplink channels/signals (e.g., two uplink channels/signals that are transmitted concurrently, such as simultaneously). For example, a transmit power of the multiple transmit powers may correspond to a transmit power of an uplink channel/signal of the multiple (e.g., two) uplink channels/signals. In the present disclosure, the term "channel/signal" may correspond to a channel and/or a signal. In some examples, the power level (e.g., the transmit power of the UE) may be determined based on (e.g., derived from) a combination (e.g., a sum and/or total) of transmit powers of the multiple (e.g., two) uplink channels/signals (such as in units of dBm (decibel-milliwatts) or in units of watt). In some examples, the UE transmits the multiple (e.g., two) uplink channels/signals via the multiple (e.g., two) UE panels of the UE. In some examples, the UE transmits the multiple (e.g., two) uplink channels/signals via multiple (e.g., two) beams/spatial filters/spatial relations/spatial information sets/spatial relation information sets of the UE. In some examples, the UE transmits a first uplink channel/signal of the multiple (e.g., two) uplink channels/signals via a first beam/spatial filter/spatial relation/spatial information/spatial relation information (of the UE) that is associated with and/or QCLed to Synchronization Signal Block (SSB) of a first cell. In some examples, the UE transmits a second uplink channel/signal of the multiple (e.g., two) uplink channels/signals via a second beam/spatial filter/spatial relation/spatial information/spatial relation information (of the UE) that is associated with and/or QCLed to SSB of a second cell (e.g., the first beam/spatial filter/spatial relation/ spatial information/spatial relation information is different than the second beam/spatial filter/spatial relation/spatial information/spatial relation information). In some examples, the first cell is different than the second cell. In some examples, the first cell is a serving cell (of the UE) and the second serving cell is a neighboring cell (e.g., a non-serving cell of the UE) associated with the first cell. In some examples, the multiple (e.g., two) uplink channels/signals are transmitted on a carrier and/or a cell.

In some examples, the power level of the UE is determined without and/or before power reduction (e.g., if power reduction is performed to transmit an uplink channel/signal of the multiple uplink channels/signals, the power reduction may not be considered). For example, for an uplink channel/signal of the multiple (e.g., two) uplink channels/signals (and/or for each uplink channel/signal of the multiple uplink channels/signals), a transmit power is determined (e.g., derived) without and/or before power reduction (where the power level of the UE may be determined based on the transmit power that is determined without power reduction). In some examples, a transmit power of the multiple transmit powers may be determined without and/or before power reduction (e.g., the power reduction, such as power reduction of an uplink channel/signal of the multiple uplink channels/signals, may not be considered in determining the transmit power).

In some examples, the threshold is a maximum transmit power of the UE. In some examples, the threshold is 23 dBm (or other value). In some examples, the threshold is based on a power class of the UE.

In some examples, the first set of conditions comprises a second condition that a pathloss variation parameter associated with the UE is larger than a first variation threshold. In some examples, the pathloss variation parameter may correspond to a pathloss variation (e.g., pathloss change) of the UE. In the present disclosure, the term "pathloss variation" may refer to and/or be used interchangeably with "pathloss change" (and/or the term "pathloss estimate variation" may refer to and/or be used interchangeably with "pathloss estimate change"). In some examples, the pathloss variation parameter corresponds to a combination (e.g., a sum and/or total of) multiple (e.g., two) pathloss variations (e.g., pathloss estimate variations). The first variation threshold may be phr-Tx-simu-PowerFactorChange or phr-Tx-PowerFactorChange. In some examples, the UE may be configured with the first variation threshold if the UE indicates, to the network, information associated with capability of supporting concurrent (e.g., simultaneous) uplink transmissions (e.g., the network may configure the UE with the first variation threshold in response to a determination, based on the information received from the UE, that the UE is capable of supporting concurrent uplink transmissions). In some examples, a pathloss variation (e.g., one pathloss variation) of the multiple pathloss variations (e.g., pathloss estimate variations) is an absolute value (and/or may be an integer). In some examples, a pathloss variation (e.g., one pathloss variation) of the multiple pathloss variations (e.g., pathloss estimate variations) can be a positive or negative value.

In an example, the multiple (e.g., two) pathloss variations comprise a first pathloss variation (e.g., a first pathloss estimate variation) and a second pathloss variation (e.g., a second pathloss estimate variation). In some examples, the first pathloss variation and the second pathloss variation are not larger than a second variation threshold (e.g., phr-Tx-PowerFactorChange). Alternatively and/or additionally, the first pathloss variation is not larger than the second variation threshold (e.g., a first instance of phr-Tx-PowerFactorChange) and the second pathloss variation is not larger than a third variation threshold (e.g., a second instance of phr-Tx-PowerFactorChange different than the first instance of phr-Tx-PowerFactorChange). In some examples, since each pathloss variation of the multiple (e.g., two) pathloss variations is not larger than a corresponding variation threshold (e.g., since the multiple pathloss variations are not larger than the second variation threshold, and/or since the first pathloss variation is not larger than the second variation threshold and the second pathloss variation is not larger than the third variation threshold), the UE does not trigger a power-related report. However, a total power for concurrent (e.g., simultaneous) uplink transmissions may be too large due to a combination (e.g., sum and/or total) of compensation of multiple pathlosses (associated with the concurrent uplink transmissions, for example). Based on the second condition (e.g., based on a determination that the second condition is met), the UE may trigger transmission of a power-related report (e.g., the UE is triggered to transmit the power-related report). In some examples, the power-related report may assist network to adjust and/or to determine (e.g., judge) whether or not to schedule concurrent (e.g., simultaneous) uplink transmissions (for the UE). Accordingly, in some examples, even though the multiple pathloss variations may not individually exceed a corresponding threshold (such that the UE is not triggered to generate and/or transmit a power-related report based on an individual pathloss variation of the multiple pathloss variations), the UE may trigger generation and/or transmission of a power-related report based on a determination that the pathloss variation parameter is larger than the first variation threshold (thereby enabling the network to more accurately determine whether or not to schedule concurrent uplink transmissions for the UE). In some examples, the first variation threshold (e.g., phr-Tx-simu-PowerFactorChange) is larger than the second variation threshold and/or the third variation threshold.

Figure 10:
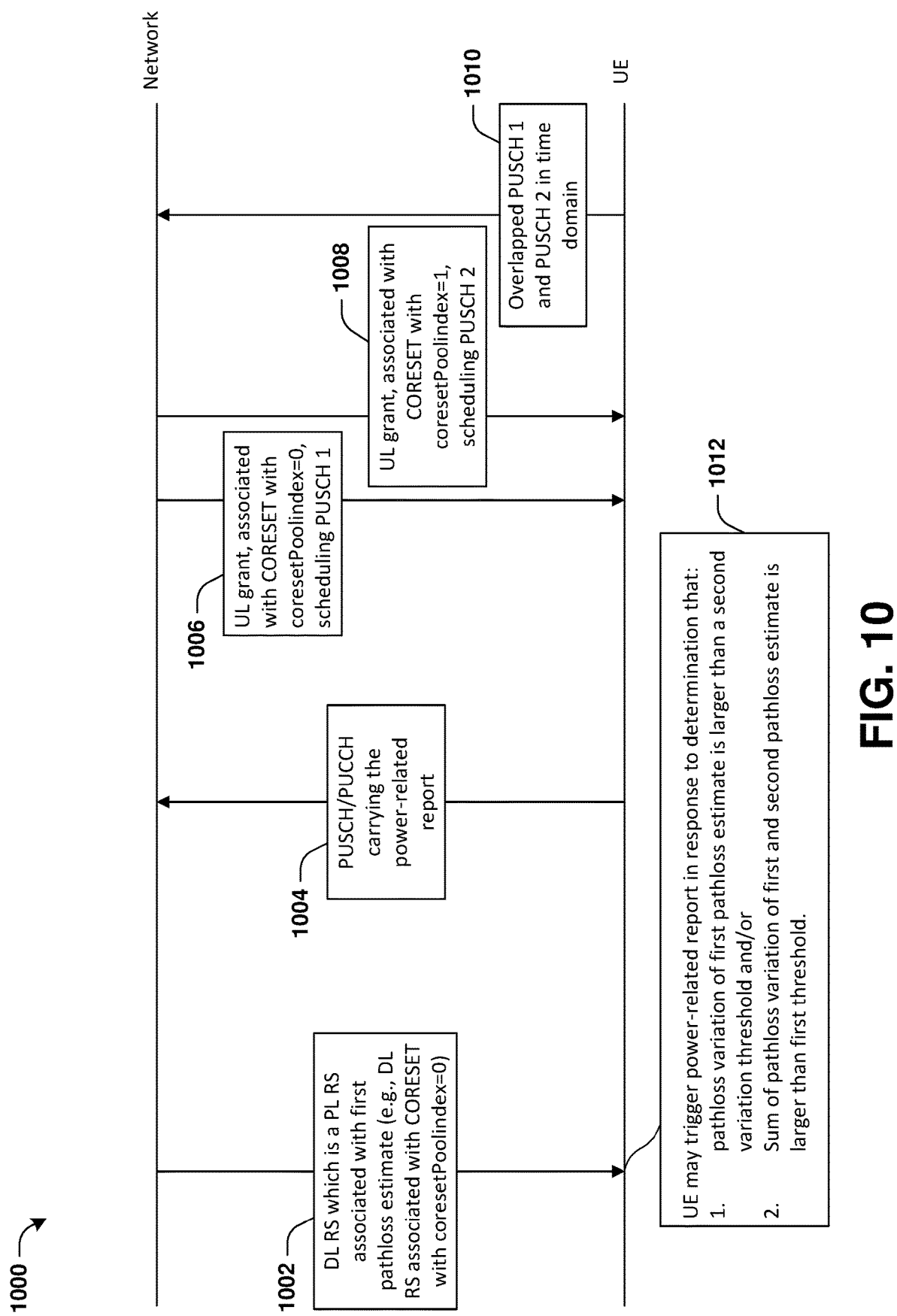
FIG. 10 is a diagram illustrating an exemplary scenario associated with a UE and a network according to one exemplary embodiment.

FIG. 10 illustrates a scenario 1000 associated with a UE according to some embodiments. In the scenario 1000, the UE may be configured with coresetPoolIndex for one or more Control Resource Sets (CORESETs). In the scenario 1000, the UE may maintain a first pathloss estimate associated with coresetPoolIndex=0/first TRP (e.g., the first pathloss estimate may be associated with a first CORESET with coresetPoolIndex=0 and/or the first TRP) and a second pathloss estimate associated with coresetPoolIndex=1/second TRP (e.g., the second pathloss estimate may be associated with a second CORESET with coresetPoolIndex=1 and/or the second TRP). The UE may determine (e.g., derive) a pathloss variation (e.g., pathloss value change) based on a downlink reference signal (DL RS) 1002 that is a pathloss reference signal (PL RS). If a pathloss variation of the first pathloss estimate is larger than the second variation threshold and/or if a combination (e.g., sum and/or total) of pathloss variations of the first pathloss estimate and the second pathloss estimate is larger than the first variation threshold, the UE may trigger 1012 generation and/or transmission of a power-related report (e.g., the UE may transmit the power-related report to a network). For example, the UE may transmit a channel/signal 1004 (e.g., a PUSCH and/or Physical Uplink Control Channel (PUCCH)), comprising the power-related report, to the network. The network may determine, based on the power-related report, whether or not to schedule concurrent (e.g., simultaneous) uplink transmissions. In the scenario 1000, the network may transmit an UL grant 1006 in CORESET with coresetPoolIndex=0 for scheduling PUSCH 1 and may transmit an UL grant 1008 in CORESET with coresetPoolIndex=1 for scheduling PUSCH 2. In some examples, PUSCH 1 and PUSCH 2 comprise (and/or are) one or more symbols overlapped in time domain. In some examples, the UE may transmit PUSCH 1 and PUSCH 2 concurrently (e.g., simultaneously) (via transmission 1010, for example).

Figure 11:
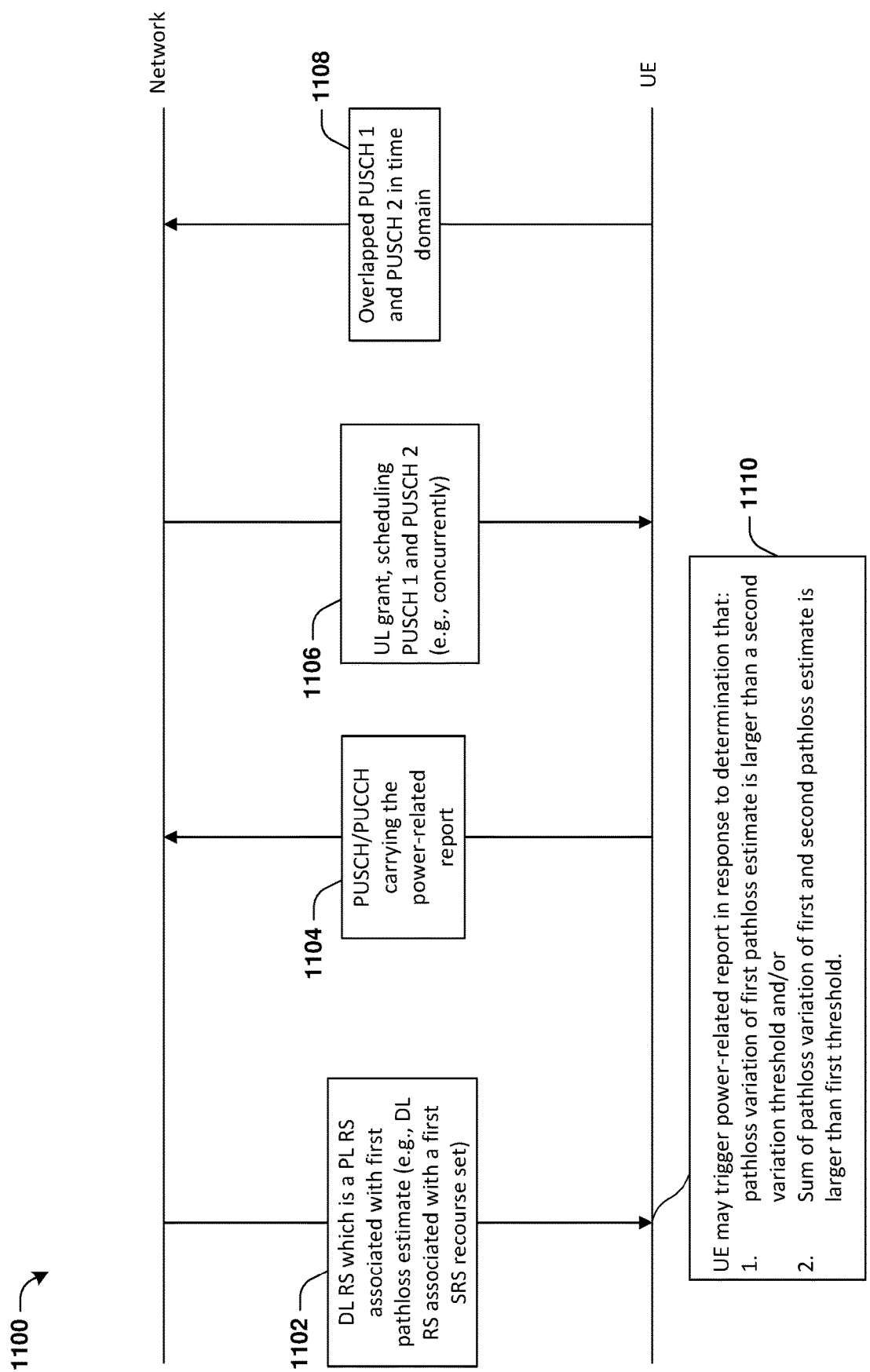
FIG. 11 is a diagram illustrating an exemplary scenario associated with a UE and a network according to one exemplary embodiment.

FIG. 11 illustrates a scenario 1100 associated with a UE according to some embodiments. In the scenario 1100, the UE may be configured with multiple (e.g., two) SRS resource sets comprising a first SRS resource set and a second SRS resource set. The first SRS resource set is associated with a first pathloss estimate. The second SRS resource set is associated with a second pathloss estimate. In the scenario 1100, the UE may determine (e.g., derive) a pathloss variation (e.g., pathloss value change) based on a DL RS 1102 that is a PL RS. If a pathloss variation of the first pathloss estimate is larger than the second variation threshold and/or if a combination (e.g., sum and/or total) of pathloss variations of the first pathloss estimate and the second pathloss estimate is larger than the first variation threshold, the UE may trigger 1110 generation and/or transmission of a power-related report (e.g., the UE may transmit the power-related report to a network). For example, the UE may transmit a channel/signal 1104 (e.g., a PUSCH and/or PUCCH), comprising the power-related report, to the network. The network may determine, based on the power-related report, whether or not to schedule concurrent (e.g., simultaneous) uplink transmissions (for the UE, for example). In the scenario 1100, the network may transmit an UL grant 1106 scheduling PUSCH 1 and PUSCH 2. In some examples, PUSCH 1 and PUSCH 2 comprise (and/or are) one or more symbols overlapped in time domain. In some examples, the UE may transmit PUSCH 1 and PUSCH 2 concurrently (e.g., simultaneously) (via transmission 1108, for example).

In some examples, UE may maintain multiple pathloss estimates for a serving cell, wherein the multiple pathloss estimates may have at most a number of pathloss estimates (for the serving cell). In some examples, the multiple pathloss estimates may comprise a first pathloss estimate and a second pathloss estimate.

In some examples, the first pathloss estimate and the second pathloss estimate are used to control concurrent (e.g., simultaneous) transmission of multiple (e.g., two) uplink channels/signals.

In some examples, for the first pathloss estimate, the UE determines a first pathloss variation based on a pathloss measured at a present time on a current pathloss reference and a pathloss measured at a transmission time of a last transmission of power-related report on a pathloss reference in use at the transmission time of the last transmission.

In some examples, for the second pathloss estimate, the UE determines a second pathloss variation based on a second pathloss measured at a present time on a current pathloss reference and a second pathloss measured at a transmission time of a last transmission of power-related report on a pathloss reference in use at the transmission time of the last transmission.

In some examples, the last transmission of power-related report may be associated with a report that is associated with and/or triggered based on the first variation threshold.

In some examples, the last transmission of power-related report may be associated with a report that is associated with and/or triggered based on the first variation threshold, the second variation threshold and/or the third variation threshold.

In an example, the number of pathloss estimates for the serving cell (e.g., the maximum number of pathloss estimates of the multiple pathloss estimates for the serving cell) is 4. In some examples, the second condition is a condition that a combination of multiple (e.g., two) pathloss variations (e.g., pathloss estimate variations), such as any two pathloss variations, is larger than the first variation threshold (e.g., phr-Tx-simu-PowerFactorChange).

In some examples, the first pathloss estimate is associated with a first TRP.

In some examples, the second pathloss estimate is associated with a second TRP.

In some examples, the first pathloss estimate is associated with a first UE panel.

In some examples, the second pathloss estimate is associated with a second UE panel.

In some examples, the first pathloss estimate is associated with DL RS associated with and/or transmitted from a first TRP.

In some examples, the second pathloss estimate is associated with DL RS associated with and/or transmitted from a second TRP.

In some examples, the first pathloss estimate is associated with a first SRS resource (e.g., a first SRS resource set).

In some examples, the second pathloss estimate is associated with a second SRS resource (e.g., a second resource set).

In some examples, the first SRS resource (e.g., the first SRS resource set) is associated with the first TRP.

In some examples, the second SRS resource (e.g., the second SRS resource set) is associated with the second TRP.

In some examples, the first pathloss estimate is associated with a reference signal (RS) associated with CORESET with coresetPoolIndex=0.

In some examples, the second pathloss estimate is associated with a RS associated with CORESET with coresetPoolIndex=1.

In some examples, a pathloss (e.g., a pathloss estimate), such as one pathloss (e.g., one pathloss estimate) is determined based on DL RS and/or PL RS.

In some examples, a pathloss (e.g., a pathloss estimate), such as one pathloss (e.g., one pathloss estimate) is determined based on a difference between Layer 3-RSRP (L3-RSRP) (from DL RS and/or PL RS) and a reference power (known and aligned between network and UE). The reference power may be determined by the network and the network configures to the UE (e.g., the network may configure the UE with the reference power, such as by transmitting an indication of the reference power to the UE).

In some examples, Layer 1-RSRP (L1-RSRP) is determined based on DL RS and/or PL RS without applying L3 filter and/or without long term average.

In some examples, L3-RSRP is determined based on DL RS and/or PL RS with applying L3 filter and/or with long term average.

In some examples, the UE transmits the multiple (e.g., two) uplink channels/signals via multiple (e.g., two) UE panels of the UE. In some examples, the UE transmits the multiple (e.g., two) uplink channels/signals via multiple (e.g., two) beams/spatial filters/spatial relations/spatial information sets/spatial relation information sets of the UE. In some examples, the multiple (e.g., two) uplink channels/signals are transmitted on a carrier.

In some examples, the first set of conditions comprises a third condition that a pathloss parameter associated with the UE is larger than a first pathloss threshold (e.g., pathloss estimate threshold). In some examples, the pathloss parameter may correspond to a pathloss (e.g., pathloss estimate) of the UE. In some examples, the pathloss parameter corresponds to a combination (e.g., a sum and/or total of) multiple (e.g., two) pathlosses (e.g., pathloss estimates). In some examples, the UE may be configured with the first pathloss threshold if the UE indicates, to the network, information associated with capability of supporting concurrent (e.g., simultaneous) uplink transmissions (e.g., the network may configure the UE with the first pathloss threshold in response to a determination, based on the information received from the UE, that the UE is capable of supporting concurrent uplink transmissions, such as simultaneous uplink transmissions). In some examples, the multiple (e.g., two) pathlosses (e.g., pathloss estimates) may comprise a first pathloss (e.g., a first pathloss estimate) and a second pathloss (e.g., a second pathloss estimate). In some examples, the first pathloss is based on a DL RS and/or PL RS associated with a first TRP. In some examples, the second pathloss is based on a DL RS and/or PL RS associated with a second TRP. In some examples, the first pathloss is based on a reference power associated with the DL RS and/or the PL RS associated with the first TRP. In some examples, the second pathloss is based on a reference power associated with the DL RS and/or the PL RS associated with the second TRP.

In some examples, the UE transmits the multiple (e.g., two) uplink channels/signals via multiple (e.g., two) UE panels of the UE. In some examples, the UE transmits the multiple (e.g., two) uplink channels/signals via multiple (e.g., two) beams/spatial filters/spatial relations/spatial information sets/spatial relation information sets of the UE. In some examples, the multiple (e.g., two) uplink channels/signals are transmitted on a carrier.

In some examples, the first set of conditions comprises a fourth condition that one or more RSRP parameters are smaller than a threshold. The one or more RSRP parameters may comprise (i) L1-RSRP for at least one UE panel of the UE (e.g., the fourth condition may be met if a L1-RSRP of at least one UE panel of the UE is smaller than the threshold); (ii) L3-RSRP for at least one UE panel of the UE (e.g., the fourth condition may be met if a L3-RSRP of at least one UE panel of the UE is smaller than the threshold); (iii) L1-RSRP for two UE panels (and/or all UE panels) of the UE (e.g., the fourth condition may be met if L1-RSRP of two UE panels and/or all UE panels of the UE is smaller than the threshold); and/or (iv) L3-RSRP for two UE panels (and/or all UE panels) of the UE (e.g., the fourth condition may be met if L3-RSRP of two UE panels and/or all UE panels of the UE is smaller than the threshold). In some examples, the L1-RSRP and/or L3-RSRP may be determined (e.g., derived) based on multiple (e.g., two) downlink channels/signals associated with multiple (e.g., two) uplink channels/signals (e.g., two uplink channels/signals that are transmitted concurrently, such as simultaneously). In some examples, the threshold is a received signal strength of the UE.

In some examples, the first set of conditions comprises a fifth condition that a combination (e.g., sum and/or total) of L1-RSRPs for two UE panels of the UE (and/or all UE panels of the UE) is smaller than a threshold. In some examples, the L1-RSRP is determined (e.g., derived) based on multiple (e.g., two) downlink channels/signals associated with multiple (e.g., two) uplink channels/signals (e.g., two uplink channels/signals that are transmitted concurrently, such as simultaneously). In some examples, the threshold is a received signal strength of the UE.

In some examples, the first set of conditions comprises a sixth condition that a combination (e.g., sum and/or total) of L3-RSRPs for two UE panels of the UE (and/or all UE panels of the UE) is smaller than a threshold. In some examples, the L3-RSRP is determined (e.g., derived) based on multiple (e.g., two) downlink channels/signals associated with multiple (e.g., two) uplink channels/signals (e.g., two uplink channels/signals that are transmitted concurrently, such as simultaneously). In some examples, the threshold is a received signal strength of the UE.

In some examples, the UE transmits the multiple (e.g., two) uplink channels/signals via multiple (e.g., two) UE panels of the UE. In some examples, the UE transmits the multiple (e.g., two) uplink channels/signals via multiple (e.g., two) beams/spatial filters/spatial relations/spatial information sets/spatial relation information sets of the UE. In some examples, the multiple (e.g., two) uplink channels/signals are transmitted on a carrier.

In some examples, the first set of conditions comprises a seventh condition that a number of L1-RSRPs or L3-RSRPs (e.g., consecutive L1-RSRPs or L3-RSRPs), for a UE panel (e.g., one UE panel) of multiple (e.g., two) UE panels of the UE, that are smaller than a RSRP threshold is larger than a counting threshold. For example, the number of L1-RSRPs or L3-RSRPs may correspond to a count of L1-RSRPs or L3-RSRPs (for the UE panel) that are smaller than the RSRP threshold. In some examples, the UE may maintain a counter for maintaining (e.g., counting) the count of L1-RSRPs or L3-RSRPs (e.g., consecutive L1-RSRPs or L3-RSRPs), for the UE panel, that are smaller than the RSRP threshold. In some examples, the UE may increment the counter (e.g., increase the counter by one) when detecting one (consecutive) L1-RSRP or L3-RSRP for a UE panel (e.g., one UE panel) of the multiple (e.g., two) UE panels of the UE being smaller than the RSRP threshold. In some examples, value of the counter being larger than the counting threshold may cause the seventh condition (for triggering the power-related report, for example) to be met.

In some examples, the first set of conditions comprises an eighth condition that a number of L1-RSRPs or L3-RSRPs (e.g., consecutive L1-RSRPs or L3-RSRPs), for two UE panels (e.g., all UE panels) of multiple (e.g., two) UE panels of the UE, that are smaller than a RSRP threshold is larger than a counting threshold. For example, the number of L1-RSRPs or L3-RSRPs may correspond to a count of L1-RSRPs or L3-RSRPs (for the two UE panels of the UE) that are smaller than the RSRP threshold. In some examples, the UE may maintain a counter for maintaining (e.g., counting) the count of L1-RSRPs or L3-RSRPs (e.g., consecutive L1-RSRPs or L3-RSRPs), for the two UE panels, that are smaller than the RSRP threshold. In some examples, the UE may increment the counter (e.g., increase the counter by one) when detecting one (consecutive) L1-RSRP or L3-RSRP for both UE panels of the multiple (e.g., two) UE panels of the UE being smaller than the RSRP threshold. In some examples, value of the counter being larger than the counting threshold may cause the eighth condition (for triggering the power-related report, for example) to be met. For example, the eighth condition may be met when the value of the counter is larger than the counting threshold. In some examples, the UE may determine (e.g., derive) two L3-RSRPs based on two PL RSs (e.g., first L3-RSRP, second L3-RSRP). In some examples, the UE may increment the counter (e.g., increase the counter by one) if a first L3-RSRP of the two RSRPs and/or a second L3-RSRP of the two RSRPs is smaller than the RSRP threshold. In some examples, the UE may set the counter to zero if both the first L3-RSRP and the second L3-RSRP are larger than or equal to the RSRP threshold.

In some examples, the first set of conditions comprises a ninth condition that a first number of L1-RSRPs or L3-RSRPs (e.g., consecutive L1-RSRPs or L3-RSRPs) for a first UE panel of the UE and/or a second number of L1-RSRPs or L3-RSRPs (e.g., consecutive L1-RSRPs or L3-RSRPs) for a second UE panel of the UE are larger than a counting threshold. For example, the first number of L1-RSRPs or L3-RSRPs may correspond to a count of L1-RSRPs or L3-RSRPs (for the first UE panel) that are smaller than the RSRP threshold. The second number of L1-RSRPs or L3-RSRPs may correspond to a count of L1-RSRPs or L3-RSRPs (for the second UE panel) that are smaller than the RSRP threshold. In an example, the UE may maintain the first counter and the second counter separately (e.g., for each UE panel of the UE, the UE may maintain a counter corresponding to a number of L1-RSRPs or L3-RSRPs that are smaller than the RSRP threshold). In some examples, the UE may increment the first counter (e.g., increase the first counter by one) when detecting one (consecutive) L1-RSRP or L3-RSRP for the first UE panel being smaller than the RSRP threshold. In some examples, the UE may increment the second counter (e.g., increase the second counter by one) when detecting one (consecutive) L1-RSRP or L3-RSRP for the second UE panel being smaller than the RSRP threshold. In some examples, value of the first counter and/or value of the second counter being larger than the counting threshold may cause the ninth condition (for triggering the power-related report, for example) to be met. For example, the ninth condition may be met when the value of the first counter and/or the value of the second counter is larger than the counting threshold. In some examples, counting threshold may be different for different UE panels. In some examples, RSRP threshold may be different for different UE panels.

In some examples, with respect to one or more embodiments herein (such as embodiments discussed with respect to the seventh condition, the eighth condition and/or the ninth condition), a number of L1-RSRPs or L3-RSRPs (e.g., a number of consecutive L1-RSRPs or L3-RSRPs) corresponds to a number of L1-RSRPs or L3-RSRPs that are associated with a first serving cell. In some examples, L1-RSRP or L3-RSRP associated with the first serving cell may be L1-RSRP or L3-RSRP determined based on (e.g., measured and/or derived from) DL RS transmitted via the first serving cell and/or from the first serving cell. In some examples, L1-RSRP or L3-RSRP associated with the first serving cell does not comprise L1-RSRP or L3-RSRP determined based on (e.g., measured and/or derived from) DL RS transmitted via a serving cell other than the first serving cell. In some examples, the L1-RSRP or L3-RSRP associated with the first serving cell may be L1-RSRP or L3-RSRP determined based on (e.g., measured and/or derived from) one or more DL RSs transmitted via the first serving cell or determined based on (e.g., measured and/or derived from) one or more DL RSs transmitted via a second cell that is a non-serving cell and/or a neighboring cell. In some examples, the one or more DL RS transmitted via the second cell may be associated with SSB in the second cell and/or may be (type-D) QCLed to SSB of the second cell. In some examples, the first serving cell may comprise a first TRP and a second TRP. In some examples, the second cell is associated with the first serving cell. In some examples, the UE may perform transmission and/or reception via beam/spatial filter/spatial relation/spatial information/spatial relation information that is associated with SSB in the second cell and/or that is (type-D) QCLed to SSB in the second cell (in addition to SSB in the first serving cell, for example). For example, the second cell being associated with the first serving cell may correspond to the UE performing transmission and/or reception via beam/spatial filter/spatial relation/spatial information/spatial relation information that is associated with SSB in the second cell and/or that is (type-D) QCLed to SSB in the second cell (in addition to SSB in the first serving cell, for example).

In some examples, the two PL RSs are associated with multiple (e.g., two) uplink channels/signals (e.g., two uplink channels/signals that are transmitted concurrently, such as simultaneously).

In some examples, the UE may be configured with a first set of reference signals (RSs) (e.g., DL RSs) associated with a first TRP. In some examples, the UE may be configured with a second set of RSs (e.g., DL RSs) associated with a second TRP. In some examples, one, some and/or all RSs in the first set of RSs is for L1-RSRP or L3-RSRP determination (e.g., L1-RSRP or L3-RSRP measurement). In some examples, one, some and/or all RSs in the second set of RSs is for L1-RSRP or L3-RSRP determination (e.g., L1-RSRP or L3-RSRP measurement). In some examples, the UE may determine (e.g., implicitly determine) L1-RSRP or L3-RSRP based on demodulation reference signal (DMRS) for CORESET and/or DMRS for PDSCH.

In some examples, the first set of conditions comprises a tenth condition that a number of L1-RSRPs or L3-RSRPs (e.g., a number of consecutive L1-RSRPs or L3-RSRPs), from one or more RSs in the first set of RSs, that are smaller than a RSRP threshold is larger than a counting threshold. For example, it may be determined that the tenth condition (for triggering the power-related report, for example is met if the UE determines (e.g., detects) that the number of L1-RSRPs or L3-RSRPs (e.g., the number of consecutive L1-RSRPs or L3-RSRPs) is larger than the counting threshold. In some examples, the tenth condition (for triggering the power-related report, for example) is not met if the number of L1-RSRPs or L3-RSRPs (e.g., the number of consecutive L1-RSRPs or L3-RSRPs) is not larger than the counting threshold and/or if the UE does not detect that the number of L1-RSRPs or L3-RSRPs (e.g., the number of consecutive L1-RSRPs or L3-RSRPs) is larger than the counting threshold).

In some examples, the first set of conditions comprises an eleventh condition that a number of L1-RSRPs or L3-RSRPs (e.g., a number of consecutive L1-RSRPs or L3-RSRPs), from one or more RSs in the second set of RSs, that are smaller than a RSRP threshold is larger than a counting threshold. For example, it may be determined that the eleventh condition (for triggering the power-related report, for example is met if the UE determines (e.g., detects) that the number of L1-RSRPs or L3-RSRPs (e.g., the number of consecutive L1-RSRPs or L3-RSRPs) is larger than the counting threshold. In some examples, the eleventh condition (for triggering the power-related report, for example) is not met if the number of L1-RSRPs or L3-RSRPs (e.g., the number of consecutive L1-RSRPs or L3-RSRPs) is not larger than the counting threshold and/or if the UE does not detect that the number of L1-RSRPs or L3-RSRPs (e.g., the number of consecutive L1-RSRPs or L3-RSRPs) is larger than the counting threshold).

In some examples, the first set of conditions comprises a twelfth condition that a number of L1-RSRPs or L3-RSRPs (e.g., a number of consecutive L1-RSRPs or L3-RSRPs), from one or more RSs in the first set of RSs and one or more RSs in the second set of RSs, that are smaller than a RSRP threshold is larger than a counting threshold. For example, it may be determined that the twelfth condition (for triggering the power-related report, for example is met if the UE determines (e.g., detects) that the number of L1-RSRPs or L3-RSRPs (e.g., the number of consecutive L1-RSRPs or L3-RSRPs) is larger than the counting threshold. In some examples, the twelfth condition (for triggering the power-related report, for example) is not met if the number of L1-RSRPs or L3-RSRPs (e.g., the number of consecutive L1-RSRPs or L3-RSRPs) is not larger than the counting threshold and/or if the UE does not detect that the number of L1-RSRPs or L3-RSRPs (e.g., the number of consecutive L1-RSRPs or L3-RSRPs) is larger than the counting threshold).

In some examples, the first set of conditions comprises a thirteenth condition that a number of L1-RSRPs or L3-RSRPs (e.g., a number of consecutive L1-RSRPs or L3-RSRPs), from one or more RSs in the first set of RSs or one or more RSs in the second set of RS s, that are smaller than a RSRP threshold is larger than a counting threshold. For example, it may be determined that the thirteenth condition (for triggering the power-related report, for example is met if the UE determines (e.g., detects) that the number of L1-RSRPs or L3-RSRPs (e.g., the number of consecutive L1-RSRPs or L3-RSRPs) is larger than the counting threshold. In some examples, the thirteenth condition (for triggering the power-related report, for example) is not met if the number of L1-RSRPs or L3-RSRPs (e.g., the number of consecutive L1-RSRPs or L3-RSRPs) is not larger than the counting threshold and/or if the UE does not detect that the number of L1-RSRPs or L3-RSRPs (e.g., the number of consecutive L1-RSRPs or L3-RSRPs) is larger than the counting threshold).

In some examples, the first set of conditions comprises a fourteenth condition that a number of pathlosses (e.g., consecutive pathlosses), for a UE panel (e.g., one UE panel) of multiple (e.g., two) UE panels of the UE, that are larger than a pathloss threshold is larger than a counting threshold. For example, the number of pathlosses may correspond to a count of pathlosses (for the UE panel) that are larger than the pathloss threshold. In some examples, the UE may maintain a counter for maintaining (e.g., counting) the count of pathlosses (e.g., consecutive pathlosses), for the UE panel, that are larger than the pathloss threshold. In some examples, the UE may increment the counter (e.g., increase the counter by one) when detecting one (consecutive) pathloss for a UE panel (e.g., one UE panel) of the multiple (e.g., two) UE panels of the UE being larger than the pathloss threshold. In some examples, value of the counter being larger than the counting threshold may cause the fourteenth condition (for triggering the power-related report, for example) to be met.

In some examples, the first set of conditions comprises a fifteenth condition that a number of pathlosses (e.g., consecutive pathlosses), for two UE panels (e.g., all UE panels) of multiple (e.g., two) UE panels of the UE, that are larger than a pathloss threshold is larger than a counting threshold. For example, the number of pathlosses may correspond to a count of pathlosses (for the two UE panels of the UE) that are larger than the pathloss threshold. In some examples, the UE may maintain a counter for maintaining (e.g., counting) the count of pathlosses (e.g., consecutive pathlosses), for the two UE panels, that are larger than the pathloss threshold. In some examples, the UE may increment the counter (e.g., increase the counter by one) when detecting one (consecutive) pathloss for both UE panels of the multiple (e.g., two) UE panels of the UE being larger than the pathloss threshold. In some examples, value of the counter being larger than the counting threshold may cause the fifteenth condition (for triggering the power-related report, for example) to be met.

For example, the fifteenth condition may be met when the value of the counter is larger than the counting threshold. In some examples, the UE may determine (e.g., derive) two pathlosses based on two PL RSs (e.g., first pathloss, second pathloss). In some examples, the UE may increment the counter (e.g., increase the counter by one) if a first pathloss of the two pathlosses and/or a second pathloss of the two pathlosses is larger than the pathloss threshold. In some examples, the UE may set the counter to zero if both the first pathloss and the second pathloss are smaller than or equal to the pathloss threshold.

In some examples, the first set of conditions comprises a sixteenth condition that a first number of pathlosses (e.g., consecutive pathlosses) for a first UE panel of the UE and/or a second number of pathlosses (e.g., consecutive pathlosses) for a second UE panel of the UE are larger than a counting threshold. For example, the first number of pathlosses may correspond to a count of pathlosses (for the first UE panel) that are larger than the pathloss threshold. The second number of pathlosses may correspond to a count of pathlosses (for the second UE panel) that are larger than the pathloss threshold. In an example, the UE may maintain the first counter and the second counter separately (e.g., for each UE panel of the UE, the UE may maintain a counter corresponding to a number of pathlosses that are larger than the pathloss threshold). In some examples, the UE may increment the first counter (e.g., increase the first counter by one) when detecting one (consecutive) pathloss for the first UE panel being larger than the pathloss threshold. In some examples, the UE may increment the second counter (e.g., increase the second counter by one) when detecting one (consecutive) pathloss for the second UE panel being larger than the pathloss threshold. In some examples, value of the first counter and/or value of the second counter being larger than the counting threshold may cause the sixteenth condition (for triggering the power-related report, for example) to be met. For example, the sixteenth condition may be met when the value of the first counter and/or the value of the second counter is larger than the counting threshold. In some examples, counting threshold may be different for different UE panels. In some examples, pathloss threshold may be different for different UE panels.

In some examples, with respect to one or more embodiments herein (such as embodiments discussed with respect to the fourteenth condition, the fifteenth condition and/or the sixteenth condition), a number of pathlosses (e.g., a number of consecutive pathlosses) corresponds to a number of pathlosses that are associated with a first serving cell. In some examples, pathloss associated with the first serving cell may be pathloss determined based on (e.g., measured and/or derived from) DL RS transmitted via the first serving cell and/or from the first serving cell. In some examples, pathloss associated with the first serving cell does not comprise pathloss determined based on (e.g., measured and/or derived from) DL RS transmitted via a serving cell other than the first serving cell. In some examples, the pathloss associated with the first serving cell may be pathloss determined based on (e.g., measured and/or derived from) one or more DL RSs transmitted via the first serving cell or determined based on (e.g., measured and/or derived from) one or more DL RSs transmitted via a second cell that is a non-serving cell and/or a neighboring cell. In some examples, the one or more DL RS transmitted via the second cell may be associated with SSB in the second cell and/or may be (type-D) QCLed to SSB of the second cell. In some examples, the first serving cell may comprise a first TRP and a second TRP. In some examples, the second cell is associated with the first serving cell. In some examples, the UE may perform transmission and/or reception via beam/spatial filter/spatial relation/spatial information/spatial relation information that is associated with SSB in the second cell and/or that is (type-D) QCLed to SSB in the second cell (in addition to SSB in the first serving cell, for example). For example, the second cell being associated with the first serving cell may correspond to the UE performing transmission and/or reception via beam/spatial filter/spatial relation/spatial information/spatial relation information that is associated with SSB in the second cell and/or that is (type-D) QCLed to SSB in the second cell (in addition to SSB in the first serving cell, for example).

In some examples, the two PL RSs are associated with multiple (e.g., two) uplink channels/signals (e.g., two uplink channels/signals that are transmitted concurrently, such as simultaneously).

In some examples, the first set of conditions comprises a seventeenth condition that a number of failed uplink concurrent scheduling attempts (e.g., a number of failed uplink simultaneous scheduling attempts) is larger than a counting threshold. In some examples, the UE may maintain a counter for maintaining (e.g., counting) the number of failed uplink concurrent scheduling attempts. In some examples, the UE may increment the counter (e.g., increase the counter by one) when detecting one (consecutive) failed uplink concurrent scheduling attempt (e.g., one failed uplink simultaneous scheduling attempt) for a UE panel (e.g., one UE panel) of multiple (e.g., two) UE panels of the UE. In some examples, value of the counter being larger than the counting threshold may cause the seventeenth condition (for triggering the power-related report, for example) to be met. In some examples, the UE may be scheduled to transmit multiple (e.g., two) uplink transmissions concurrently (e.g., simultaneously) based on one or more uplink grants. In some examples, a failed uplink concurrent scheduling attempt (e.g., a failed uplink simultaneous scheduling attempt) may correspond to a scenario in which the UE is scheduled (by one or more uplink grants) to transmit multiple (e.g., two) uplink transmissions concurrently (e.g., simultaneously), and the UE does not (e.g., is not able to) transmit the multiple (e.g., two) scheduled uplink transmissions concurrently (e.g., simultaneously), such as due, at least in part, to a Timing Advance (TA) difference of two uplink transmission being larger than a threshold and/or to a power related impact (e.g., a sum of total power, a pathloss, an MPE issue). In some examples, the failed uplink concurrent scheduling attempt (and/or the failed uplink transmission) may not comprise cancellation, preemption, and/or prioritization with other DL/UL channels/signals.

In some examples, the number of failed uplink concurrent scheduling attempts (e.g., the number of failed uplink simultaneous scheduling attempts) is associated with a first serving cell. For example, failed uplink concurrent scheduling attempts counted in the number of failed uplink concurrent scheduling attempts may comprise a scheduling attempt of a first uplink transmission associated with the first serving cell. In some examples, the failed uplink concurrent scheduling attempts (counted in the number of failed uplink concurrent scheduling attempts) comprises a scheduling attempt of a second uplink transmission associated with a second cell. In some examples, the second cell is a non-serving cell and/or a neighboring cell. In some examples, the second cell is associated with the first serving cell. In some examples, one or more DL RS transmitted via the second cell may be associated with SSB in the second cell and/or may be (type-D) QCLed to SSB of the second cell. In some examples, the first serving cell may comprise a first TRP and a second TRP. In some examples, the UE may perform transmission and/or reception via beam/spatial filter/spatial relation/spatial information/spatial relation information that is associated with SSB in the second cell and/or that is (type-D) QCLed to SSB in the second cell (in addition to SSB in the first serving cell, for example). For example, the second cell being associated with the first serving cell may correspond to the UE performing transmission and/or reception via beam/spatial filter/spatial relation/spatial information/spatial relation information that is associated with SSB in the second cell and/or that is (type-D) QCLed to SSB in the second cell (in addition to SSB in the first serving cell, for example).

In some examples, the first set of conditions comprises one, some and/or all of the first condition, the second condition, the third condition, the fourth condition, the fifth condition, the sixth condition, the seventh condition, the eighth condition, the ninth condition, the tenth condition, the eleventh condition, the twelfth condition, the thirteenth condition, the fourteenth condition, the fifteenth condition, the sixteenth condition and/or the seventeenth condition. In some examples, the UE may trigger transmission and/or generation of the power-related report (e.g., the UE is triggered to transmit and/or generate the power-related report) based on (e.g., in response to) a determination (e.g., detection and/or identification) that one, some and/or all of the first set of conditions are met. In some examples, based on (e.g., in response to) triggering transmission and/or generation of a power-related report (e.g., in response to determining that one, some and/or all of the first set of conditions are met), the UE may generate and/or transmit the power-related report.

In some examples, the first set of conditions may comprise: (i) a condition that pathloss has changed more than phr-Tx-PowerFactorChange dB for a cell (e.g., for a TRP of the cell) of a MAC entity (e.g., any MAC entity) since the last transmission of a Power Headroom Report (PHR) in the MAC entity when the MAC entity has UL resources for new transmission; (ii) a condition that phr-PeriodicTimer expires; (iii) a condition that power headroom reporting functionality, that is not used to disable the function, is configured or reconfigured (e.g., the condition may be met upon configuration or reconfiguration of the power headroom reporting functionality, that is not used to disable the function); (iv) a condition that a Secondary Cell (SCell), of a MAC entity (e.g., any MAC entity) with a configured uplink of which firstActiveDownlinkBWP-Id is not set to dormant BWP, is activated (e.g., the condition may be met upon activation of an SCell of a MAC entity with a configured uplink of which firstActiveDownlinkBWP-Id is not set to dormant BWP); (v) a condition that a PSCell is added (e.g., the condition may be met based on addition of the PSCell, such as when the PSCell is newly added or changed); (vi) a condition that there are UL resources allocated for new transmission or there is a PUCCH transmission on a cell (e.g., on a TRP of the cell) of a MAC entity (e.g., any MAC entity) with configured uplink, and that the required power backoff due to power management for the cell (e.g., for the TRP of the cell) has changed more than phr-Tx-PowerFactorChange dB since the last transmission of a PHR when the MAC entity had UL resources allocated for transmission (e.g., PUCCH transmission) on the cell (e.g., on the TRP of the cell); (vii) a condition that an activated BWP is switched from dormant BWP to non-dormant DL BWP of a cell of a MAC entity (e.g., any MAC entity) with configured uplink (e.g., the condition may be met upon switching of activated BWP from dormant BWP to non-dormant DL BWP of a cell of the MAC entity with configured uplink); (viii) a condition that a measured Power Management Maximum Power Reduction (P-MPR) is equal to or larger than mpe-Threshold for a cell (e.g., for a TPR of the cell) since the last transmission of a PHR in a MAC entity; and/or (ix) measured P-MPR has changed more than phr-Tx-PowerFactorChange dB for a cell (e.g., a TRP of the cell) since the last transmission of a PHR due to the measured P-MPR applied to meet MPE requirements being equal to or larger than mpe-Threshold in a MAC entity.

In some examples, with respect to one or more embodiments herein (such as embodiments discussed with respect to the first set of conditions), the cell is an activated serving cell. Alternatively and/or additionally, the cell may be a neighbouring cell and/or a non-serving cell. The cell may be in Frequency Range 2 (FR2). The cell may be used as a pathloss reference.

In some examples, phr-ProhibitTimer may expire and/or may have expired. In some examples, active DL BWP of a MAC entity associated with the cell may not be dormant BWP.

In some examples, mpe-Reporting-FR2 may be configured. In some examples, mpe-ProhibitTimer may not be running.

In some examples, the power-related report may be indicative of a transmit power of a UE being larger than a threshold (e.g., the power-related report may comprise information associated with the transmit power of the UE being larger than the threshold). In some examples, the power-related report may be indicative of a difference between the transmit power of the UE and the threshold (e.g., the power-related report may comprise information associated with the difference between the transmit power of the UE and the threshold). In some examples, the power-related report may be indicative of multiple (e.g., two) proposed transmit powers (e.g., the power-related report may comprise information associated with the multiple proposed transmit powers). In some examples, the multiple (e.g., two) proposed transmit powers is paired with, associated with, and/or for concurrent (e.g., simultaneous) uplink transmissions (via multiple UE panels, such as two UE panels). For example, the multiple (e.g., two) proposed transmit powers may comprise a first proposed transmit power associated with a first uplink transmission of the concurrent uplink transmissions and a second proposed transmit power associated with a second uplink transmission of the concurrent uplink transmissions. In some examples, the power-related report may be indicative of (and/or may comprise information associated with) one or more proposed UE beams and/or one or more proposed RSs associated with spatial relation/spatial information/spatial filter (e.g., one or more indexes and/or one or more RSs), proposed number of Physical Resource Blocks (PRBs), proposed target power (e.g., $P_0$), proposed alpha, proposed PL RS, and/or proposed closed loop index.

In some examples, the power-related report may be indicative of (and/or may comprise information associated with) one or more pairs of proposed UE beams, one or more pairs of proposed RSs associated with spatial relation/spatial information/spatial filter (e.g., one or more indexes and/or one or more RSs), one or more pairs of proposed number of PRBs, one or more pairs of proposed target power (e.g., $P_0$), one or more pairs of proposed alpha, one or more pairs of proposed PL RS, and/or one or more pairs of proposed closed loop index.

In some examples, a pair (e.g., one pair) of the one or more pairs of X (e.g., X=proposed UE beam, proposed RS associated with spatial relation/spatial information/spatial filter, proposed number of PRBs, proposed target power (e.g., $P_0$), proposed alpha, proposed PL RS, and/or proposed closed loop index) comprises two Xs, wherein a first X of the two Xs (e.g., the first X may comprise a first proposed UE beam, a first proposed RS associated with spatial relation/spatial information/spatial filter, a first proposed number of PRBs, a first proposed target power, a first proposed alpha, a first proposed PL RS, and/or a first proposed closed loop index) is associated with a first UE panel of the UE and a second X of the two Xs (e.g., the second X may comprise a second proposed UE beam, a second proposed RS associated with spatial relation/spatial information/spatial filter, a second proposed number of PRBs, a second proposed target power, a second proposed alpha, a second proposed PL RS, and/or a second proposed closed loop index) is associated with a second UE panel of the UE. In some examples, the UE may transmit concurrently (e.g., simultaneously) based on a pair (e.g., one pair) of X. For example, the UE may perform concurrent (e.g., simultaneous) uplink transmissions (via multiple UE panels, such as two UE panels, for example) based on the pair of X. In some examples, the rationale for including (e.g., indicating) the pair of X in the power-related report is to report proper Xs for use by the UE in performing concurrent (e.g., simultaneous) uplink transmissions.

In some examples, the power-related report may comprise one or more Power Headroom (PH) values associated with one or more cells and/or one or more TRPs.

In some examples, the power-related report may comprise one or more transmit powers associated with one or more cells and/or one or more TRPs.

In some examples, the power-related report may be a PHR.

In some examples, the power-related report may be a PHR Medium Access Control (MAC) Control Element (CE).

In some examples, the one or more PH values may be determined based on (e.g., derived from) quantization of one or more PHs.

In some examples, the one or more PH values may comprise PH associated with a first uplink transmission and PH associated with a second uplink transmission, wherein both uplink transmissions (e.g., the first uplink transmission and the second uplink transmission) are in a first serving cell.

In some examples, the one or more PH values may comprise PH associated with a first uplink transmission and PH associated with a second uplink transmission, wherein the first uplink transmission is in a first serving cell and the second uplink transmission is in a second cell. In some examples, the second cell is associated with the first serving cell. In some examples, the UE may perform transmission and/or reception via beam/spatial filter/spatial relation/spatial information/spatial relation information that is associated with SSB in the second cell and/or that is (type-D) QCLed to SSB in the second cell (in addition to SSB in the first serving cell, for example). For example, the second cell being associated with the first serving cell may correspond to the UE performing transmission and/or reception via beam/spatial filter/spatial relation/spatial information/spatial relation information that is associated with SSB in the second cell and/or that is (type-D) QCLed to SSB in the second cell (in addition to SSB in the first serving cell, for example).

In some examples, the one or more PH values comprises PH associated with a first uplink transmission and not comprise PH associated with a second uplink transmission, wherein both uplink transmissions (e.g., the first uplink transmission and the second uplink transmission) are in a first serving cell.

In some examples, a PH (e.g., one PH) may be determined based on (e.g., derived from) a set of power control parameters (e.g., pathloss, closed loop index, alpha, and/or $P_0$) for a PUSCH or SRS transmission (e.g., an actual PUSCH or SRS transmission), such as one PUSCH or SRS transmission, and/or determined based on (e.g., derived from) a default set of power control parameters (e.g., pathloss associated with PL RS ID=0, closed loop index=0, $P_0$ associated to ID=0, and/or alpha associated with ID=0).

In some examples, the UE may use the default set of power control parameters to determine (e.g., derive) a PH (e.g., one PH) if the UE does not have uplink grant or does not transmit PUSCH and/or SRS.

In some examples, the UE may use the set of power control parameters to determine (e.g., derive) a PH (e.g., one PH) if the UE has an uplink grant and/or would transmit PUSCH and/or SRS. In some examples, the set of power control parameters may be based on uplink grant scheduling the PUSCH and/or SRS.

In some examples, a PH determined based on (e.g., derived from) the set of power control parameters may be a real PH (e.g., an actual PH).

In some examples, a PH determined based on (e.g., derived from) the default set of power control parameter may be a virtual PH.

In some examples, a PH may be determined based on (e.g., derived from) a difference (e.g., a positive or negative difference) between a first transmit power (e.g., a transmit power without power scaling/reduction) and a first maximum transmit power. In the present disclosure, the term "power scaling/reduction" may correspond to power scaling and/or power reduction.

In some examples, a PH may be determined based on (e.g., derived from) a difference (e.g., a positive or negative difference) between a second transmit power (e.g., a transmit power without power scaling/reduction) and a second maximum transmit power.

In some examples, a PH may be determined based on (e.g., derived from) a difference (e.g., a positive or negative difference) between a first maximum transmit power and a combination (e.g., a sum) of a first transmit power (e.g., a transmit power without power scaling/reduction) and a second transmit power (e.g., a transmit power without power scaling/reduction).

Alternatively and/or additionally, a PH may be determined based on (e.g., derived from) a difference (e.g., a positive or negative difference) between a first (reduced) transmit power (e.g., a transmit power with power scaling/reduction) and a first maximum transmit power.

Alternatively and/or additionally, a PH may be determined based on (e.g., derived from) a difference (e.g., a positive or negative difference) between a second (reduced) transmit power (e.g., a transmit power with power scaling/reduction) and a second maximum transmit power.

Alternatively and/or additionally, a PH may be determined based on (e.g., derived from) a difference (e.g., a positive or negative difference) between a first maximum transmit power and a combination (e.g., a sum) of a first (reduced) transmit power (e.g., a transmit power with power scaling/reduction) and a second (reduced) transmit power (e.g., a transmit power with power scaling/reduction).

In some examples, with respect to one or more embodiments herein (such as embodiments discussed with respect to determining a PH), the first maximum transmit power may be the same as the second maximum transmit power.

In some examples, with respect to one or more embodiments herein, the first maximum transmit power may be associated with a first UE panel and/or a first SRS resource set.

In some examples, with respect to one or more embodiments herein, the second maximum transmit power may be associated with a second UE panel and/or a second SRS resource set.

Figure 12:
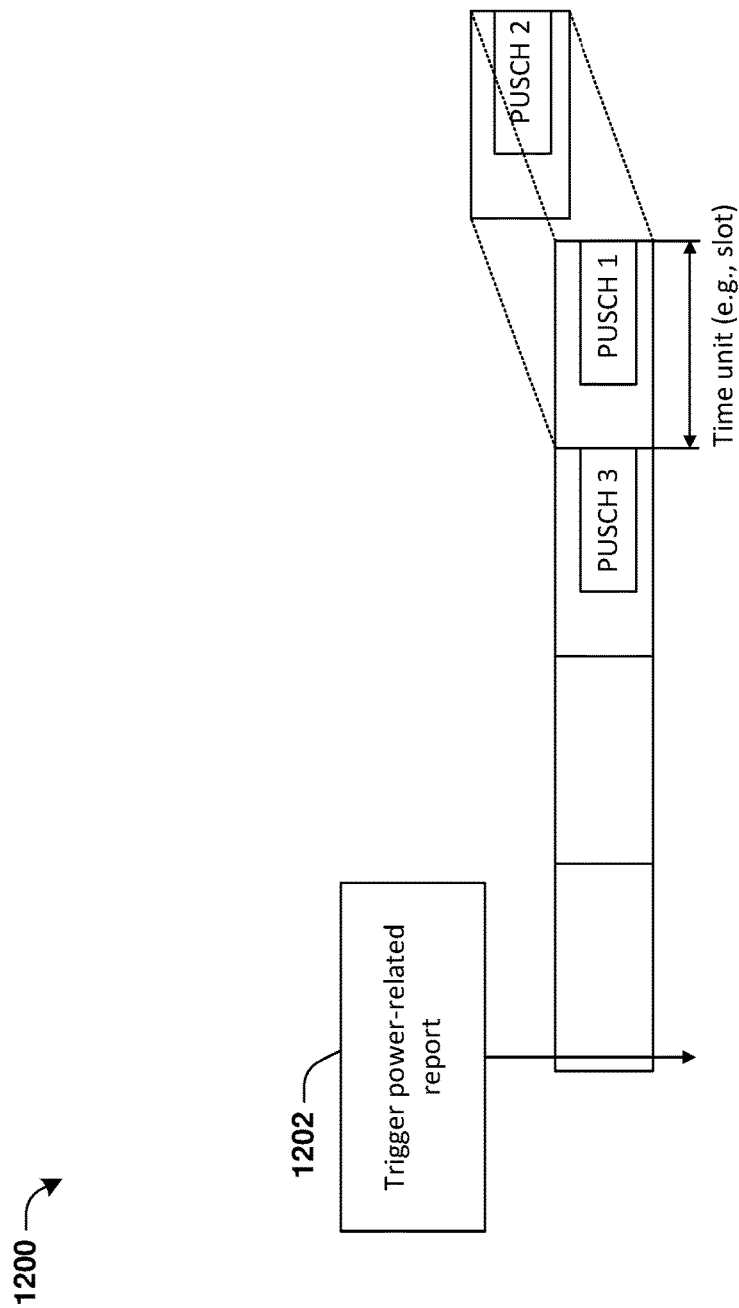
FIG. 12 is a diagram illustrating an exemplary scenario in which a UE triggers a power-related report according to one exemplary embodiment.

In an example with respect to a scenario 1200 of FIG. 12 (e.g., in a scenario where there is no PUSCH 3), the UE may have one or more uplink grants to transmit PUSCH 1 and PUSCH 2 concurrently (e.g., simultaneously), wherein PUSCH 1 and PUSCH 2 are the earliest PUSCHs scheduled for the UE after a time at which transmission and/or generation of a power-related report is triggered 1202 (e.g., there are no other PUSCH scheduled for the UE between the time at which the transmission and/or generation of the power-related report is triggered 1202 and a time of PUSCH 1 and/or PUSCH 2). In some examples, the transmission and/or generation of the power-related report is triggered 1202 by the UE and/or a network, such as using one or more of the techniques provided herein. In some examples, PUSCH 1 is associated with a first UE panel (e.g., UE panel 1) and/or PUSCH 2 is associated with a second UE panel (e.g., UE panel 2). In the example, the UE may determine (e.g., derive) a first transmit power for PUSCH 1. Alternatively and/or additionally, UE may determine (e.g., derive) a second transmit power for PUSCH 2.

In a first scenario, the UE is able to transmit PUSCH 1 (with the first transmit power, for example) and PUSCH 2 (with the second transmit power, for example) concurrently (e.g., simultaneously). The UE may transmit PUSCH 1 comprising a power-related report. The power-related report may also be comprised in PUSCH 2. The power-related report may comprise multiple (e.g., two) PHs. In some examples, a first PH (e.g., one PH) of the multiple (e.g., two) PHs may be determined (e.g., derived) based on the first transmit power and/or a first maximum transmit power. In some examples, a second PH (e.g., one PH other than the first PH) of the multiple (e.g., two) PHs may be determined (e.g., derived) based on the second transmit power and/or a second maximum transmit power. Alternatively and/or additionally, the UE may transmit a power-related report in PUSCH 1 (e.g., only PUSCH 1) or PUSCH 2 (e.g., only PUSCH 2). In some examples, the UE may determine which PUSCH is to carry the power-related report based on lower or higher SRS resource set ID associated with PUSCH 1 and PUSCH 2. In some examples, the UE may determine which PUSCH is to carry the power-related report based on lower or higher DL RSRP (e.g., L1-RSRP or L3-RSRP) associated with PUSCH 1 and PUSCH 2. In some examples, the UE may determine which PUSCH is to carry the power-related report based on lower or higher transmit power of the first and the second transmit power. In some examples, the UE may determine which PUSCH is to carry the power-related report based on lower or higher number of PRBs associated with the PUSCH 1 and PUSCH 2.

In a second scenario, the UE is not able to transmit PUSCH 1 (with the first transmit power, for example) and PUSCH 2 (with the second transmit power, for example) concurrently (e.g., simultaneously). The UE may transmit either PUSCH 1 or PUSCH 2. The UE may transmit PUSCH 1 comprising a power-related report. The power-related report may comprise multiple (e.g., two) PHs. In some examples, the multiple (e.g., two) PHs may be (real, real), (real, virtual), (virtual, real). In some examples, a first PH (e.g., one PH) of the multiple (e.g., two) PHs may be determined (e.g., derived) based on the first transmit power and/or a first maximum transmit power. In some examples, a second PH (e.g., one PH other than the first PH) of the multiple (e.g., two) PHs may be determined (e.g., derived) based on the second transmit power and/or a second maximum transmit power. Alternatively and/or additionally, the second PH of the multiple (e.g., two) PHs may be determined (e.g., derived) based on a default set of power control parameters and a default maximum transmit power (or the second maximum transmit power). Alternatively and/or additionally, the power-related report may comprise one PH. In some examples, the one PH may be determined (e.g., derived) based on the first transmit power and/or the first maximum transmit power. In some examples, the one PH may be determined (e.g., derived) based on the second transmit power and/or the second maximum transmit power. In some examples, the one PH may be real or virtual. In some examples, the one PH may be determined (e.g., derived) based on higher or lower value of PH based on (e.g., derived from) the first transmit power, the first maximum transmit power, the second transmit power and the second maximum transmit power.

In some examples, when a PUSCH (e.g., one PUSCH of PUSCH 1 and PUSCH 2) is not performed, the power-related report comprises multiple (e.g., two) PHs associated with PUSCH 1 and PUSCH 2.

In a third scenario, the UE is able to transmit PUSCH 1 with a first reduced transmit power and PUSCH 2 with a second reduced transmit power concurrently (e.g., simultaneously). In some examples, the UE may perform power reduction and/or power scaling on the first transmit power (to obtain the first reduced transmit power, for example). In some examples, the UE may perform power reduction and/or power scaling on the second transmit power (to obtain the second reduced transmit power, for example). The UE may transmit PUSCH 1 comprising a power-related report. The power-related report may also be comprised in PUSCH 2. The power-related report may comprise multiple (e.g., two) PHs. In some examples, a first PH (e.g., one PH) of the multiple (e.g., two) PHs may be determined (e.g., derived) based on the first transmit power and/or a first maximum transmit power. In some examples, a second PH (e.g., one PH other than the first PH) of the multiple (e.g., two) PHs may be determined (e.g., derived) based on the second transmit power and/or a second maximum transmit power. Alternatively and/or additionally, the first PH (e.g., one PH) of the multiple (e.g., two) PHs may be determined (e.g., derived) based on the first reduced transmit power and/or the first maximum transmit power, and/or the second PH of the multiple (e.g., two) PHs may be determined (e.g., derived) based on the second reduced transmit power and/or the second maximum transmit power. Alternatively and/or additionally, the UE may transmit a power-related report in PUSCH 1 (e.g., only PUSCH 1) or PUSCH 2 (e.g., only PUSCH 2).

In a fourth scenario, the UE is not able to transmit PUSCH 1 with a first reduced transmit power and PUSCH 2 with a second reduced transmit power concurrently (e.g., simultaneously). The UE may transmit either PUSCH 1 with the first reduced transmit power or the first transmit power, or PUSCH 2 with the second reduced transmit power or the second transmit power. The UE may transmit PUSCH 1 comprising a power-related report. The power-related report may comprise multiple (e.g., two) PHs. In some examples, the multiple (e.g., two) PHs may be (real, real), (real, virtual), (virtual, real). In some examples, a first PH (e.g., one PH) of the multiple (e.g., two) PHs may be determined (e.g., derived) based on the first transmit power and/or a first maximum transmit power. In some examples, a second PH (e.g., one PH other than the first PH) of the multiple (e.g., two) PHs may be determined (e.g., derived) based on the second transmit power and/or a second maximum transmit power. Alternatively and/or additionally, the first PH (e.g., one PH) of the multiple (e.g., two) PHs may be determined (e.g., derived) based on the first reduced transmit power and/or the first maximum transmit power, and/or the second PH of the multiple (e.g., two) PHs may be determined (e.g., derived) based on the second reduced transmit power and/or the second maximum transmit power. Alternatively and/or additionally, the second PH of the multiple (e.g., two) PHs may be determined (e.g., derived) based on a default set of power control parameters and a default maximum transmit power (or the second maximum transmit power). Alternatively and/or additionally, the power-related report may comprise one PH. In some examples, the one PH may be determined (e.g., derived) based on the first transmit power and/or the first maximum transmit power. In some examples, the one PH may be determined (e.g., derived) based on the second transmit power and/or the second maximum transmit power. In some examples, the one PH may be determined (e.g., derived) based on the first reduced transmit power and/or the first maximum transmit power. In some examples, the one PH may be determined (e.g., derived) based on the second reduced transmit power and/or the second maximum transmit power. In some examples, the one PH may be real or virtual. In some examples, the one PH may be determined (e.g., derived) based on higher or lower value of PH based on (e.g., derived from) the first transmit power and the first maximum transmit power and the second transmit power and the second maximum transmit power. Alternatively, and/or additionally the one PH may be determined (e.g., derived) based on higher or lower value of PH based on (e.g., derived from) the first reduced transmit power, the first maximum transmit power, the second reduced transmit power and the second maximum transmit power.

In some examples, in the first scenario, the second scenario, the third scenario and/or the fourth scenario (e.g., regardless of whether or not the UE transmits one or two PUSCHs and/or regardless of how much transmit power the UE uses for PUSCH 1 and PUSCH 2), the power-related report comprises multiple (e.g., two) PHs. In some examples, a first PH (e.g., one PH) of the multiple (e.g., two) PHs is determined (e.g., derived) based on the first maximum transmit power and the first transmit power. In some examples, a second PH (e.g., one PH other than the first PH) of the multiple (e.g., two) PHs is determined (e.g., derived) based on the second maximum transmit power and the second transmit power.

In some examples, PUSCH 1 and PUSCH 2 are associated with a first serving cell. In some examples, PUSCH 1 is associated with a first TRP and PUSCH 2 is associated with a second TRP. In some examples, the UE transmits PUSCH 1 via a first beam/spatial filter/spatial relation/spatial information/spatial relation information and transmits PUSCH 2 via a second beam/spatial filter/spatial relation/spatial information/spatial relation information. In some examples, the first beam/spatial filter/spatial relation/spatial information/spatial relation information is associated with (type-D) QCLed to SSB or RS in the first serving cell. In some examples, the second beam/spatial filter/spatial relation/ spatial information/spatial relation information is associated with (type-D) QCLed to SSB or RS in the second cell. In some examples, the second cell is a neighboring cell and/or a non-serving cell.

In some examples, an uplink channel/signal (e.g., one uplink channel/signal) of the multiple (e.g., two) uplink channels/signals may be a dynamic grant scheduled PUSCH, a configured grant PUSCH, an aperiodic SRS, a periodic SRS, a semi-static SRS, or a PUCCH.

In some examples, after the UE triggers the power-related report, if the UE is granted for a new/initial uplink transmission (according to configured grant or dynamic grant, for example) (and/or if the UE can include and/or accommodate the power-related report in the new/initial uplink transmission), the UE may transmit the new/initial uplink transmission comprising the power-related report. In the present disclosure, the term "new/initial transmission" (and/or "new/initial uplink transmission") may correspond to a new and/or initial transmission (and/or a new and/or initial uplink transmission), such as a transmission that is not a retransmission.

In some examples, the power-related report may comprise (and/or may be transmitted via) L1 signaling (e.g., CSI report), such as where the power-related report is one kind of L1 signaling (e.g., CSI report).

In some examples, the power-related report may comprise (and/or may be transmitted via) MAC signaling (e.g., MAC CE), such as where the power-related report is one kind of MAC signaling (e.g., MAC CE).

In some examples, the power-related report may be L1-RSRP report, L3-RSRP report and/or PHR report.

In some examples, in the example shown in FIG. 12, the UE triggers 1202 power-related report based on (e.g., in response to) the first set of conditions being met (such as based on a determination that the first set of conditions is met). In a first example, if there is a PUSCH 3 that is: (i) for new/initial transmission; (ii) earlier than PUSCH 1 and PUSCH 2; and (iii) the earliest PUSCH after the UE triggers 1202 the power-related report, the UE may transmit PUSCH 3 comprising the power-related report (e.g., the power-related report may be transmitted via PUSCH 3). In a second example, in a scenario in which: (i) PUSCH 3 is for retransmission; (ii) there is no PUSCH 3; and/or PUSCH 3 cannot accommodate the power-related report (e.g., code rate too high and/or not enough resources according to prioritization procedure), the UE may transmit the power-related report in the earliest PUSCH that is an initial transmission after the UE triggers 1202 the power-related report. In the second example, the UE may be scheduled to transmit PUSCH 1 and PUSCH 2 (which do not meet the first set of conditions). In some examples, the UE may transmit the power-related report in PUSCH 1 and/or PUSCH 2. In some examples, PUSCH 1 and PUSCH 2 may occupy at least partially overlapping time and/or frequency resources, such as where one or more time and frequency resources occupied by PUSCH 1 are the same as one or more time and frequency resources occupied by PUSCH 2. In some examples, the UE may concurrently (e.g., simultaneously) transmit PUSCH 1 via UE panel 1 (e.g., one panel) and transmit PUSCH 2 via UE panel 2 (e.g., one panel other than UE panel 1). In some examples, in a scenario in which one or more parameters (e.g., the set of X) for PUSCH 1 and PUSCH 2 meet the first set of conditions, the UE may transmit either PUSCH 1 or PUSCH 2. In some examples, the UE may transmit the power-related report in the selected PUSCH (such as the PUSCH that is determined (e.g., derived) by the UE for used in transmitting the power-related report). In some examples, PUSCH 1 and PUSCH 2 are scheduled by a DCI (e.g., one DCI). In some examples, PUSCH 1 and PUSCH 2 are scheduled by different DCIs. In some examples, PUSCH 1 is scheduled by a first DCI in a first CORESET with different CORESETPoolIndex than a second CORESET comprising a second DCI scheduling PUSCH 2. In some examples, PUSCH 1 comprises same TB as PUSCH 2. In some examples, PUSCH 1 may comprise a TB different than a TB of PUSCH 2. In some examples, PUSCH 1 and PUSCH 2 are with the same rank and/or the same number of layers.

Second Concept

The second concept of the present disclosure is that a UE determines whether or not to perform concurrent uplink transmissions (e.g., simultaneous uplink transmission), such as concurrently perform multiple uplink transmissions on multiple (e.g., two) UE panels, based on: (i) L1-RSRP or L3-RSRP (derived from DL RS, for example) associated with a first TRP and/or L1-RSRP or L3-RSRP (derived from DL RS, for example) associated with a second TRP; (ii) pathloss (derived from DL RS, for example) associated with a first TRP and/or pathloss (derived from DL RS, for example) associated with a second TRP; (iii) transmit power associated with an uplink transmission to the first TRP (e.g., a transmit power used to perform the uplink transmission to the first TRP) and/or transmit power associated with an uplink transmission to the second TRP (e.g., a transmit power used to perform the uplink transmission to the second TRP); and/or (iv) TA associated with an uplink transmission to the first TRP (e.g., a TA used to perform the uplink transmission to the first TRP) and/or TA associated with an uplink transmission to the second TRP (e.g., a TA used to perform the uplink transmission to the second TRP).

In some examples, in response to a determination to perform concurrent uplink transmissions (e.g., simultaneous uplink transmissions), the UE may perform the concurrent uplink transmissions (e.g., the simultaneous uplink transmissions). The concurrent uplink transmissions (e.g., the simultaneous uplink transmissions) may comprise concurrently (e.g., simultaneously) performing multiple uplink transmissions on multiple (e.g., two) UE panels. In some examples, the UE may perform the concurrent uplink transmissions (e.g., the simultaneous uplink transmissions) based on one or more configured grants or one or more dynamic grants. In some examples, the one or more dynamic grants may comprise one or more DCIs scheduling multiple uplink transmissions (e.g., multiple uplink transmissions that are to be transmitted in one or more overlapping symbols). In some examples, the one or more dynamic grants may comprise one DCI that schedules multiple uplink transmissions (that are to be transmitted in one or more overlapping symbols, for example). In some examples, the one or more configured grants may be type-1 CG (where the one or more configured grants may be applied without L1 signaling activation, for example) or type-2 CG (where the one or more configured grants may be applied in response to L1 signaling activation).

In some examples, in response to a determination not to perform concurrent uplink transmissions (e.g., simultaneous concurrent transmissions), the UE may transmit one uplink transmission of multiple (e.g., two) uplink transmissions (e.g., the UE may transmit the one uplink transmission of the multiple transmissions instead of transmitting all, such as both, of the multiple uplink transmissions). The UE may drop (e.g., may skip, may omit and/or may not perform) another uplink transmission of the multiple (e.g., two) uplink transmissions (e.g., the another uplink transmission is different than the one uplink transmission that is transmitted by the UE). In some examples, the multiple (e.g., two) uplink transmissions are overlapped with at least one orthogonal frequency-division multiplexing (OFDM) symbol in time domain.

Alternatively and/or additionally (with respect to the second concept), the UE may determine whether or not to perform concurrent uplink transmissions (e.g., simultaneous uplink transmissions) comprising a first uplink transmission with a first transmit power and a second uplink transmission with a second transmit power. The determination may be based on: (i) L1-RSRP or L3-RSRP (derived from DL RS, for example) associated with a first TRP and/or L1-RSRP or L3-RSRP (derived from DL RS, for example) associated with a second TRP; (ii) pathloss (derived from DL RS, for example) associated with a first TRP and/or pathloss (derived from DL RS, for example) associated with a second TRP; (iii) the first transmit power and/or the second transmit power; and/or (iv) a TA associated with the first uplink transmission and/or a TA associated with the second uplink transmission.

In some examples, the first uplink transmission is associated with the first TRP (e.g., the first uplink transmission may be transmitted to the first TRP). In some examples, the second uplink transmission is associated with the second TRP (e.g., the second uplink transmission may be transmitted to the second TRP).

In some examples, in response to a determination to perform concurrent uplink transmissions (e.g., simultaneous uplink transmissions) comprising a first uplink transmission with a first transmit power and a second uplink transmission with a second transmit power, the UE may concurrently (e.g., simultaneously) transmit the first uplink transmission with the first transmit power and the second uplink transmission with the second transmit power. In some examples, the first uplink transmission and/or the second uplink transmission are associated with (e.g., scheduled and/or configured by) one or more configured grants or one or more dynamic grants. In some examples, the one or more dynamic grants may comprise one or more DCIs scheduling multiple uplink transmissions (e.g., multiple uplink transmissions that are to be transmitted in one or more overlapping symbols). In some examples, the one or more dynamic grants may comprise one DCI that schedules multiple uplink transmissions (that are to be transmitted in one or more overlapping symbols, for example). In some examples, the one or more configured grants may be type-1 CG (where the one or more configured grants may be applied without L1 signaling activation, for example) or type-2 CG (where the one or more configured grants may be applied in response to L1 signaling activation).

In some examples, in response to a determination not to perform concurrent uplink transmissions (e.g., simultaneous concurrent transmissions) comprising a first uplink transmission with a first transmit power and a second uplink transmission with a second transmit power, the UE may perform one or more operations comprising: (i) transmit one uplink transmission of multiple (e.g., two) uplink transmissions (e.g., the UE may transmit the one uplink transmission of the multiple transmissions instead of transmitting all, such as both, of the multiple uplink transmissions); (ii) determine whether or not to concurrently (e.g., simultaneously) transmit the first uplink transmission with a first reduced transmit power and the second uplink transmission with a second reduced transmit power, based on one, some and/or all of points A-C: (A) L1-RSRP or L3-RSRP (derived from DL RS, for example) associated with a first TRP (e.g., the first TRP may be associated with the first uplink transmission) and/or L1-RSRP or L3-RSRP (derived from DL RS, for example) associated with a second TRP (e.g., the second TRP may be associated with the second uplink transmission), (B) a pathloss (derived from DL RS, for example) associated with a first TRP (e.g., the first TRP may be associated with the first uplink transmission) and/or a pathloss (derived from DL RS, for example) associated with a second TRP (e.g., the second TRP may be associated with the second uplink transmission), (C) the first transmit power and/or the second transmit power, (D) and/or TA associated with the first uplink transmission and/or TA associated with the second uplink transmission; (iii) determine a first reduced transmit power for the first uplink transmission; (iv) the UE may determine a second reduced transmit power for the second uplink transmission; and/or (v) the UE may perform power scaling on the first transmit power and/or the second transmit power.

In some examples, in a scenario in which the UE performs power scaling on the first transmit power and/or the second transmit power, the UE may perform the power scaling by multiplying the first transmit power and/or the second transmit power by one or more coefficients (between 0 and 1), respectively, to determine a first value and a second value, respectively. The first value may be the first reduced transmit power and/or the second value may be the second reduced transmit power. In an example, the first transmit power may be multiplied by a first coefficient "a" to determine the first value and/or the second transmit power may be multiplied by a second coefficient "b" to determine the second value (where a+b=1, 0<=a<=1, and/or 0<=b<=1, for example). In some examples, the first coefficient "a" is the same as the second coefficient "b". Alternatively and/or additionally, the first coefficient "a" is different than the second coefficient "b".

In some examples, if a sum of the first reduced transmit power and the second reduced transmit power is not larger than a third transmit power threshold, the UE may perform concurrent (e.g., simultaneous) uplink transmission of the first uplink transmission and the second uplink transmission. For example, if the sum of the first reduced transmit power and the second reduced transmit power is not larger than the third transmit power threshold, the UE may concurrently transmit the first uplink transmission (with the first reduced transmit power, for example) and the second uplink transmission (with the second reduced transmit power, for example). In some examples, if the sum of the first reduced transmit power and the second reduced transmit power is larger than the third transmit power threshold, the UE does not perform concurrent (e.g., simultaneous) uplink transmission of the first uplink transmission and the second uplink transmission and/or the UE may transmit one uplink transmission of the first uplink transmission and the second uplink transmission (e.g., the UE may transmit either the first uplink transmission or the second uplink transmission).

In some examples, the multiple (e.g., two) uplink transmissions are overlapped with at least one OFDM symbol in time domain. In some examples, the UE concurrently (e.g., simultaneously) transmits multiple (e.g., two) uplink channels/signals via multiple (e.g., two) UE panels of the UE. In some examples, the UE transmits the multiple (e.g., two) uplink channels/signals via multiple (e.g., two) beams/spatial filters/spatial relations/spatial information sets/spatial relation information sets of the UE. In some examples, the UE transmits a first uplink channel/signal of the multiple (e.g., two) uplink channels/signals via a first beam/spatial filter/spatial relation/spatial information/spatial relation information (of the UE) that is associated with and/or QCLed to SSB of a first cell. In some examples, the UE transmits a second uplink channel/signal of the multiple (e.g., two) uplink channels/signals via a second beam/spatial filter/spatial relation/spatial information/spatial relation information (of the UE) that is associated with and/or QCLed to SSB of a second cell (e.g., the first beam/spatial filter/spatial relation/spatial information/spatial relation information is different than the second beam/spatial filter/spatial relation/spatial information/spatial relation information). In some examples, the first cell is different than the second cell. In some examples, the first cell is a serving cell (of the UE, for example) and the second serving cell is a neighboring cell (e.g., a non-serving cell of the UE) associated with the first cell. In some examples, the multiple (e.g., two) uplink channels/signals are transmitted on a carrier and/or a cell.

In some examples, if the following condition is met [the condition is met if: (i) L1-RSRP or L3-RSRP associated with the first TRP is larger than a first RSRP threshold; (ii) L1-RSRP or L3-RSRP associated with the second TRP is larger than a second RSRP threshold; and/or (iii) a combination (e.g., a sum) of a first value and a second value is larger than a third RSRP threshold, wherein the first value corresponds to L1-RSRP or L3-RSRP associated with the first TRP and/or the second value corresponds to L1-RSRP or L3-RSRP associated with the second TRP], the UE may perform concurrent (e.g., simultaneous) uplink transmissions (e.g., the UE may concurrently transmit the multiple uplink channels/signals via multiple UE panels). It may be appreciated that performing the concurrent (e.g., simultaneous) uplink transmissions) may provide for improved channel quality.

In some examples, if the following condition is met [the condition is met if: (i) a first pathloss associated with uplink transmission to the first TRP is smaller than a first pathloss threshold; (ii) a second pathloss associated with uplink transmission to the second TRP is smaller than a second pathloss threshold; and/or (iii) a combination (e.g., a sum) of the first pathloss and the second pathloss is smaller than a third pathloss threshold], the UE may perform concurrent (e.g., simultaneous) uplink transmission.

In some examples, if the following condition is met [the condition is met if: (i) a first transmit power associated with uplink transmission to the first TRP is smaller than a first transmit power threshold; (ii) a second transmit power associated with uplink transmission to the second TRP is smaller than a second transmit power threshold; and/or (iii) a combination (e.g., a sum) of the first transmit power and the second transmit power is smaller than a third transmit power threshold], the UE may perform concurrent (e.g., simultaneous) uplink transmission.

In some examples, if a TA difference between a first TA associated with uplink transmission to the first TRP and a second TA associated with uplink transmission to the second TRP is larger than a threshold (e.g., TA difference threshold), the UE is not configured to perform (e.g., is not allowed to perform and/or does not perform) concurrent (e.g., simultaneous) uplink transmissions. The TA difference may be equal to a difference between the first TA and the second TA. In some examples, the rationale for the UE not being configured (e.g., allowed) to perform concurrent uplink transmissions if the TA difference is larger than the threshold is that the UE performing the concurrent uplink transmissions may cause interference due to the TA difference being too large. In some examples, if uplink transmission timing difference between the first TRP and the second TRP is larger than a threshold, the UE is not configured to perform (e.g., is not allowed to perform and/or does not perform) concurrent (e.g., simultaneous) uplink transmissions. The UE may perform a single uplink transmission (of the concurrent uplink transmissions, for example) to one TRP (of the first TRP and the second TRP, for example). The single uplink transmission may correspond to an uplink transmission, of the concurrent uplink transmissions, that occurs earlier in time domain and/or that is associated with a CORESET pool index that is smallest among CORESET pool indexes associated with the concurrent uplink transmissions.

In some examples, if an uplink transmission (of the concurrent uplink transmissions, for example) has a TA that would cause the uplink transmission to overlap with a downlink symbol (e.g., the TA is too large), the UE is not configured (e.g., is not allowed and/or does not perform) the concurrent (e.g., simultaneous) uplink transmissions.

In an example, {15 dBm, 20 dBm} are maximum transmit powers associated with multiple (e.g., two) UE panels of the UE (and/or multiple (e.g., two) sets of SRS resources and/or multiple (e.g., two) UL beams/spatial filters/spatial relations/spatial information sets/spatial relation information sets). In some examples, {15 dBm} may be the first transmit power threshold (associated with a first UE panel, a first set of SRS resources and/or a first UL beam/spatial filter/spatial relation/spatial information/spatial relation information, for example). In some examples, {20 dBm} may be the second transmit power threshold (associated with a second UE panel, a second set of SRS resources and/or a second UL beam/spatial filter/spatial relation/spatial information/spatial relation information, for example). In some examples, the third transmit power threshold may be 23 dBM that is the maximum transmit power for uplink transmission. The UE may determine (e.g., derive) transmit power for a first uplink transmission based on one or more power control parameters associated the first TRP. The UE may determine (e.g., derive) transmit power for a second uplink transmission based on one or more power control parameters associated the second TRP.

In some examples, in response to a first determination that transmit power for a first uplink transmission is smaller than or equal to the first transmit power threshold (e.g., 15 dBm), a second determination of that transmit power for a second uplink transmission is smaller than or equal to the second transmit power threshold (e.g., 20 dBm), and a third determination that a combination (e.g., a sum) of transmit powers for the first uplink transmission and second uplink transmission is smaller than or equal to the third transmit power threshold, the UE may transmit the first uplink transmission and the second uplink transmission concurrently (e.g., simultaneously). In some examples, if one of the determinations (e.g., the first determination, the second determination, and/or the third determination) is not made, the UE may transmit merely one uplink transmission the first uplink transmission and the second uplink transmission (e.g., the UE may transmit merely one uplink transmission the first uplink transmission and the second uplink transmission if it is determined that the transmit power for the first uplink transmission is larger than the first transmit power threshold, the transmit power for the second uplink transmission is larger than the second transmit power threshold and/or the combination of the transmit powers is larger than the third transmit power threshold).

In some examples, the UE transmits the first uplink transmission via a first UE beam/spatial filter/spatial relation/spatial information/spatial relation information.

In some examples, the UE transmits the second uplink transmission via a second UE beam/spatial filter/spatial relation/spatial information/spatial relation information.

In some examples, the concurrent uplink transmissions (e.g., simultaneous uplink transmissions) may comprise a first uplink transmission and a second uplink transmission. In some examples, the first uplink transmission may comprise a power-related report. In some examples, the second uplink transmission may comprise the power-related report. In some examples, the first uplink transmission and the second uplink transmission are the earliest new/initial uplink transmissions since the UE triggers transmission of the power-related report (e.g., the UE is triggered to transmit the power-related report). For example, there may be no other uplink transmission scheduled for the UE between a time at which transmission of the power-related report is triggered and a time associated with the first uplink transmission and/or the second uplink transmission.

In some examples, the UE triggers transmission and/or generation of a power-related report (e.g., the UE is triggered to transmit and/or generate the power-related report) based on (e.g., in response to) a second set of conditions (e.g., a first set of one or more conditions), such as based on (e.g., in response to) a determination that the second set of conditions is met. In some examples, a power-related report may be triggered by power headroom report procedure (such as a power headroom report procedure according to in 3GPP TS 38.321 V16.5.0). In some examples, content of the power-related report may be different than power headroom report procedure in 3GPP TS 38.321 V16.5.0.

In some examples, the second set of conditions is the same as the first set of conditions (described with respect to the first concept). Alternatively and/or additionally, the second set of conditions may be different than the first set of conditions. In some examples, the second set of conditions comprises one, some and/or all of the first condition, the second condition, the third condition, the fourth condition, the fifth condition, the sixth condition, the seventh condition, the eighth condition, the ninth condition, the tenth condition, the eleventh condition, the twelfth condition, the thirteenth condition, the fourteenth condition, the fifteenth condition, the sixteenth condition and/or the seventeenth condition. In some examples, the UE may trigger transmission and/or generation of the power-related report (e.g., the UE is triggered to transmit and/or generate the power-related report) based on (e.g., in response to) a determination (e.g., detection and/or identification) that one, some and/or all of the second set of conditions are met. In some examples, based on (e.g., in response to) triggering transmission and/or generation of a power-related report (e.g., in response to determining that one, some and/or all of the second set of conditions are met), the UE may generate and/or transmit the power-related report.

In some examples, transmission and/or generation of a power-related report may be triggered using one or more of the techniques provided herein with respect to the first concept, FIG. 10, FIG. 11, and/or other description herein. In some examples, whether or not the second set of conditions is met may be determined (e.g., detected and/or identified) using one or more of the techniques provided herein with respect to the first concept, FIG. 10, FIG. 11, and/or other parts of the present disclosure. In some examples, whether or not to transmit a power-related report may be determined using one or more of the techniques provided herein with respect to the first concept, FIG. 10, FIG. 11, and/or other parts of the present disclosure. In some examples, the second set of conditions being met may be detected and/or identified using one or more of the techniques provided herein with respect to the first concept, FIG. 10, FIG. 11, and/or other parts of the present disclosure. In some examples, the UE may transmit a power-related report (e.g., a triggered power-related report) using one or more of the techniques provided herein with respect to the first concept, FIG. 10, FIG. 11, and/or other parts of the present disclosure. In some examples, the UE may transmit a power-related report in one or more uplink transmissions of concurrent uplink transmissions (e.g., simultaneous uplink transmissions) using one or more of the techniques provided herein with respect to the first concept, FIG. 10, FIG. 11, and/or other parts of the present disclosure (e.g., the UE may transmit the power-related report when and/or after transmission of the power-related report is triggered).

Third Concept

The third concept is that a UE may be configured with a first number of groups (e.g., pairs) of SRS resources (and/or a number of groups of SRS resource indexes). In the present disclosure, the term "group of SRS resources" may refer to and/or be used interchangeably with "pair of SRS resources". A group of SRS resources may comprise two SRS resources. Embodiments are contemplated in which a group of SRS resources comprises more than two SRS resources. The first number of groups of SRS resources is smaller than or equal to a second number of groups of SRS resources. The UE may transmit information related to the second number of groups of SRS resource to network. The UE may report a capability associated with a number of groups of SRS resources that the UE can maintain. For example, the information transmitted to the network may be indicative of the second number of groups of SRS resources, wherein the second number of groups of SRS resources may correspond to the number of groups of SRS resources that the UE can maintain (e.g., the second number of groups of SRS resources may correspond to a maximum number of groups of SRS resources that the UE is able to maintain). In some examples, the UE does not expect the first number of groups of SRS resources (e.g., a number of groups of SRS resources of one or more groups of SRS resources with which the UE is configured) to be larger than the second number of groups of SRS resources.

In an example, the UE reports two groups of SRS resources to network. For example, the UE may report, to the network, that the second number of groups of SRS resources, such as the maximum number of groups of SRS resources that the UE is able to maintain, is two. The UE may be configured with a first SRS resource set and a second SRS resource set, wherein the first SRS resource set and the second SRS resource set may have the same usage (e.g., both the first SRS resource set and the second SRS resource set are for beam management, non-codebook-based PUSCH transmission, codebook-based PUSCH transmission, and/or antenna switch). In some examples, the UE expects to be configured with up to two groups of SRS resources which are timing overlapping (e.g., which overlap in time domain). In the example, SRS resources 1, 2, 3, 4, 5, 6, 7, 8 are associated with the first SRS resource set and SRS resources 1', 2', 3', 4', 5', 6', 7', 8' are associated with the second SRS resource set. The UE may be configured such that up to two groups of SRS resources from each SRS resource set is time overlapping. In the example, {SRS resource 1, SRS resource 1' }, {SRS resource 2, SRS resource 2' } may be time overlapping while other SRS resources (other than {SRS resource 1, SRS resource 1'}, {SRS resource 2, SRS resource 2' }) are not configured with time overlapping.

A group of SRS resources comprises two or more SRS resources which the UE may concurrently (e.g., simultaneously) transmit in a timing. In some examples, the UE may transmit a first SRS resource (e.g., one SRS resource) of the group of SRS resources via a first UE beam/spatial filter/ spatial relation/spatial information/spatial relation information, and the UE may transmit a second SRS resource (e.g., one SRS resource other than the first SRS resource) of the group of SRS resources via a second UE beam/spatial filter/spatial relation/spatial information/spatial relation information (e.g., the first UE beam/spatial filter/spatial relation/spatial information/spatial relation information is different than the second UE beam/spatial filter/spatial relation/spatial information/spatial relation information). In some examples, (for intra-group of SRS resources, such as for intra-pair of SRS resources, for example), the UE may be configured with the two or more SRS resources in the group of SRS resources overlapped in time domain (e.g., the two or more SRS resources in the group of SRS resources overlap in time domain), and/or the UE may be able to transmit the two or more SRS resources concurrently (e.g., simultaneously). In some examples, (for inter-group of SRS resources, such as for inter-pair of SRS resources), the UE may not be able to transmit two groups of SRS resources concurrently (e.g., simultaneously) and/or the UE does not expect to be configured with two groups of SRS resource which overlap in time domain. In some examples, a first SRS resource (e.g., one SRS resource) of the two or more SRS resources is associated with a first SRS resource set and a second SRS resource (e.g., one SRS resource other than the first SRS resource) of the two or more SRS resources is associated with a second SRS resource set.

In some examples, the first SRS resource set and the second SRS resource set are associated with same usage. In some examples, the first SRS resource set may comprise the same number of SRS resources as the second SRS resource set. Alternatively and/or additionally, a number of SRS resources of the first SRS resource set may be different than a number of SRS resources of the second SRS resource set. In some examples, the first SRS resource set may be associated with a first UE panel (e.g., one UE panel) and the second SRS resource set may be associated with a second UE panel (e.g., one UE panel other than the first UE panel).

Figure 13:
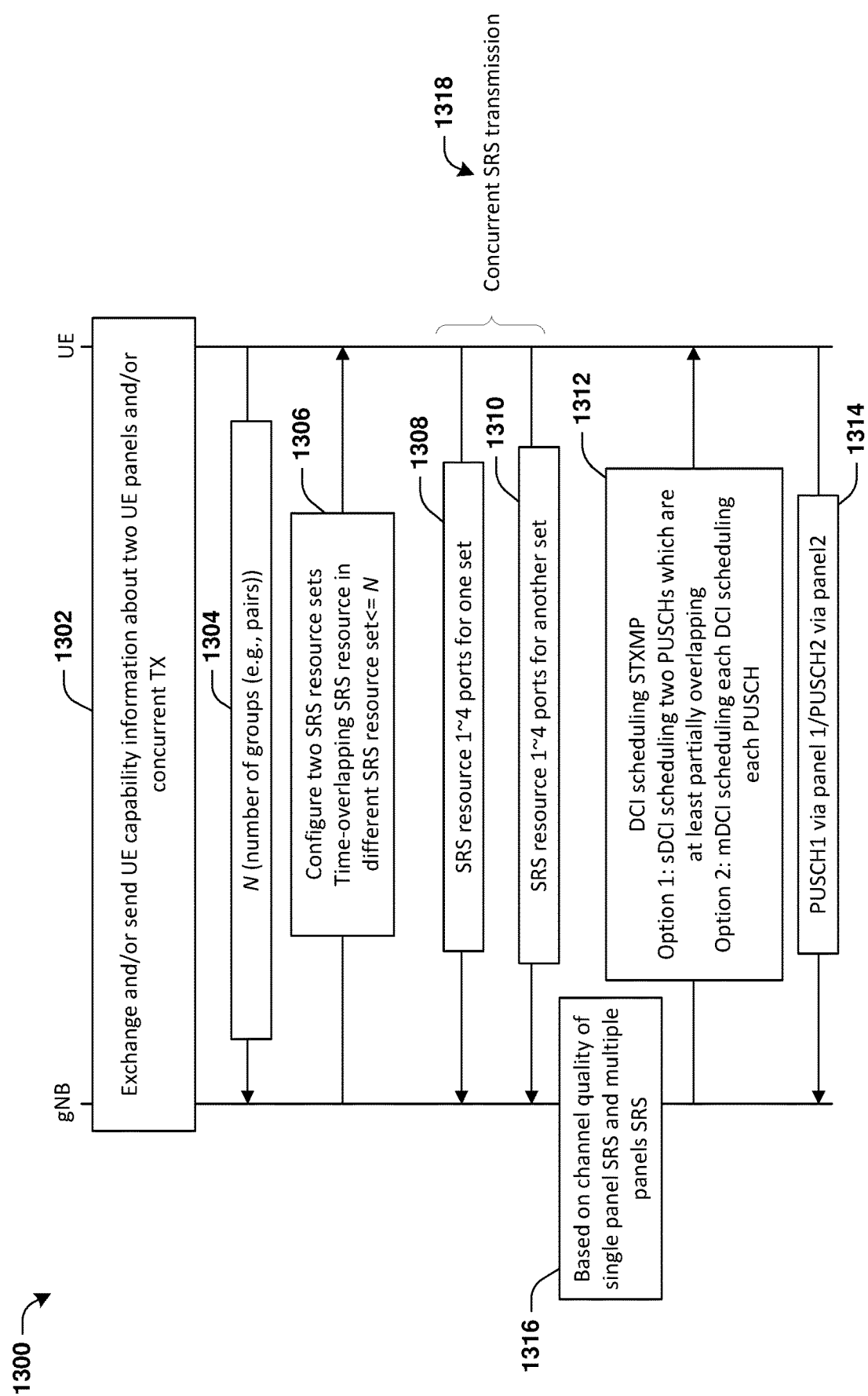
FIG. 13 is a diagram illustrating an exemplary scenario in which a UE reports its capability for concurrent uplink transmission according to one exemplary embodiment.

FIG. 13 illustrates a scenario 1300 in which a UE reports information associated with its capability for concurrent uplink transmission (e.g., simultaneous uplink transmission). In some examples, at 1302, the UE and a network (e.g., a gNB) may exchange and/or send UE capability information associated with multiple (e.g., two) UE panels of the UE and/or UE capability information associated with concurrent (e.g., simultaneous) uplink transmission. In some examples, the UE may transmit, to the network, a report 1304 indicative of a number of groups N. The N may correspond to a number of beam groups (e.g., a number of beam pairs), such as a number of beam groups (e.g., a maximum number of beam groups) of one or more beam groups that the UE is configured with, wherein each beam group of the one or more beam groups may be used to transmit two or more SRS resources concurrently (e.g., simultaneously). Alternatively and/or additionally, N may correspond to a number of SRS resource groups (e.g., a number of SRS resource pairs), such as a number of SRS resource groups (e.g., a maximum number of SRS resource groups) of one or more SRS resource groups that the UE is configured with, wherein each SRS resource group of the one or more SRS resource groups may be used to transmit two or more SRS resources concurrently (e.g., simultaneously). In some examples, the report 1304 may be the same message as (or a different message than) a message that indicates a capability of the UE for concurrent (e.g., simultaneous) uplink transmission. The UE may expect to be configured with up to N number of groups of SRS resources (e.g., the UE may not expect to be configured with a plurality of groups of SRS resources having a number of groups of SRS resources that exceeds N). In some examples, the UE may receive, from the network, a configuration 1306 of multiple (e.g., two) SRS resource sets. In some examples, time-overlapping SRS resources in different SRS resource sets of the multiple (e.g., two) SRS resource sets may not exceed N. In some examples, {SRS resource 1, SRS resource 1'} is one group of SRS resources (of the multiple groups of SRS resources, for example) that is configured in same symbol. The UE may transmit one or more first SRS resources associated with 1 port, 2 ports, 3 ports, or 4 ports in one set (via transmission 1308, for example). The UE may transmit one or more second SRS resources associated with 1 port, 2 ports, 3 ports, or 4 ports in another set (via transmission 1310, for example). The one set may correspond to a first SRS resource set comprising the one or more first SRS resources and/or the another set may correspond to a second SRS resource set comprising the one or more second SRS resources. In an example, transmission 1308 may comprise transmission of SRS resource 1 and/or transmission 1310 may comprise transmission of SRS resource 1'. In some examples, transmission 1308 and transmission 1310 may be performed, concurrently (e.g., simultaneously), via different beams/spatial filters/spatial relations/spatial information sets/spatial relation information sets of the UE. For example, transmission 1308 and transmission 1310 may be performed in a concurrent SRS transmission 1318 (e.g., a simultaneous SRS transmission). For example, the UE may transmit SRS resource 1 and SRS resource 1' in the same symbol. The network may determine 1316 whether or not to schedule concurrent (e.g., simultaneous) uplink transmissions based on the number of groups of SRS resources N and/or based on an uplink channel quality. In some examples, the network may determine (e.g., identify and/or recognize) the uplink channel quality (e.g., uplink channel state, uplink pathloss, uplink channel distortion, Doppler shift, Doppler spread and/or delay spread) based on the SRS resource 1 and/or SRS resource 1'. In some examples, the network may determine (e.g., identify and/or recognize) interference from SRS resource 1 and/or SRS resource 1'. In some examples, the network may determine (e.g., derive) intra-UE's interference based on SRS resource 1 and/or SRS resource 1'. In the scenario 1300, for a channel associated with SRS resource 1, network may measure or derive interference based on SRS resource 1'. In some examples, based on the determination 1316 of whether or not to schedule concurrent uplink transmissions (for the UE, for example) and/or whether or not to schedule simultaneous transmission across multiple panels (STXMP) (for the UE, for example), the network may transmit one or more DCIs 1312. In some examples, if the determination 1316 comprises determining to schedule concurrent (e.g., simultaneous) uplink transmissions for the UE (and/or if the determination 1316 comprises determining to schedule STXMP), the one or more DCIs 1312 may schedule multiple (e.g., two) uplink transmissions (e.g., PUSCHs) that are at least partially overlapping in time domain. In an example (e.g., according to Option 1, single DCI (sDCI) scheduling multiple TRPs uplink transmissions), the one or more DCIs may comprise a DCI (e.g., a sDCI) that schedules multiple (e.g., two) PUSCHs that are at least partially overlapping in time domain. In an example (e.g., according to Option 2, multiple DCIs (mDCI) scheduling multiple TRPs uplink transmissions), the one or more DCIs may comprise a first DCI that schedules a first PUSCH and a second DCI schedules a second PUSCH, wherein the first PUSCH and the second PUSCH may at least partially overlap in time domain. In some examples, the UE may perform concurrent uplink transmission 1314 of the multiple uplink transmissions (e.g., the multiple uplink transmissions may comprise transmission of PUSCH 1 via a UE panel 1 of the UE and transmission of PUSCH 2 via a UE panel 2 of the UE).

One, some and/or all of the foregoing examples, concepts, techniques and/or embodiments can be formed and/or combined to a new embodiment.

In some examples, embodiments disclosed herein, such as embodiments described with respect to the first concept, the second concept and the third concept, may be implemented independently and/or separately. Alternatively and/or additionally, a combination of embodiments described herein, such as embodiments described with respect to the first concept, the second concept and/or the third concept, may be implemented. Alternatively and/or additionally, a combination of embodiments described herein, such as embodiments described with respect to the first concept, the second concept and/or the third concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, in some examples, a TRP (mentioned above, for example) may be associated with (and/or may be replaced by and/or may be interchangeable with) a CORESET Pool (e.g., a coresetPoolIndex) of a Cell. For a UE performing single TRP operation on a Cell, the UE may receive and/or monitor signaling from the cell via a single CORESET pool. For a UE performing multi-TRP operation on a Cell, the UE may receive and/or monitor signaling from the cell via multiple CORESET pools.

With respect to one or more embodiments herein, in some examples, the TRP (mentioned above, for example) may be associated with (and/or may be replaced by and/or may be interchangeable with) a SRS resource (e.g., a SRS resource set) of a Cell. For a UE performing single TRP operation on a Cell, the UE may receive and/or monitor signaling on the cell via an activated Transmission Configuration Indicator (TCI) state (e.g., one activated TCI state). For a UE performing multi-TRP operation on a Cell, the UE may receive and/or monitor signaling via multiple activated TCI states.

With respect to one or more embodiments herein, in some examples, the TRP (mentioned above, for example) may be associated with (and/or may be replaced by and/or may be interchangeable with) one or more TCI states of a Cell. For a UE performing single TRP operation on a Cell, the UE may transmit SRS on the cell via a SRS resource (e.g., one SRS resource). For a UE performing multi-TRP operation on a Cell, the UE may transmit SRS via multiple SRS resources, wherein each SRS resource of the multiple SRS resources may be associated with a TRP (e.g., each SRS resource of the multiple SRS resources may be associated with a different TRP).

With respect to one or more embodiments herein, in some examples, the TRP (mentioned above, for example) may be associated with (and/or may be replaced by and/or may be interchangeable with) PUSCH or PUCCH. For a UE performing intra-cell mTRP operation on a Cell, the UE may perform UL transmission via multiple PUSCHs associated with the Cell. For a UE performing inter-cell mTRP operation on a Cell, the UE may perform UL transmissions via multiple PUSCHs associated with different Cells, wherein the UL transmissions may comprise transmitting a same TB on different PUSCHs associated with different Cells.

With respect to one or more embodiments herein, in some examples, the TRP (mentioned above, for example) may be associated with (and/or may be replaced by and/or may be interchangeable with) a spatial relation information of a Cell. For a UE performing single TRP operation on a Cell, the UE may activate (and/or may be indicated with and/or configured with) a spatial relation information (e.g., one spatial relation information), such as one spatial relation information of the Cell. For a UE performing multi-TRP operation on a Cell, the UE may activate (and/or may be indicated with and/or configured with) more than one spatial relation information (of the Cell), wherein each of the more than one spatial relation information (e.g., each spatial relation information set of multiple spatial relation information sets) may be associated with a TRP (e.g., each spatial relation information set of the multiple spatial relation information sets may be associated with a different TRP).

With respect to one or more embodiments herein, in some examples, a non-serving cell of a UE may be associated with (e.g., configured with) a physical cell identity (PCI) value different from PCI values of Serving Cells of the UE. A non-serving Cell may be a neighboring Cell of the UE.

With respect to one or more embodiments herein, in some examples, network is not allowed to schedule concurrent (e.g., simultaneous) uplink transmission (based on a group of SRS resources such as a pair of SRS resources, a group of SRIs such as a pair of SRIs, and/or group of UL beams/spatial filters/spatial relations/spatial information sets/spatial relation information sets such as a pair of UL beams/spatial filters/spatial relations/spatial information sets/spatial relation information sets) if a condition is met, wherein the condition is met if: (i) UE reports capability of not supporting concurrent (e.g., simultaneous) uplink transmission or UE does not report capability of supporting concurrent (e.g., simultaneous) uplink transmission; (ii) UL channel quality is worse (e.g., lower than) than a threshold (e.g., network's received L1-RSRP and/or L3-RSRP and/or Signal to Interference plus Noise Ratio (SINR) is worse than a threshold); (iii) power-related report of the UE does not include the group of SRS resources such as the pair of SRS resources, and/or network receives the power-related report of the UE; and/or (iv) timing of concurrent (e.g., simultaneous) uplink transmission received by the network from UE are with a timing difference (e.g., a TA difference) exceeding a threshold and/or a difference between two TAs for UE is larger than a threshold.

With respect to one or more embodiments herein, in some examples, UE may be not able to perform concurrent (e.g., simultaneous) uplink transmission (based on a group of SRS resources such as a pair of SRS resources, a group of SRIs such as a pair of SRIs, and/or group of UL beams/spatial filters/spatial relations/spatial information sets/spatial relation information sets such as a pair of UL beams/spatial filters/spatial relations/spatial information sets/spatial relation information sets) if a condition is met, wherein the condition is met if: (i) a sum of transmit powers of concurrent (e.g., simultaneous) uplink transmissions is larger than a threshold; (ii) a DL L1-RSRP or L3-RSRP (e.g., one DL L1-RSRP or L3-RSRP) associated with an uplink transmission (e.g., one uplink transmission) of concurrent uplink transmissions (e.g., simultaneous uplink transmissions) is smaller than a RSRP threshold; (iii) a pathloss (e.g., one pathloss) associated with an uplink transmission (e.g., one uplink transmission) of concurrent uplink transmissions (e.g., simultaneous uplink transmissions) is larger than a pathloss threshold; and/or (iv) a timing difference (e.g., a TA difference) is larger than a TA threshold.

With respect to one or more embodiments herein, in some examples, at least one symbol of a first uplink channel/signal (e.g., one uplink channel/signal) of the multiple (e.g., two) uplink channels/signals is overlapped with a second uplink channel/signal (e.g., one uplink channel/signal other than the first uplink channel/signal) of the multiple (e.g., two) uplink channels/signals (in time domain). In some examples, a first uplink channel/signal (e.g., one uplink channel/signal) of the multiple (e.g., two) uplink channels/signals is fully overlapped with a second uplink channel/signal (e.g., one uplink channel/signal other than the first uplink channel/signal) of the multiple (e.g., two) uplink channels/signals in time domain.

With respect to one or more embodiments herein, in some examples, the multiple (e.g., two) uplink channels/signals may be multiplexed (with each other) in frequency domain. In some examples, the multiple (e.g., two) uplink channels/signals may be multiplexed (with each other) in spatial domain.

With respect to one or more embodiments herein, in some examples, none of PRB or resource element of a first uplink channel/signal (e.g., one uplink channel/signal) of the multiple (e.g., two) uplink channels/signals is overlapped with a second uplink channel/signal (e.g., one uplink channel/signal other than the first uplink channel/signal) of the multiple (e.g., two) uplink channels/signals (in frequency domain).

With respect to one or more embodiments herein, in some examples, at least one PRB or resource element of a first uplink channel/signal (e.g., one uplink channel/signal) of the multiple (e.g., two) uplink channels/signals is overlapped with a second uplink channel/signal (e.g., one uplink channel/signal other than the first uplink channel/signal) of the multiple (e.g., two) uplink channels/signals (in frequency domain).

With respect to one or more embodiments herein, in some examples, all PRBs or resource elements of a first uplink channel/signal (e.g., one uplink channel/signal) of the multiple (e.g., two) uplink channels/signals is overlapped with a second uplink channel/signal (e.g., one uplink channel/signal other than the first uplink channel/signal) of the multiple (e.g., two) uplink channels/signals (in frequency domain).

With respect to one or more embodiments herein, in some examples, the UE has at least two UE panels.

With respect to one or more embodiments herein, in some examples, the UE may perform concurrent (e.g., simultaneous) uplink transmission (via the at least two UE panels).

With respect to one or more embodiments herein, in some examples, a first SRS resource (e.g., a first SRS resource set) is associated with a first panel of the at least two UE panels.

With respect to one or more embodiments herein, in some examples, a second SRS resource (e.g., a second SRS resource set) is associated with a second panel of the at least two UE panels.

With respect to one or more embodiments herein, in some examples, the UE may be configured with a first set of power control parameters.

With respect to one or more embodiments herein, in some examples, the UE may be configured with a second set of power control parameters.

With respect to one or more embodiments herein, in some examples, the first set of power control parameters is associated with the first panel of the at least two UE panels.

With respect to one or more embodiments herein, in some examples, the second set of power control parameters is associated with the second panel of the at least two UE panels.

With respect to one or more embodiments herein, in some examples, target received power in network side (e.g., $P_0$), coefficient for pathloss compensation (e.g., alpha), and/or closed loop index in the first set of power control parameters may be configured to be different than the second set of power control parameters.

With respect to one or more embodiments herein, in some examples, the UE may have two different $P_{CMAX}$ values for the at least two panels.

In some examples, a first $P_{CMAX}$ value (e.g., one $P_{CMAX}$ value) of the two different $P_{CMAX}$ values is associated with the first SRS resource (e.g., the first SRS resource set).

With respect to one or more embodiments herein, in some examples, a second $P_{CMAX}$ value (e.g., one $P_{CMAX}$ value other than the first $P_{CMAX}$ value) of the two different $P_{CMAX}$ values is associated with the second SRS resource (e.g., the second SRS resource set).

With respect to one or more embodiments herein, a "beam" (mentioned above, for example) may be replaced by and/or interchangeable with "TCI state".

Figure 14:
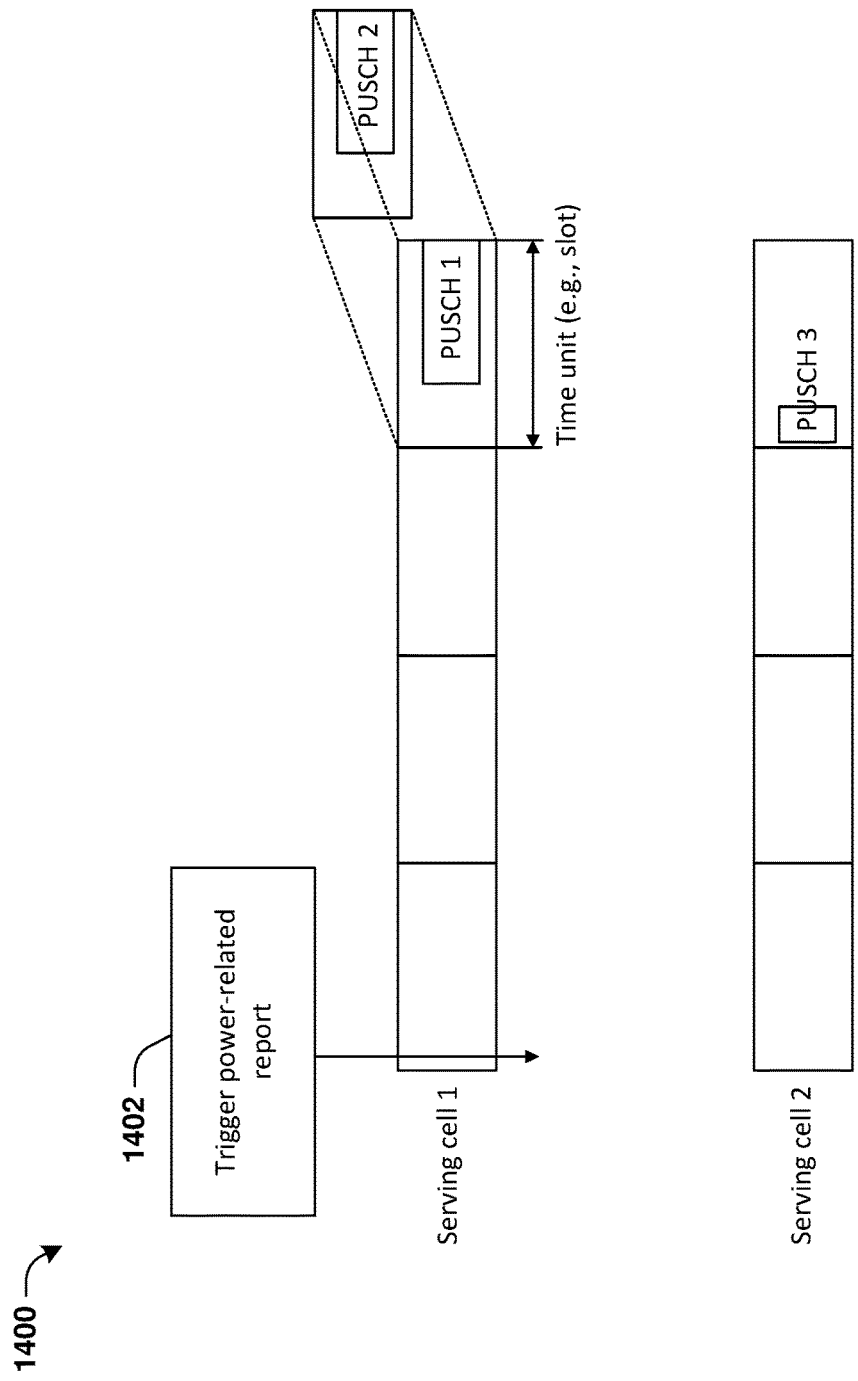
FIG. 14 is a diagram illustrating an exemplary scenario in which a UE communicates with a network via multiple serving cells according to one exemplary embodiment.

FIG. 14 illustrates a scenario 1400 in which the UE communicates a network (e.g., transmits one or more signals to the network and/or receives one or more signals from the network) via multiple (e.g., two) serving cells comprising Serving Cell 1 and Serving Cell 2). In the scenario 1400, the UE has capability of performing concurrent (e.g., simultaneous) uplink transmission. In some examples, transmission and/or generation of a power-related report is triggered 1402 by the UE and/or a network, such as using one or more of the techniques provided herein. The UE has an uplink grant scheduling PUSCH 3 in Serving Cell 2. The PUSCH 3 may be the earliest new transmission after the power-related report is triggered 1402 (e.g., there are no other PUSCH scheduled for the UE between the time at which the power-related report is triggered 1402 and a time of PUSCH 3). The PUSCH 3 may accommodate the power-related report. In some examples, the power-related report may comprise a report for Serving Cell 1 and a report for Serving Cell 2. The UE may determine either a real report or virtual report for Serving Cell 1 and for Serving Cell 2. In some examples, since there is the PUSCH 3 in Serving Cell 2, the UE determine a real report for Serving Cell 2. In some examples, based on (e.g., in response to) a scheduled and/or configured uplink transmission in Serving Cell 1 (e.g., PUSCH 1 and PUSCH 2), the UE may determine a real report for the Serving Cell 1. In some examples, PUSCH 1 and PUSCH 2 have (and/or are) at least one symbol overlapping in time domain. In some examples, the UE may transmit PUSCH 1 via a first beam/spatial filter/spatial relation/spatial information/spatial relation information and transmit PUSCH 2 via a second beam/spatial filter/spatial relation/spatial information/spatial relation information. In some examples, PUSCH 1 is associated with a first UE panel (e.g., UE panel 1) and/or PUSCH 2 is associated with a second UE panel (e.g., UE panel 2). In some examples, the UE may determine whether or not to determine one real report and one virtual report for Serving Cell 1 based on whether or not the UE transmits both PUSCH 1 and PUSCH 2 in Serving Cell 1. In some examples, reports (determined by the UE, for example) for Serving Cell 1 may comprise {virtual report associated with PUSCH 1, virtual report associated with PUSCH 2}, {real report associated with PUSCH 1, virtual report associated with PUSCH 2}, {real report associated with PUSCH 1, real report associated with PUSCH 2}, or {virtual report associated with PUSCH 1, real report associated with PUSCH 2}. In some examples, a real report may correspond to a report, for one TRP in one serving cell, that is based on power of actual transmission and/or actual uplink grant. In some examples, a virtual report may correspond to a report, for one TRP in one serving cell, that is based on a default set of power control parameters.

Figure 15:
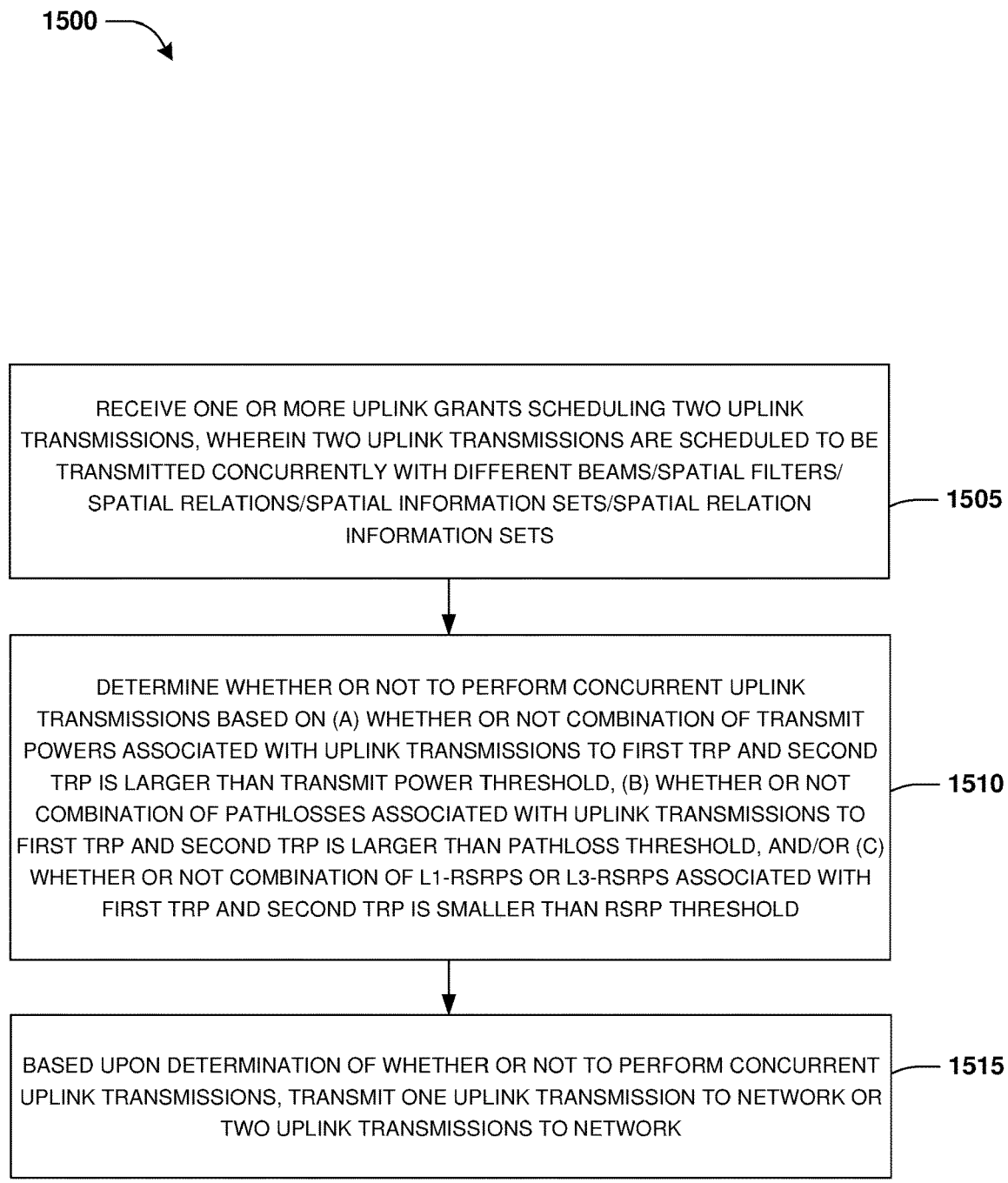
FIG. 15 is a flow chart according to one exemplary embodiment.

FIG. 15 is a flow chart 1500 according to one exemplary embodiment from the perspective of a UE. In step 1505, the UE receives one or more uplink grants scheduling two uplink transmissions, wherein the two uplink transmissions are scheduled to be transmitted concurrently (e.g., simultaneously) with different beams/spatial filters/spatial relations/spatial information sets/spatial relation information sets. In step 1510, the UE determines whether or not to perform concurrent uplink transmissions (e.g., simultaneous uplink transmissions) based on (A) whether or not a combination (e.g., a sum) of transmit powers associated with uplink transmissions to a first TRP and a second TRP is larger than a transmit power threshold (e.g., the third transmit power threshold discussed above, such as 23 dBM or other value), (B) whether or not a combination (e.g., a sum) of pathlosses associated with uplink transmissions to the first TRP and the second TRP is larger than a pathloss threshold (e.g., the third pathloss threshold discussed above), and/or (C) whether or not a combination (e.g., a sum) of L1-RSRPs or L3-RSRPs associated with the first TRP and the second TRP is smaller than a RSRP threshold (e.g., the third RSRP threshold discussed above). In step 1515, based on the determination of whether or not to perform the concurrent uplink transmissions (e.g., in response to the determination of whether or not to perform the concurrent uplink transmissions), the UE transmits one uplink transmission to a network or two uplink transmissions to the network (e.g., the two uplink transmissions may be performed concurrently, such as simultaneously).

In one embodiment, the combination of transmit powers comprises a combination (e.g., a sum) of a first transmit power associated with an uplink transmission to the first TRP and a second transmit power associated with an uplink transmission to the second TRP.

In one embodiment, the combination of pathlosses comprises a combination (e.g., a sum) of a first pathloss associated with an uplink transmission to the first TRP and a second pathloss associated with an uplink transmission to the second TRP.

In one embodiment, the combination of L1-RSRPs or L3-RSRPs comprises a combination (e.g., a sum) of a first L1-RSRP associated with the first TRP and a second L1-RSRP associated with the second TRP.

In one embodiment, the combination of L1-RSRPs or L3-RSRPs comprises a combination (e.g., a sum) of a first L3-RSRP associated with the first TRP and a second L3-RSRP associated with the second TRP.

In one embodiment, the one uplink transmission comprises a PUSCH.

In one embodiment, two uplink transmissions comprise a first PUSCH and/or a second PUSCH.

In one embodiment, the two uplink transmissions comprise (and/or are) one or more symbols overlapping in time domain. For example, a first uplink transmission (e.g., the first PUSCH) of the two uplink transmissions may be performed on one or more first symbols and a second uplink transmission (e.g., the second PUSCH) of the two uplink transmissions may be performed on one or more second symbols, wherein the one or more first symbols at least partially overlap with the one or more second symbols.

In one embodiment, the UE may transmit the two uplink transmission concurrently (e.g., simultaneously).

In one embodiment, the UE transmits the first PUSCH via a first beam/spatial filter/spatial relation/spatial information/spatial relation information. The first beam/spatial filter/spatial relation/spatial information/spatial relation information is the same as a beam/spatial filter/spatial relation/spatial information/spatial relation information for transmitting a first SRS resource.

In one embodiment, the UE transmits the second PUSCH via a second beam/spatial filter/spatial relation/spatial information/spatial relation information. The second beam/spatial filter/spatial relation/spatial information/spatial relation information is the same as a beam/spatial filter/spatial relation/spatial information/spatial relation information for transmitting a second SRS resource.

Referring back to FIGS. 3 and 4, in one exemplary embodiment of a UE, the device 300 includes a program code 312 stored in the memory 310. The CPU 308 could execute program code 312 to enable the UE (i) to receive one or more uplink grants scheduling two uplink transmissions, wherein the two uplink transmissions are scheduled to be transmitted concurrently (e.g., simultaneously) with different beams/spatial filters/spatial relations/spatial information sets/spatial relation information sets, (ii) to determine whether or not to perform concurrent uplink transmissions (e.g., simultaneous uplink transmissions) based on (A) whether or not a combination (e.g., a sum) of transmit powers associated with uplink transmissions to a first TRP and a second TRP is larger than a transmit power threshold (e.g., the third transmit power threshold discussed above, such as 23 dBM or other value), (B) whether or not a combination (e.g., a sum) of pathlosses associated with uplink transmissions to the first TRP and the second TRP is larger than a pathloss threshold (e.g., the third pathloss threshold discussed above), and/or (C) whether or not a combination (e.g., a sum) of L1-RSRPs or L3-RSRPs associated with the first TRP and the second TRP is smaller than a RSRP threshold (e.g., the third RSRP threshold discussed above), and (iii) to transmit, based on the determination of whether or not to perform the concurrent uplink transmissions (e.g., in response to the determination of whether or not to perform the concurrent uplink transmissions), one uplink transmission to a network or two uplink transmissions (e.g., concurrently, such as simultaneously) to the network. Furthermore, the CPU 308 can execute the program code 312 to perform one, some and/or all of the above-described actions and steps and/or others described herein.

FIG. 16 is a flow chart 1600 according to one exemplary embodiment from the perspective of a UE. In step 1605, the UE triggers transmission of a report to a network in response to determining that (e.g., detecting) (A) a combination (e.g., a sum) of a first transmit power of a first uplink transmission and a second transmit power of a second uplink transmission is larger than a threshold, (B) a combination (e.g., a sum) of a first variation of a first pathloss estimate associated with the first uplink transmission and a second variation of a second pathloss estimate associated with the second uplink transmission is larger than a variation threshold, and/or (C) a number of failed concurrent scheduling attempts (e.g., a number of failed simultaneous scheduling attempts) for the first uplink transmission and the second uplink transmission is larger than a counting threshold, wherein the first uplink transmission and the second uplink transmission are scheduled (e.g., configured) to be transmitted concurrently (e.g., simultaneously) on a first serving cell. In step 1610, the UE transmits the report, to the network, in response to triggering transmission of the report.

In one embodiment, the UE is configured to perform concurrent (e.g., simultaneous) uplink transmissions on the first serving cell.

In one embodiment, the first uplink transmission and the second uplink transmission overlap in time domain.

In one embodiment, the first uplink transmission is associated with a first TRP and/or the UE transmits the first uplink transmission via a first TCI state.

In one embodiment, the second uplink transmission is associated with a second TRP and/or the UE transmits the second uplink transmission via a second TCI state.

In one embodiment, the UE transmits the report via the first uplink transmission and/or the second uplink transmission.

In one embodiment, the first uplink transmission and/or the second uplink transmission are associated with an earliest scheduled grant after the UE triggers transmission of the report.

In one embodiment, the UE transmits the report on a third uplink transmission (e.g., an uplink transmission different than the first uplink transmission and/or the second uplink transmission) on a second serving cell (e.g., a serving cell different than the first serving cell).

In one embodiment, the first uplink transmission corresponds to a PUSCH or a PUCCH.

In one embodiment, the second uplink transmission corresponds to a PUSCH or a PUCCH.

In one embodiment, the third uplink transmission corresponds to a PUSCH or a PUCCH.

In one embodiment, the first uplink transmission and the second uplink transmission are new/initial transmissions. In an example, the first uplink transmission is a first new/initial transmission and/or the second uplink transmissions is a second new/initial transmission.

In one embodiment, the first uplink transmission and the second uplink transmission (that are new/initial transmissions and/or are not for retransmissions, for example) are both for a new TB transmission or for a new Medium Access Control Protocol Data Unit (MAC PDU) transmission. In an example, each uplink transmission of the first uplink transmission and the second uplink transmission comprises a new TB transmission (e.g., one new TB transmission), such as where the first uplink transmission and the second uplink transmission both comprise transmission of the same TB (and/or where the first uplink transmission and the second uplink transmission are not retransmissions of the TB). In an example, each uplink transmission of the first uplink transmission and the second uplink transmission comprises a new MAC PDU transmission (e.g., one new MAC PDU transmission), such as where the first uplink transmission and the second uplink transmission both comprise transmission of the same TB (and/or where the first uplink transmission and the second uplink transmission are not retransmissions of the TB).

In one embodiment, the first uplink transmission and the second uplink transmission (that are new/initial transmissions and/or are not for retransmissions, for example) are for different new TB transmissions or for different new MAC PDU transmissions. In an example, the first uplink transmission comprises a first new TB transmission and the second uplink transmission comprises a second new TB transmission, where the first new TB transmission is different than the second new TB transmission. In an example, the first uplink transmission comprises a first new MAC PDU transmission and the second uplink transmission comprises a second new MAC PDU transmission, where the first new MAC PDU transmission is different than the second new MAC PDU transmission.

In one embodiment, the report may be a power-related report, and/or a power headroom report.

In one embodiment, the report comprises a first power-related information associated with the first uplink transmission and a second power related information associated with the second uplink transmission.

In one embodiment, the first power-related information is indicative of (and/or comprises information associated with) a power difference between a first maximum transmit power and a first transmit power for the first uplink transmission.

In one embodiment, the second power-related information is indicative of (and/or comprises information associated with) a power difference between a second maximum transmit power and a second transmit power for the second uplink transmission.

In one embodiment, the first transmit power is determined based on (e.g., derived from) a first set of power control parameters associated with the first TCI state and the second transmit power is determined based on (e.g., derived from) a second set of power control parameters associated with the second TCI state.

Referring back to FIGS. 3 and 4, in one exemplary embodiment of a UE, the device 300 includes a program code 312 stored in the memory 310. The CPU 308 could execute program code 312 to enable the UE (i) to trigger transmission of a report to a network in response to determining that (e.g., detecting) (A) a combination (e.g., a sum) of a first transmit power of a first uplink transmission and a second transmit power of a second uplink transmission is larger than a threshold, (B) a combination (e.g., a sum) of a first variation of a first pathloss estimate associated with the first uplink transmission and a second variation of a second pathloss estimate associated with the second uplink transmission is larger than a variation threshold, and/or (C) a number of failed concurrent scheduling attempts (e.g., a number of failed simultaneous scheduling attempts) for the first uplink transmission and the second uplink transmission is larger than a counting threshold, wherein the first uplink transmission and the second uplink transmission are scheduled (e.g., configured) to be transmitted concurrently (e.g., simultaneously) on a first serving cell, and (ii) to transmit the report, to the network, in response to triggering transmission of the report. Furthermore, the CPU 308 can execute the program code 312 to perform one, some and/or all of the above-described actions and steps and/or others described herein.

Figure 17:
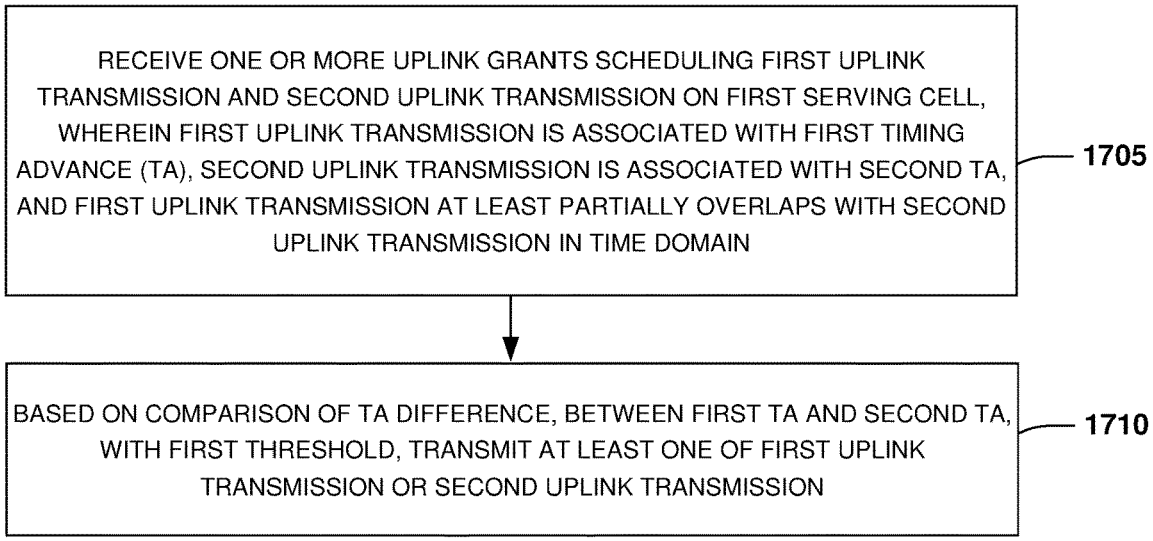
FIG. 17 is a flow chart according to one exemplary embodiment.

FIG. 17 is a flow chart 1700 according to one exemplary embodiment from the perspective of a UE in a wireless communication system. In step 1705, the UE receives one or more uplink grants scheduling a first uplink transmission and a second uplink transmission on a first serving cell. The first uplink transmission is associated with a first TA. For example, the first uplink transmission is to be transmitted by applying the first TA (e.g., the one or more UL grants may indicate that the first uplink transmission is to be transmitted by applying the first TA). The second uplink transmission is associated with a second TA. For example, the second uplink transmission is to be transmitted by applying the second TA (e.g., the one or more UL grants may indicate that the second uplink transmission is to be transmitted by applying the second TA). The first uplink transmission at least partially overlaps with the second uplink transmission in time domain (e.g., a time period in which the UE is scheduled to perform the first uplink transmission at least partially overlaps with a time period in which the UE is scheduled to perform the second uplink transmission). In step 1710, based on (e.g., in response to) a comparison of a TA difference, between the first TA and the second TA, with a first threshold, the UE transmits the first uplink transmission and/or the second uplink transmission. For example, the UE may determine whether or not to concurrently transmit both the first uplink transmission and the second uplink transmission based on the comparison of the TA difference with the first threshold. The comparison of the TA difference with the first threshold may correspond to a determination of whether the TA difference is larger than the first threshold or whether the TA difference is smaller than or equal to the first threshold.

In one embodiment, the UE transmits the first uplink transmission and drops (e.g., skips, omits and/or does not perform) the second uplink transmission based on (e.g., in response to) the TA difference being larger than the first threshold (e.g., the UE transmits the first uplink transmission and drops the second uplink transmission based on the comparison comprising a determination that the TA difference is larger than the first threshold). In some examples, the UE transmits the first uplink transmission on the first serving cell.

In one embodiment, the UE performs concurrent transmission (e.g., simultaneous transmission) of the first uplink transmission and the second uplink transmission on the first serving cell (e.g., the UE transmits the first uplink transmission and the second uplink transmission concurrently, such as simultaneously) based on (e.g., in response to) the TA difference being smaller than or equal to the first threshold (e.g., the UE performs the concurrent transmission of the first uplink transmission and the second uplink transmission on the first serving cell based on the comparison comprising a determination that the TA difference is smaller than or equal to the first threshold).

In one embodiment, the first uplink transmission is associated with a first TRP and/or the UE transmits the first uplink transmission via a first TCI state.

In one embodiment, the second uplink transmission is associated with a second TRP and/or the UE transmits the first uplink transmission via a second TCI state.

In one embodiment, the first uplink transmission corresponds to a first PUSCH or a first PUCCH (e.g., the first uplink transmission comprises transmission of the first PUSCH or the first PUCCH).

In one embodiment, the second uplink transmission corresponds to a second PUSCH or a second PUCCH (e.g., the second uplink transmission comprises transmission of the second PUSCH or the second PUCCH).

In one embodiment, the first uplink transmission and/or the second uplink transmission corresponds to PUSCH or PUCCH.

In one embodiment, the UE transmits the first uplink transmission and drops (e.g., skips, omits and/or does not perform) the second uplink transmission based on (e.g., in response to) (i) the TA difference being larger than the first threshold (e.g., the comparison comprises a determination that the TA difference is larger than the first threshold); and (ii) a first time associated with the first uplink transmission being earlier than a second time associated with the second uplink transmission. The first time may correspond a time period in which the first uplink transmission is scheduled to be transmitted, a time unit (e.g., a slot) in which the first uplink transmission is scheduled to be transmitted and/or a starting time upon which that the first uplink transmission is scheduled to start. The second time may correspond to a time period in which the second uplink transmission is scheduled to be transmitted, a time unit (e.g., a slot) in which the second uplink transmission is scheduled to be transmitted and/or a starting time upon which that the second uplink transmission is scheduled to start. Accordingly, the UE may transmit the first uplink transmission (and/or may drop the second uplink transmission) due to the first uplink transmission being scheduled to start and/or occur earlier than the second uplink transmission. In an example, the UE may determine to transmit merely one transmission of the first uplink transmission and the second uplink transmission based on (e.g., in response to) the TA difference being larger than the first threshold, wherein the UE may select the one transmission to be the first uplink transmission based on the first time associated with the first uplink transmission being earlier than the second time associated with the second uplink transmission.

In one embodiment, the UE transmits the first uplink transmission and drops (e.g., skips, omits and/or does not perform) the second uplink transmission based on (e.g., in response to) (i) the TA difference being larger than the first threshold (e.g., the comparison comprises a determination that the TA difference is larger than the first threshold); and (ii) a first CORESET pool index (e.g., CORESETPoolIndex) associated with the first uplink transmission being smaller than a second CORESET pool index (e.g., CORESETPoolIndex) associated with the second uplink transmission. The first CORESET pool index may correspond to an index of a first CORESET pool comprising a first CORESET associated with the first uplink transmission. The second CORESET pool index may correspond to an index of a second CORESET pool comprising a second CORESET associated with the second uplink transmission. Accordingly, the UE may transmit the first uplink transmission (and/or may drop the second uplink transmission) due to the first CORESET pool index associated with the first uplink transmission being smaller than the second CORESET pool index associated with the second uplink transmission. In an example, the UE may determine to transmit merely one transmission of the first uplink transmission and the second uplink transmission based on (e.g., in response to) the TA difference being larger than the first threshold, wherein the UE may select the one transmission to be the first uplink transmission based on the first CORESET pool index associated with the first uplink transmission being smaller than the second CORESET pool index associated with the second uplink transmission.

In one embodiment, the one or more uplink grants comprise a first uplink grant and a second uplink grant. Alternatively and/or additionally, the first uplink grant may schedule the first uplink transmission and may be associated with a first TRP. Alternatively and/or additionally, the second uplink grant may schedule the second uplink transmission and may be associated with a second TRP. In an example, the first uplink transmission is scheduled by DCI in the first CORESET which is associated with the first CORESET pool index. The second uplink transmission may be scheduled by DCI in the second CORESET which is associated with the second CORESET pool index. The first CORESET pool index is associated with a first TRP. The second CORESET pool index is associated with a second TRP. Alternatively and/or additionally, the first uplink transmission is configured with information of the first CORESET pool index. The second uplink transmission is configured with information of the second CORESET pool index.

In one embodiment, the one or more uplink grants comprise one uplink grant (e.g., only one uplink grant) that schedules the first uplink transmission and the second uplink transmission.

In one embodiment, the one or more uplink grants comprise a first uplink grant (e.g., one uplink grant) that schedules the first uplink transmission and a second uplink grant that schedules the second uplink transmission.

In one embodiment, based on (e.g., in response to) a combination (e.g., a sum) of a first transmit power of the first uplink transmission and a second transmit power of the second uplink transmission being larger than a second threshold, the UE triggers transmission (and/or generation) of a report. The UE transmits the report to a network in response to triggering transmission of the report. In some examples, the report comprises a power-related report (e.g., the power-related report may comprise one or more PHs, such as a first PH associated with the first uplink transmission and/or a second PH associated with the second uplink transmission).

In one embodiment, based on (e.g., in response to) a combination (e.g., a sum) of a first pathloss variation associated with the first uplink transmission and a second pathloss variation associated with the second uplink transmission being larger than a third threshold, the UE triggers transmission (and/or generation) of a report. The UE transmits the report to a network in response to triggering transmission of the report. In some examples, the report comprises a power-related report (e.g., the power-related report may comprise one or more PHs, such as a first PH associated with the first uplink transmission and/or a second PH associated with the second uplink transmission).

Referring back to FIGS. 3 and 4, in one exemplary embodiment of a UE, the device 300 includes a program code 312 stored in the memory 310. The CPU 308 could execute program code 312 to enable the UE (i) to receive one or more uplink grants scheduling a first uplink transmission and a second uplink transmission on a first serving cell, wherein the first uplink transmission is associated with a first TA, the second uplink transmission is associated with a second TA, and the first uplink transmission at least partially overlaps with the second uplink transmission in time domain, and (ii) to transmit, based on (e.g., in response to) a comparison of a TA difference between the first TA and the second TA with a first threshold, the first uplink transmission and/or the second uplink transmission. Furthermore, the CPU 308 can execute the program code 312 to perform one, some and/or all of the above-described actions and steps and/or others described herein.

Figure 18:
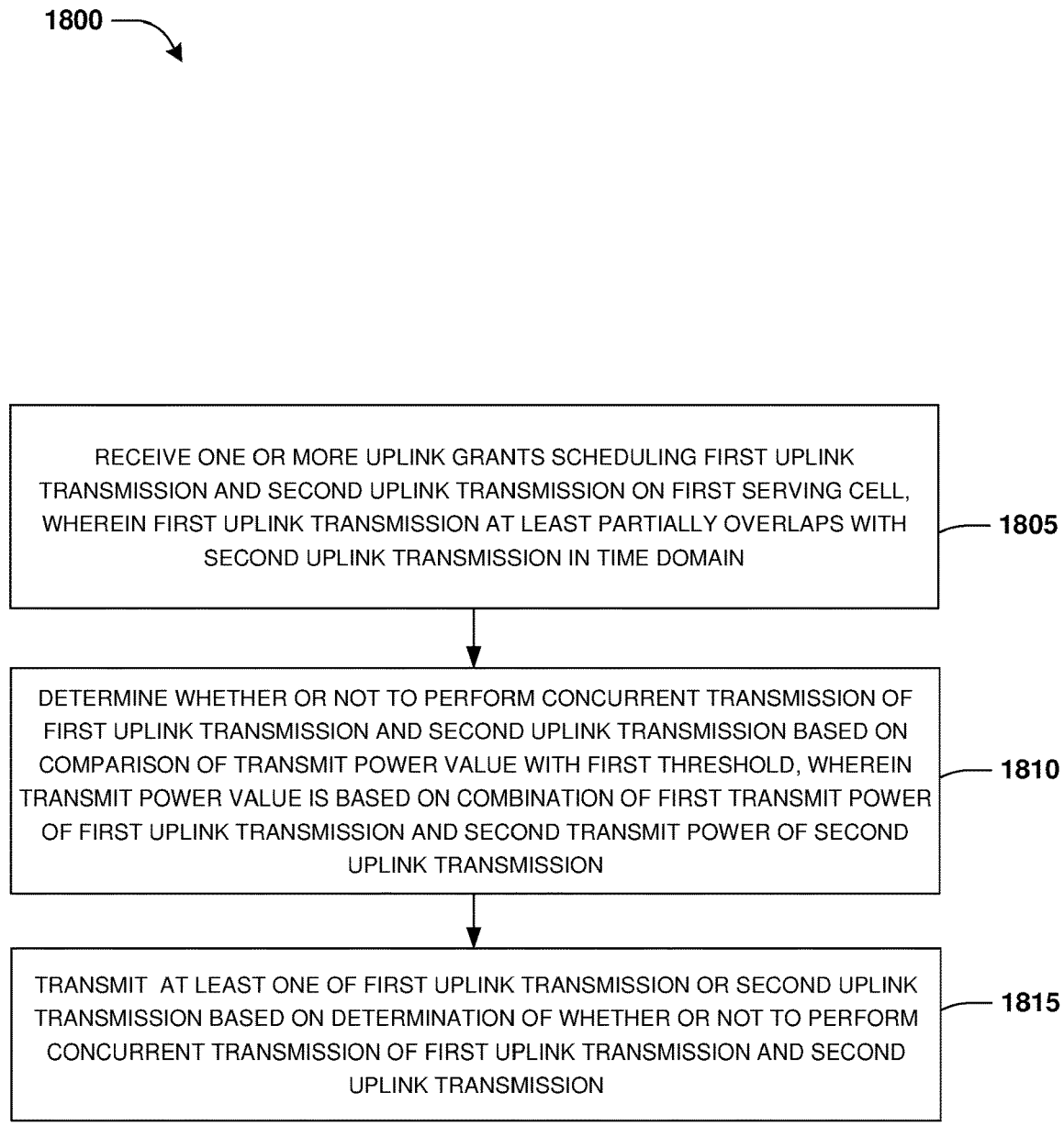
FIG. 18 is a flow chart according to one exemplary embodiment.

FIG. 18 is a flow chart 1800 according to one exemplary embodiment from the perspective of a UE in a wireless communication system. In step 1805, the UE receives one or more uplink grants scheduling a first uplink transmission and a second uplink transmission on a first serving cell, wherein the first uplink transmission at least partially overlaps with the second uplink transmission in time domain (e.g., a time period in which the UE is scheduled to perform the first uplink transmission at least partially overlaps with a time period in which the UE is scheduled to perform the second uplink transmission). In step 1810, the UE determines whether or not to perform concurrent (e.g., simultaneous) transmission of the first uplink transmission and the second uplink transmission (e.g., whether or not to transmit the first uplink transmission and the second uplink transmission concurrently, such as simultaneously) based on a comparison of a transmit power value with a first threshold. The transmit power value is based on (e.g., equal to) a combination (e.g., a sum) of a first transmit power of the first uplink transmission and a second transmit power of the second uplink transmission. The comparison of the transmit power value with the first threshold may correspond to a determination of whether the transmit power value is larger than the first threshold or whether the transmit power value is smaller than or equal to the first threshold. In step 1815, based on (e.g., in response to) the determination of whether or not to perform concurrent transmission of the first uplink transmission and the second uplink transmission, the UE transmits the first uplink transmission and/or the second uplink transmission.

In one embodiment, the first uplink transmission is associated with a first TRP and/or the UE transmits the first uplink transmission via a first TCI state.

In one embodiment, the second uplink transmission is associated with a second TRP and/or the UE transmits the first uplink transmission via a second TCI state.

In one embodiment, the first uplink transmission corresponds to a first PUSCH or a first PUCCH (e.g., the first uplink transmission comprises transmission of the first PUSCH or the first PUCCH).

In one embodiment, the second uplink transmission corresponds to a second PUSCH or a second PUCCH (e.g., the second uplink transmission comprises transmission of the second PUSCH or the second PUCCH).

In one embodiment, the first uplink transmission and/or the second uplink transmission corresponds to PUSCH or PUCCH.

In one embodiment, based on the transmit power value being larger than the first threshold, the UE performs power scaling on the first transmit power and/or the second transmit power (e.g., the UE may perform power scaling on the first transmit power and/or the second transmit power in response to a determination that the transmit power value is larger than the first threshold, wherein the determination that the transmit power value is larger than the first threshold may be made via the comparison of the transmit power value with the first threshold).

In one embodiment, the determination of whether or not to perform concurrent transmission of the first uplink transmission and the second uplink transmission comprises a determination not to perform concurrent transmission of the first uplink transmission and the second uplink transmission based on the transmit power value being larger than the first threshold (e.g., based on the comparison comprising a determination that the transmit power value is larger than the first threshold).

In one embodiment, the UE transmits the first uplink transmission and drops (e.g., skips, omits and/or does not perform) the second uplink transmission based on (e.g., in response to) the transmit power value being larger than the first threshold (e.g., the UE transmits the first uplink transmission and drops the second uplink transmission based on the comparison comprising a determination that the transmit power value is larger than the first threshold). In some examples, the UE transmits the first uplink transmission on the first serving cell.

In one embodiment, the determination of whether or not to perform concurrent transmission of the first uplink transmission and the second uplink transmission comprises a determination to perform concurrent transmission of the first uplink transmission and the second uplink transmission based on the transmit power value being smaller than or equal to the first threshold (e.g., based on the comparison comprising a determination that the transmit power value is smaller than or equal to the first threshold).

In one embodiment, the UE performs concurrent transmission (e.g., simultaneous transmission) of the first uplink transmission and the second uplink transmission on the first serving cell (e.g., the UE transmits the first uplink transmission and the second uplink transmission concurrently, such as simultaneously) based on (e.g., in response to) the transmit power value being smaller than or equal to the first threshold (e.g., the UE performs the concurrent transmission of the first uplink transmission and the second uplink transmission on the first serving cell based on the comparison comprising a determination that the transmit power value is smaller than or equal to the first threshold).

In one embodiment, based on (e.g., in response to) the transmit power value being larger than the first threshold (e.g., based on the comparison comprising a determination that the transmit power value is larger than the first threshold), the UE triggers transmission (and/or generation) of a report. The UE transmits the report to a network in response to triggering transmission of the report. In some examples, the report comprises a power-related report (e.g., the power-related report may comprise one or more PHs, such as a first PH associated with the first uplink transmission and/or a second PH associated with the second uplink transmission).

In one embodiment, the determination of whether or not to perform concurrent transmission of the first uplink transmission and the second uplink transmission is based on a comparison of the first transmit power with a second threshold and a comparison of the second transmit power with a third threshold (in addition to the determination being based on the comparison of the transmit power value with the first threshold, for example). In some examples, the determination of whether or not to perform concurrent transmission of the first uplink transmission and the second uplink transmission comprises a determination not to perform concurrent transmission of the first uplink transmission and the second uplink transmission based on the transmit power value being larger than the first threshold, the first transmit power being larger than the second threshold and/or the second transmit power being larger than the third threshold. In some examples, the determination of whether or not to perform concurrent transmission of the first uplink transmission and the second uplink transmission comprises a determination to perform concurrent transmission of the first uplink transmission and the second uplink transmission based on the transmit power value being smaller than or equal to the first threshold, the first transmit power being smaller than or equal to the second threshold and/or the second transmit power being smaller than or equal to the third threshold.

In one embodiment, the first threshold, the second threshold and/or the third threshold are associated with a capability of the UE. For example, the first threshold, the second threshold and the third threshold may be based on (e.g., a function of) a transmit power associated with the capability of the UE (e.g., the transmit power may correspond to a transmit power with which the UE is capable of performing uplink transmissions).

In one embodiment, the first transmit power is based on (e.g., determined based on, such as derived from) a first set of power control parameters associated with a first TCI state. The second transmit power is based on (e.g., determined based on, such as derived from) a second set of power control parameters associated with a second TCI state.

In one embodiment, based on (e.g., in response to) a combination (e.g., a sum) of a first pathloss variation associated with the first uplink transmission and a second pathloss variation associated with the second uplink transmission being larger than a fourth threshold, the UE triggers transmission (and/or generation) of a report. The UE transmits the report to a network in response to triggering transmission of the report. In some examples, the report comprises a power-related report (e.g., the power-related report may comprise one or more PHs, such as a first PH associated with the first uplink transmission and/or a second PH associated with the second uplink transmission).

Referring back to FIGS. 3 and 4, in one exemplary embodiment of a UE, the device 300 includes a program code 312 stored in the memory 310. The CPU 308 could execute program code 312 to enable the UE (i) to receive one or more uplink grants scheduling a first uplink transmission and a second uplink transmission on a first serving cell, wherein the first uplink transmission at least partially overlaps with the second uplink transmission in time domain, (ii) to determine whether or not to perform concurrent transmission of the first uplink transmission and the second uplink transmission based on a comparison of a transmit power value with a first threshold, wherein the transmit power value is based on a combination of a first transmit power of the first uplink transmission and a second transmit power of the second uplink transmission, and (iii) to transmit, based on the determination of whether or not to perform concurrent transmission of the first uplink transmission and the second uplink transmission, the first uplink transmission and/or the second uplink transmission. Furthermore, the CPU 308 can execute the program code 312 to perform one, some and/or all of the above-described actions and steps and/or others described herein.

Figure 19:
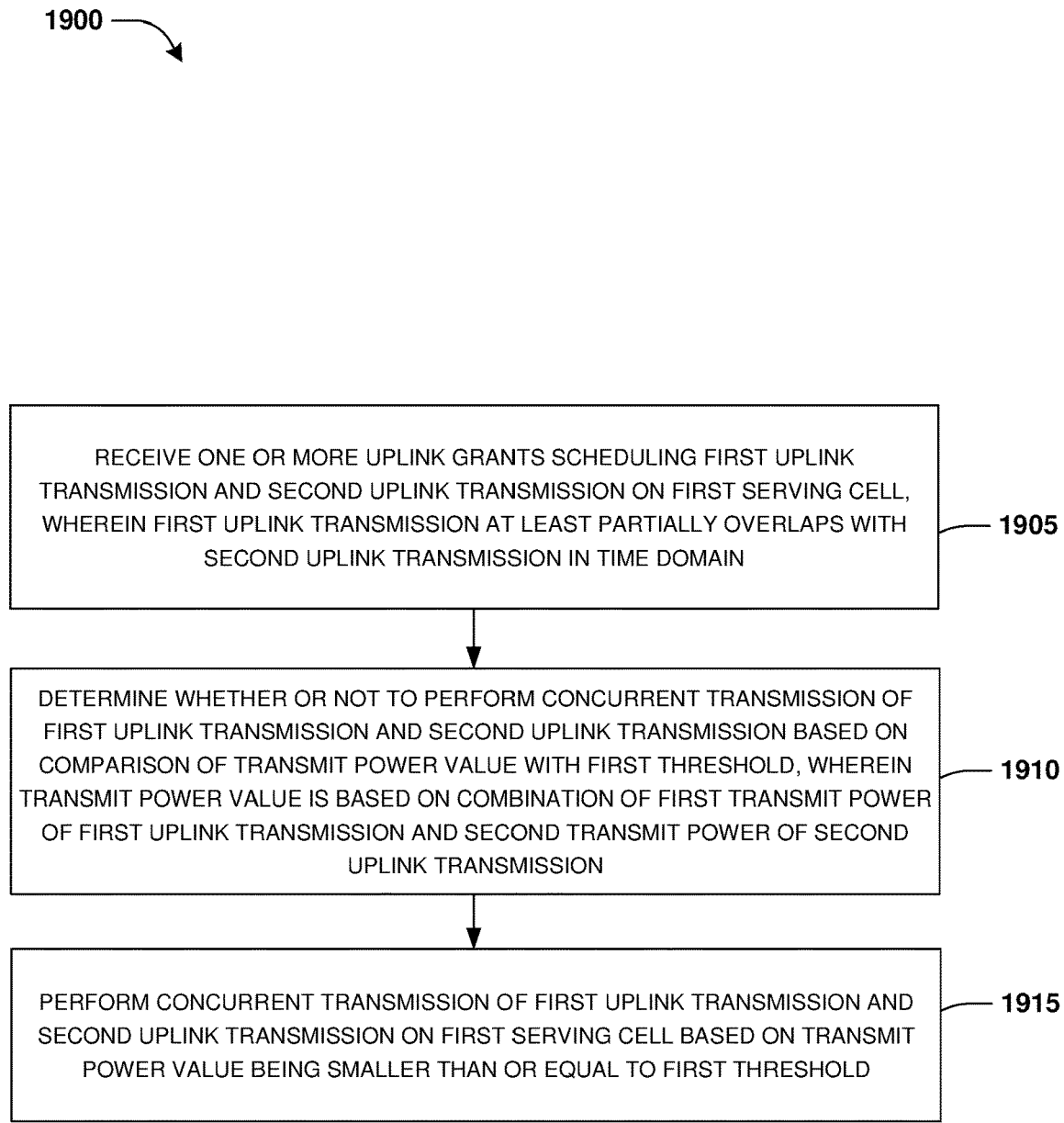
FIG. 19 is a flow chart according to one exemplary embodiment.

FIG. 19 is a flow chart 1900 according to one exemplary embodiment from the perspective of a UE in a wireless communication system. In step 1905, the UE receives one or more uplink grants scheduling a first uplink transmission and a second uplink transmission on a first serving cell, wherein the first uplink transmission at least partially overlaps with the second uplink transmission in time domain (e.g., a time period in which the UE is scheduled to perform the first uplink transmission at least partially overlaps with a time period in which the UE is scheduled to perform the second uplink transmission). In step 1910, the UE determines whether or not to perform concurrent (e.g., simultaneous) transmission of the first uplink transmission and the second uplink transmission (e.g., whether or not to transmit the first uplink transmission and the second uplink transmission concurrently, such as simultaneously) based on a comparison of a transmit power value with a first threshold. The transmit power value is based on (e.g., equal to) a combination (e.g., a sum) of a first transmit power of the first uplink transmission and a second transmit power of the second uplink transmission. The comparison of the transmit power value with the first threshold may correspond to a determination of whether the transmit power value is larger than the first threshold or whether the transmit power value is smaller than or equal to the first threshold. In step 1915, based on (e.g., in response to) the transmit power value being smaller than or equal to the first threshold (e.g., based on the comparison comprising a determination that the transmit power is smaller than or equal to the first threshold), the UE performs the concurrent transmission (e.g., simultaneous transmission) of the first uplink transmission and the second uplink transmission on the first serving cell (e.g., the UE transmits the first uplink transmission and the second uplink transmission concurrently, such as simultaneously).

Referring back to FIGS. 3 and 4, in one exemplary embodiment of a UE, the device 300 includes a program code 312 stored in the memory 310. The CPU 308 could execute program code 312 to enable the UE (i) to receive one or more uplink grants scheduling a first uplink transmission and a second uplink transmission on a first serving cell, wherein the first uplink transmission at least partially overlaps with the second uplink transmission in time domain, (ii) to determine whether or not to perform concurrent transmission of the first uplink transmission and the second uplink transmission based on a comparison of a transmit power value with a first threshold, wherein the transmit power value is based on a combination of a first transmit power of the first uplink transmission and a second transmit power of the second uplink transmission, and (iii) to perform, based on the transmit power value being smaller than or equal to the first threshold, the concurrent transmission of the first uplink transmission and the second uplink transmission on the first serving cell. Furthermore, the CPU 308 can execute the program code 312 to perform one, some and/or all of the above-described actions and steps and/or others described herein.

It may be appreciated that, although embodiments are discussed herein with respect to scheduling and/or transmitting two uplink transmissions (e.g., two uplink transmissions performed concurrently, such as simultaneously), the techniques provided in the present disclosure may be utilized for performing (and/or determining whether or not to perform) any number of uplink transmissions (e.g., three uplink transmissions performed concurrently, four uplink transmissions performed concurrently, etc.) on any number of UE panels, beams, etc. For example, "two" may be changed with a different number, such as "three", "four", etc.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 15-19. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 15-19, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node), such as due, at least in part, to enabling the UE and/or the network node to determine whether or not the UE performs concurrent (e.g., simultaneous) uplink transmissions.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
receiving a first uplink grant, associated with a first Transmission/Reception Point (TRP), scheduling or activating or configuring a first Physical Uplink Shared Channel (PUSCH) transmission on a first serving cell;
receiving a second uplink grant, associated with a second TRP, scheduling or activating or configuring a second PUSCH transmission on the first serving cell, wherein:
the first PUSCH transmission is associated with a first Timing Advance (TA);
the second PUSCH transmission is associated with a second TA; and
the first PUSCH transmission at least partially overlaps with the second PUSCH transmission in time domain; and
based on a comparison of a TA difference, between the first TA and the second TA, with a first threshold:
transmitting the first PUSCH transmission, associated with the first TRP, on the first serving cell and dropping the second PUSCH transmission, associated with the second TRP, from transmission on the first serving cell based on the TA difference being larger than the first threshold; or
performing concurrent transmission of the first PUSCH transmission, associated with the first TRP, on the first serving cell and the second PUSCH transmission, associated with the second TRP, on the first serving cell based on the TA difference being smaller than or equal to the first threshold,
wherein the first PUSCH transmission is transmitted with a first transmit power and the second PUSCH transmission is transmitted with a second transmit power if a combination of the first transmit power of the first PUSCH transmission and the second transmit power of the second PUSCH transmission is smaller than or equal to a second threshold.

2. The method of claim 1, wherein at least one of:
the UE transmits the first PUSCH transmission via a first Transmission Configuration Indicator (TCI) state; or
the UE transmits the second PUSCH transmission via a second TCI state.

3. The method of claim 1, wherein:
the transmitting the first PUSCH transmission and dropping the second PUSCH transmission is based on:
a first time associated with the first PUSCH transmission being earlier than a second time associated with the second PUSCH transmission.

4. The method of claim 1, wherein:
the transmitting the first PUSCH transmission and dropping the second PUSCH transmission is based on:
a first Control Resource Set (CORESET) pool index associated with the first PUSCH transmission being smaller than a second CORESET pool index associated with the second PUSCH transmission.

5. The method of claim 1, comprising:
based on the combination of the first transmit power of the first PUSCH transmission and the second transmit power of the second PUSCH transmission being larger than the second threshold, triggering transmission of a report; and
in response to the triggering transmission of the report, transmitting the report to a network.

6. The method of claim 1, comprising:
based on a combination of a first pathloss variation associated with the first PUSCH transmission and a second pathloss variation associated with the second PUSCH transmission being larger than a third threshold, triggering transmission of a report; and
in response to the triggering transmission of the report, transmitting the report to a network.

7. The method of claim 1, wherein:
the first PUSCH transmission is transmitted with the first transmit power and the second PUSCH transmission is transmitted with a reduced second transmit power if the combination of the first transmit power of the first PUSCH transmission and the second transmit power of the second PUSCH transmission is larger than the second threshold.

8. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
  receiving a first uplink grant, associated with a first Transmission/Reception Point (TRP), scheduling or activating or configuring a first Physical Uplink Shared Channel (PUSCH) transmission on a first serving cell;
  receiving a second uplink grant, associated with a second TRP, scheduling or activating or configuring a second PUSCH transmission on the first serving cell, wherein:
    the first PUSCH transmission is associated with a first Timing Advance (TA);
    the second PUSCH transmission is associated with a second TA; and
    the first PUSCH transmission at least partially overlaps with the second PUSCH transmission in time domain; and
  based on a comparison of a TA difference, between the first TA and the second TA, with a first threshold:
    transmitting the first PUSCH transmission, associated with the first TRP, on the first serving cell and dropping the second PUSCH transmission, associated with the second TRP, from transmission on the first serving cell based on the TA difference being larger than the first threshold; or
    performing concurrent transmission of the first PUSCH transmission, associated with the first TRP, on the first serving cell and the second PUSCH transmission, associated with the second TRP, on the first serving cell based on the TA difference being smaller than or equal to the first threshold,
  wherein the first PUSCH transmission is transmitted with a first transmit power and the second PUSCH transmission is transmitted with a second transmit power if a combination of the first transmit power of the first PUSCH transmission and the second transmit power of the second PUSCH transmission is smaller than or equal to a second threshold.

9. The UE of claim 8, wherein at least one of:
the UE transmits the first PUSCH transmission via a first Transmission Configuration Indicator (TCI) state; or
the UE transmits the second PUSCH transmission via a second TCI state.

10. The UE of claim 8, wherein:
the transmitting the first PUSCH transmission and dropping the second PUSCH transmission is based on:
  a first time associated with the first PUSCH transmission being earlier than a second time associated with the second PUSCH transmission.

11. The UE of claim 8, wherein:
the transmitting the first PUSCH transmission and dropping the second PUSCH transmission is based on:
  a first Control Resource Set (CORESET) pool index associated with the first PUSCH transmission being smaller than a second CORESET pool index associated with the second PUSCH transmission.

12. The UE of claim 8, the operations comprising:
based on the combination of the first transmit power of the first PUSCH transmission and the second transmit power of the second PUSCH transmission being larger than the second threshold, triggering transmission of a report; and
in response to the triggering transmission of the report, transmitting the report to a network.

13. The UE of claim 8, the operations comprising:
based on a combination of a first pathloss variation associated with the first PUSCH transmission and a second pathloss variation associated with the second PUSCH transmission being larger than a third threshold, triggering transmission of a report; and
in response to the triggering transmission of the report, transmitting the report to a network.

14. The UE of claim 8, wherein:
the first PUSCH transmission is transmitted with the first transmit power and the second PUSCH transmission is transmitted with a reduced second transmit power if the combination of the first transmit power of the first PUSCH transmission and the second transmit power of the second PUSCH transmission is larger than the second threshold.

* * * * *